United States Patent
McNamara et al.

(10) Patent No.: US 11,339,048 B2
(45) Date of Patent: May 24, 2022

(54) FLEET FUEL MANAGEMENT SYSTEM

(71) Applicant: FuelLoc LLC, Stoughton, MA (US)

(72) Inventors: William McNamara, Marston Mills, MA (US); Paul A. Sullivan, Attleboro, MA (US); Timothy Callow, Stoughton, MA (US)

(73) Assignee: FuelLoc LLC, Stoughton, MA (US)

( * ) Notice: Subject to any disclaimer, the term of this patent is extended or adjusted under 35 U.S.C. 154(b) by 0 days.

(21) Appl. No.: 16/486,812

(22) PCT Filed: Feb. 16, 2018

(86) PCT No.: PCT/US2018/018491
§ 371 (c)(1),
(2) Date: Aug. 16, 2019

(87) PCT Pub. No.: WO2018/152401
PCT Pub. Date: Aug. 23, 2018

(65) Prior Publication Data
US 2019/0367353 A1     Dec. 5, 2019

Related U.S. Application Data

(60) Provisional application No. 62/459,982, filed on Feb. 16, 2017.

(51) Int. Cl.
*B67D 7/14*   (2010.01)
*B67D 7/04*   (2010.01)
*G05B 19/042* (2006.01)

(52) U.S. Cl.
CPC .............. *B67D 7/145* (2013.01); *B67D 7/04* (2013.01); *G05B 19/042* (2013.01); *G05B 2219/23258* (2013.01); *G05B 2219/23363* (2013.01)

(58) Field of Classification Search
CPC . B67D 7/145; B67D 7/04; B67D 7/00; G05B 19/042; G05B 2219/23258; G05B 2219/23363
(Continued)

(56) References Cited

U.S. PATENT DOCUMENTS 10,121,145 B2   11/2018   Abrams et al.
2015/0242855 A1  8/2015   Vilnai
(Continued)

OTHER PUBLICATIONS

International Search Report and Written Opinion for International Application No. PCT/US2018/018491 dated Jun. 28, 2018.
(Continued)

*Primary Examiner* — Russell S Glass
(74) *Attorney, Agent, or Firm* — Wolf, Greenfield & Sacks, P.C.

(57) ABSTRACT

A fleet fueling system may be implemented with controllers electronically interfacing with fuel dispensers at dispensing stations and communicating via a wide area network with one or more computing device implementing multiple subsystems. Hardware components and subsystems may be configured to avoid operating errors and provide end-to-end functionality, including one or more of: avoiding damage to movable readers that can collect information about assets positioned at fuel dispensing stations, selectively authorizing fuel to be dispensed based on the types and amount of fuel those assets are authorized to receive, quickly and reliably entering information about assets, providing analytics relating to fuel usage per asset, predicting future fuel needs at each of multiple fuel dispensing sites and scheduling fuel deliveries based on predicted needs, and detecting or correcting operating errors in the system.

3 Claims, 65 Drawing Sheets

(58) Field of Classification Search
USPC .......................................................... 705/28
See application file for complete search history.

(56) References Cited

U.S. PATENT DOCUMENTS

2015/0278788 A1* 10/2015 Manuel ................ G06Q 20/327
  705/21
2016/0221816 A1* 8/2016 Pollock .................. B67D 7/348

OTHER PUBLICATIONS

International Preliminary Report on Patentability for International Application No. PCT/US2018/018491 dated Aug. 29, 2019.

* cited by examiner

Welcome: John Doe [Log Out]

Customer Request # 1234 ⇕

Customer Message To:
johndoe@email.com ⇕

Vendor:
joesmith@vendor.com ⇕

New Account History:
Date of Request: 04/12/15
Requestor: Joe Colorado

Operations Site Installation Page

6000

Add An Asset:
Asset Name: CAT GRADER 123 ⇕
Asset Identifier: VIN3478521
Description: Model 12G - Yellow
Engine Size: Unknown
Tank Size: 250 Gallon
Asset Owner: John Doe
Asset Phone: 123.456.7890

Add Asset: ☑    Remove Asset: ☐

[Approve Request for Asset Change]

Request A Site:
Site Name: Denver West
Site Zip Code: 80401-3211
GPS Longitude: -105.1602472
GPS Latitude: 39.7375122
Fuel Type: Both
Site Owner: Joe Smith
Site Owner Phone: 098.765.4321
Comments: Need 4 Islands. (2) Clear (2) Red ⇕

Add Site: ☑    Remove Site: ☐

[Approve Request for New Site]

Message to Installation Team: | Joe, can you let me know how soon your team can get to Denver Metro West to install a new tag on this asset. They are also requesting a new site. Please get back at your earliest. Thanks Jim | ⇕

Message to Customer: | Hold tight while our installation team looks at the schedule. Jim | ⇕

[Prev]    [Next]

*FIG. 60*

Vendor New – Asset Installer Page

6200

| | | Check List: |
|---|---|---|
| Request A Site: | | |
| Asset Tag ID: | DM123456 | ☑ Asset is in the database |
| Site Name: | Any | ☑ Asset COM works |
| VIN #: | CO43211 | ☑ See Control is Active |
| Customer Name: | Denver West | ☑ Take is accessible |
| Customer ID: | 23423 | ☑ Tag check complete |
| Asset Owner: | Joe Asset Colorado | ☑ Asset owner is trained |
| Asset Owner Phone: | 781.844.3503 | ☑ Dispatch phone # on tag |
| Asset Owner Email: | 4,000 Gallons QNTY: (2) | ☑ Bar Code works |
| Asset Fuel Type: | Red | |
| Asset Fuel Load Size: | 200 Gallons | |

Welcome:
John Doe [Log Out]

Installer: Joe Installer ⇧

Vendor:
accounting@vendor.com
joesmith@vendor.com
joecolorado@salesman.com

Request Date: Feb 25th 2016

☐ Hot - Urgent
☑ Medium - 2 Weeks
☐ Warm

Message to Team Vendor

| Joe, we completed the installation of the tag today. The driver is trained. He wants to know how many gallons he pumps. I showed him how the system texts him is fueling event, time, date, fuel type, and amount. | ⇧ |

[Prev]  [Next]

*FIG. 62*

Welcome:
John Doe    [Log Out]

Vendor - Site Installer Page

6300

| | |
|---|---|
| Request A Site: | |
| Customer Name: | City of Denver |
| Customer Number: | 432234 |
| Site Name: | Denver West |
| Site Zip Code: | 80401-3211 |
| Site Address | 1234 Candy Cane Lane |
| GPS Longitude: | -105.1602472 |
| GPS Latitude: | 39.7375122 |
| Fuel Type: | Both |
| Site Owner | Denver Metro – Joe Colorado |
| Site Owner Phone: | 781.844.3503 |
| Clear Fuel Tank Size | 4,000 Gallons QNTY: (2) |
| Red Fuel Tank Size | 9,000 Gallons QNTY: (3) |
| Pump Metering System: | Ecount LT |

Check List:
☑ Site has been inspected
☑ 230VAC/30A Service
☑ See Control is Active
☑ Wiring is complete
☑ Terminations are complete
☑ Power is live
☑ E-Stop Works
☑ Flow meters are calibrated
☑ Pumps turn off
☑ Signal lights work
☑ Storage tanks are working Installer: Joe Installer Vendor:
accounting@vendor.com
joesmith@vendor.com
joecolorado@salesman.com Request Date: Feb 25th 2016

☐ Hot - Urgent
☑ Medium - 2 Weeks
☐ Warm

Message to Team Vendor

Joe, we completed the installation today. The system is ready to go. How are the tag installations coming? - Joe Installer

[Prev]    [Next]

Operations - Dispatch Page

Welcome: Nice Voice [Log Out]

Request A Site:
Site Location: Denver West
Tank A: 4000 Gallons
Tank B: 4000 Gallons
Site Owner: Joe Site Colorado
Site Owner Phone: 720.844.3503
Delivery Driver: Joe Driver
Delivery Driver Phone Number: 720.123.4567
Fuel Type: Red
Log Consumption: 3253 Gallons
Load Volume Count: 3593 Gallons Check List:
☑ Driver was dispatched
☑ Driver got to location
☑ Driver got to correct fuel type
☑ Driver called back once texted
☑ Driver called once at site
☑ Load was recorded w/dispatcher Dispatcher: Nice Voice Vendor Dispatcher: nicevoice@vendor.com Dispatch Date: Feb 25th 2016
Dispatch Time: 7:23 AM
Delivery Time: 11:23 AM Email "A" Tank Trigger Points: When 20% is left
Email "B" Tank Trigger Points: When 20% is left Step 1: Press Log          Step 2: Enter Load Count          Step 3: Check List Has Been Completed
[Log Gallons Used]         [Tank Has Been Filled]            [Check List Has Been Completed]

Dispatcher Comments: Since the last restocking event, we used 3253. This restocking was normal, Joe called back with 3593 gallons unloaded.

☑ Hot – Urgent
☐ Medium – 2 Weeks
☐ Warm

[Prev]                                                                                [Next]

*FIG. 64*

Operations- Customer Billing Approval

6500

Welcome: John Doe [Log Out]

Salesman: Joe Colorado ⇕

Operator Message To: johndoe@email.com ⇕

Vendor:
accounting@vendor.com
joesmith@vendor.com
joecolorado@salesman.com

Request Date: Feb 25th 2016

[✓] Hot - Urgent
[ ] Medium - 2 Weeks
[ ] Warm

Add A Customer:
Customer Name: Denver East
Customer EIN#: 987234
DUNNS #: DUN6545
Head Quarters: Denver Metro
Contact: John Doe
Address 1: 1234 Beer Lane
Address 2: Golden, Colorado 80902
Phone Number: 726.548.9546

Account Comments: These guys are great. Good credit referrals. We completed the credit check so a new site has been discussed to put in 4 islands. (2) Red, 2(Clear). They need it up and running May 1st ⇕

Credit Check Complete: [✓]  Link to Account: [✓]

[Apporve New Customer]    [Put The System On Hold - Have Not Paid their Bill]

Message to Team Vendor: Joe, we are going ahead with the Denver Metro project. Can you get out to the site and get back ASAP. Accounting, thanks for your fast response. ⇕

Message to Customer: Dear Denver East. You account has been approved. Our installation team manager Joe Smith will be contacting you soon. Thanks Jim ⇕

[Prev]                                                                    [Next]

Operations - Administrator Page 1

Welcome: Superuser [Log Out]

Add Remove Customer User:
Customer Company: Denver West
Customer Name: Joe Customer
Customer Phone: 720.123.4567
Customer Email: Joe.customer@DW.com
User Name: 781.844.3503
Login Name: Joe.customer
Login PW: Redshoes123

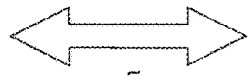

Functionality:
☑ Add/Remove Assets
☑ Forward Reports
☑ Receive Messages
☑ Receive Emails
☑ Add/Remove Site
☑ Receive Dispatch Messages
☑ Receive Daily Reports
☑ Receive Weekly Reports
☑ Receive Monthly Reports
☑ Receive Annual Reports Vendor Salesman: joe.sales@vendor.com
Vendor Manager: jim.manager@vendor.com
Vendor Dispatcher: nice.voice@vendor.com
Vendor Installer: joe.smith@vendor.com
Vendor Accountant: #srus@vendor.com ☑ This Account is Approved and Live
☐ This Account is Suspended
☐ This Account is Retired Message to User: Dear Joe, please click on this link to change your password. [Send]

Message to Team Vendor: Everything Site gallons matches up to Asset Gallons. [Send]

☑ Automate PW Reset Request
☑ Allow for Muiltple Device Control
☐ Notify All When Changes are Made

[Prev] [Next]

FIG. 66

Server (HQ) Database 6800

| Name | Columns | Notes |
|---|---|---|
| AssetConfigs | key<br>Int assetID<br>String assetVIN<br>String assetBarCode<br>String assetRFID<br>Bool[] pumpsAllowed<br>Bool isCalibration | Joins by assetID to TransactionLogs |
| PumpConfigs | Key<br>Int pumpID<br>Double calibrationParm<br>Time lastCalibration<br>Time timeOut<br>Bool isMileageCheck<br>Bool isOperatorCheck | Joins by pumpID to TransactionLogs |
| OperatorConfigs | Key<br>Int operatorID<br>Int hashedPW | hashedPW references some securely-stored salt and hash key for evaluating |
| TransactionLogs | Key<br>Time timestamp<br>Int pumpID<br>Int assetID<br>Bool wasPermitted<br>Bool wasCalibration<br>Double fuelAmount<br>Int mileage<br>Bool wasTimeOut<br>Bool wasOverride<br>Time startTime<br>Time endTime<br>Bool wasLogged | Joins by assetID to AssetConfigs<br>Joins by pumpID to PumpConfigs |
| SiteConfigs | Key<br>Int siteID<br>Double latitude<br>Double longitude<br>TimeSpan heartbeatRate | |

*FIG. 68*

Server (HQ) Database Continued 6800

| SiteConfigs | Key<br><br>Int siteID<br>Int customerID<br>String siteName<br>String siteAddress<br>Double latitude<br>Double longitude<br>Time lastUpdate<br>Int lastUpdateVersion | Joins by siteID to PumpConfigs |
|---|---|---|

*FIG. 69*

Client (Site) Database

| Name | Columns | Notes |
|---|---|---|
| AssetConfigs | key<br>Int assetID<br>String assetVIN<br>String assetBarCode<br>String assetRFID<br>Bool[] pumpsAllowed<br>Bool isCalibration | Joins by assetID to TransactionLogs |
| PumpConfigs | Key<br>Int pumpID<br>Double calibrationParm<br>Time lastCalibration<br>Time timeOut<br>Bool isMileageCheck<br>Bool isOperatorCheck | Joins by pumpID to TransactionLogs |
| OperatorConfigs | Key<br>Int operatorID<br>Int hashedPW | hashedPW references some securely-stored salt and hash key for evaluating |
| TransactionLogs | Key<br>Time timestamp<br>Int pumpID<br>Int assetID<br>Bool wasPermitted<br>Bool wasCalibration<br>Double fuelAmount<br>Int mileage<br>Bool wasTimeOut<br>Bool wasOverride<br>Time startTime<br>Time endTime<br>Bool wasLogged | Joins by assetID to AssetConfigs<br>Joins by pumpID to PumpConfigs |
| SiteConfigs | Key<br>Int siteID<br>Double latitude<br>Double longitude<br>TimeSpan heartbeatRate | |

FIG. 70

Messages

| Name | API URL (relative) | Parameters | Responses | Notes |
|---|---|---|---|---|
| [All] | /[Any] | Int clientID | String status | Applies to all messages below |
| Heartbeat | /Heartbeat | Double latitude<br>Double longitude | N/A | |
| Calibration | /Calibrate | Int assetID<br>Int pumpID<br>Double calibrationFactor | N/A | |
| Update | /Update | N/A | PumpDef[] pumps<br>{<br>    Int pumpID<br>    Double calibrationFactor<br>    Time timeOut<br>    Bool isMileageCheck<br>    Bool isOperatorCheck<br>}<br>AssetDef[] assets<br>{<br>    Int assetID<br>    Int lastMileage<br>    String assetVIN<br>    String assetBarCode<br>    String assetRFID<br>    Bool[] pumpsAllowed<br>    Bool isCalibration<br>}<br>OperatorDef[] operators<br>{<br>    Int operatorID<br>    Int hashedPW<br>}<br>TimeSpan newHeartbeatRate | |

FIG. 71

FLEET FUEL MANAGEMENT SYSTEM

CROSS-REFERENCE TO RELATED APPLICATIONS

This application is a 35 U.S.C. § 371 National Phase filing of International Application No. PCT/US2018/018491, filed on Feb. 16, 2018, entitled "FLEET FUEL MANAGEMENT SYSTEM," which claims priority to and the benefit of U.S. Provisional Patent Application No. 62/459,982, filed on Feb. 16, 2017, entitled "FLEET FUEL MANAGEMENT SYSTEM." The entire contents of these applications are incorporated herein by reference in their entirety.

BACKGROUND

Many companies utilize trucking fleets to carry out their business. A focal point for these companies is the management of vehicle assets and fuel consumption. A conventional system for this management depends on an individual driver's ability to efficiently and accurately perform and report a fueling event. A driver of a vehicle must remember a code or carry a charge card to authorize fueling. The driver then manually chooses a fuel type and refuels their vehicle. After fueling, the driver submits fueling amounts and progress back to a dispatch office.

SUMMARY

In some embodiments, a fuel dispensing station configured to dispense fuel to a vehicle at the fuel dispensing station for fueling is provided, the station comprising: a fuel dispensing nozzle; a controller configured to control the flow through the fuel dispensing nozzle; and a moveable reader comprising a cable coupling the moveable reader to the controller, wherein the moveable reader is configured to read information about the vehicle when moved to a position proximate the fuel dispensing station; a dock configured to hold the moveable reader; and a sensor configured to indicate when the moveable reader is in the dock, wherein the controller is configured to: selectively enable fuel to flow through the dispensing nozzle based at least in part on information about the vehicle read with the moveable reader and the output of the sensor indication the moveable reader is in the dock; and selectively disable fuel from flowing through the dispensing nozzle based on the sensor indication the moveable reader is not in the dock.

In other embodiments, a controller is provided for a fuel dispensing station having a fuel dispenser comprising a housing enclosing a pump and electronics configured to turn on and off the pump and to provide a signal indicating an amount of fuel dispensed by the pump, the controller providing an interface to a fueling system and comprising: a first interface to at least one reader configured to read information from an asset positioned for fueling at the fuel dispensing station; a second interface to a wide area network, wherein the second interface is configured for communications between the fuel dispensing station and a processing site of the fueling system; a third interface to the electronics of the fuel dispenser; and a processor, configured to: obtain information about the asset via the first interface and the second interface; selectively generate control signals to the fuel dispenser based on the information about the asset; and communicate the control signals through the third interface.

In other embodiments, at least one non-transitory computer-readable medium is provided, the non-transitory computer-readable medium comprising computer executable instructions that, when executed by at least one hardware processor, implement a fuel management system, the computer executable instructions being configured to perform acts of: receiving from each of a plurality of fuel dispensing stations heartbeat signals conveying information relating to operation status of components at the fuel dispensing stations; based on information conveyed by the heartbeat signals, determining a corrective action at an identified dispensing station; and communicating to a controller at the identified dispensing station a command to initiate the corrective action.

In other embodiments, a method of operating a fuel management system comprising a database of assets registered with the system is provided, the method comprising: with an asset at a fuel dispensing site, operating a portable electronic device to: obtain first information about the asset through at least one reader; receive through a user interface on the portable electronic device second information related to the asset; and communicate the first information and the second information via a wireless communication interface to an asset management subsystem of the fuel management system.

BRIEF DESCRIPTION OF DRAWINGS

FIG. 60 shows a user interface 6000 for the inventory management subsystem that allows a site operating user to install a new site.

FIG. 62 shows a user interface 6200 for the asset management subsystem that allows a user to install a new vehicle asset.

FIG. 63 shows a user interface 6300 for the inventory management subsystem that further allows a user to install a new site.

FIG. 64 shows a user interface 6400 for the inventory management subsystem that allows a user to manage dispatch to monitor site restocking.

FIG. 65 shows a user interface 6500 for the inventory management subsystem that allows a user to check on the status of their billing.

FIG. 66 shows a user interface 6600 for the inventory management subsystem that allows an administrator to oversee their account.

FIG. 68 shows a system messaging structure 6800 used in the asset management subsystem.

FIG. 69 shows a continuation of the system messaging structure 6800 shown in FIG. 68.

FIG. 70 shows a system messaging structure 7000 used in the inventory management subsystem.

FIG. 71 shows a system messaging structure 7100 used in communication between subsystems.

DETAILED DESCRIPTION

Figure 1:
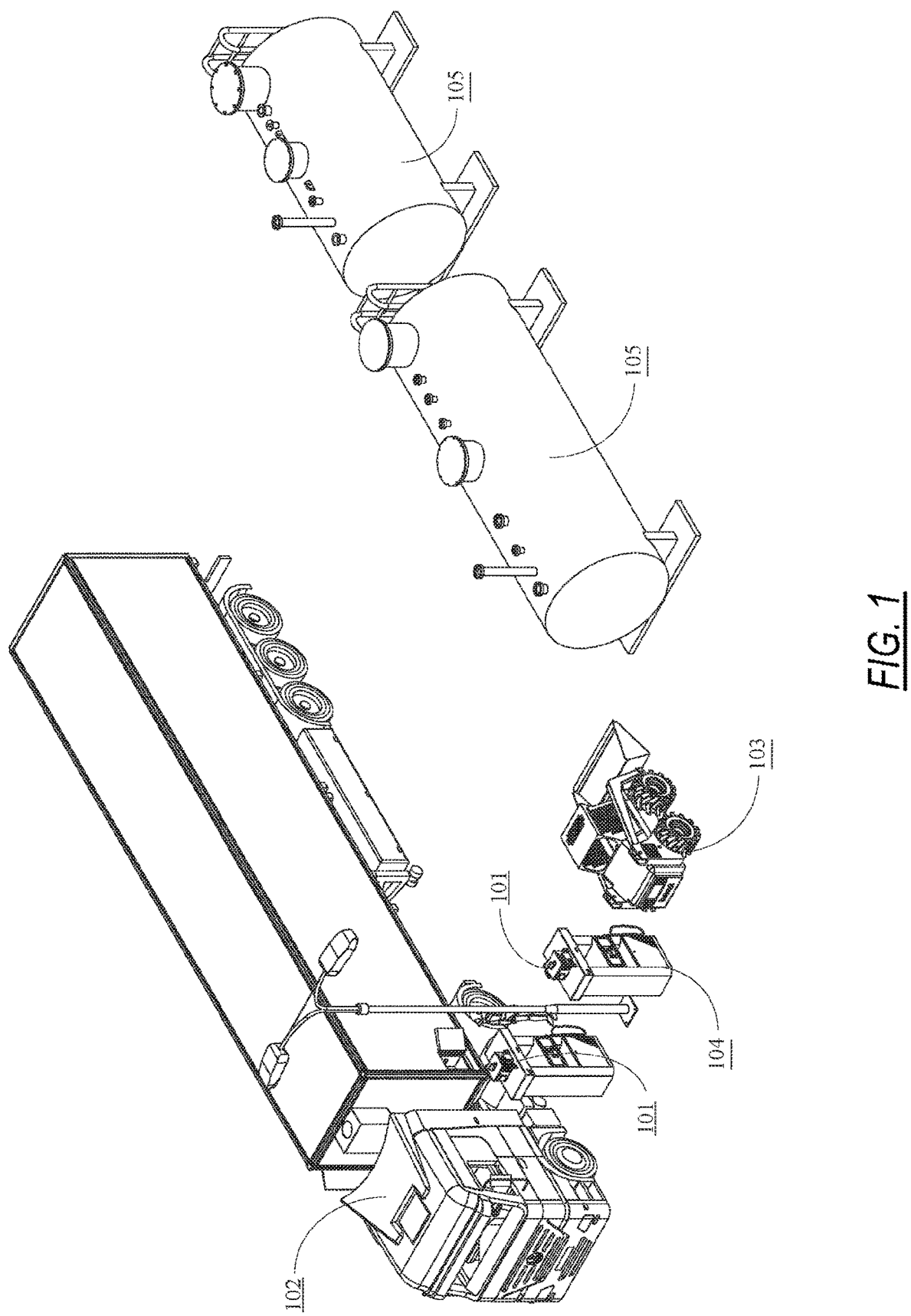
FIG. 1 shows an illustrative example of a fuel dispensing site at which the system may be implemented.

The inventors have recognized and appreciated techniques by which current systems for fleet fueling may be improved through the configuration of a fleet fueling system and the components of that system. Such techniques may provide improvements in one or more ways, including addressing vulnerabilities to various human errors throughout the process. For example, in a conventional system, a driver can lose a charge card, or could commit theft by using the charge card for more than refueling. The driver could fuel the vehicle with fuel that is not appropriate for the specific engine. As another example, the driver could fail to report or report accurately the fuel consumption of the vehicle, thus misrepresenting the vehicle's fuel usage data.

Techniques as described herein address these vulnerabilities by providing a high level integration of the various steps in a fueling event and a company's management of vehicle assets and fuel consumption. In some embodiments, the system may be an end to end system, with components at the point of dispensing fuel coupled via a computer network to components at a service center or other remote location. The components at the point of dispensing fuel may provide real time monitoring of fuel dispensed and delivered. The components at the service center may implement one or more subsystems, which may be integrated, and provide higher level functions. For example, the fleet fueling system may include an asset management subsystem. One or more subsystems may manage the fueling system, such as a configuration subsystem or a maintenance subsystem. Such components of the fleet fueling system may interact with multiple fuel dispensing locations such that information for a fleet may be aggregated regardless of the fuel dispensing station at which each asset was fueled.

These components may cooperate to avoid errors during fueling. For example, sensors at the point of delivery may recognize a specific asset being fueled (such as via bar code reader gun, RFID, Bluetooth, driver-operated keyboard, cellular modem) this information may be combined with information stored in the remote subsystems about the asset to determine the correct fuel type for that asset or other constraints on the specific asset. The components at the point of dispensing may enforce these constraints, such as by only enabling a pump that dispenses the correct type of fuel.

Components at the point of dispensing may report fueling data for an asset to the asset management subsystem. A billing subsystem may access information in the asset management subsystem to bill customers of the fuel dispensing system for fuel delivered to the vehicles. The information in the asset management subsystem, alternatively or additionally, may be used for other purposes, such as to provide data analysis for a specific vehicle or a fleet of vehicles.

The asset management subsystem may support functions through interfaces at the remote system, such as registering and removing assets from the system. Alternatively or additionally, the fuel dispensing system may support addition, deletion or changing information stored in one or more remote subsystems via the components at the point of dispensing. In some embodiments, the remote system may interface with an application executing on a portable electronic device such as a smartphone.

Such an application may be configured, for example, to allow assets to be registered and/or removed from the system in real time or to allow information about an asset to be modified in real time so that the asset management system may have up-to-date information about an asset present at a fuel dispensing station. The inventors have recognized and appreciated that missing or incorrect information about an asset may lead to human errors. When information about an asset is missing or incomplete in the asset management system, the asset management subsystem may not authorize fueling in an asset that is entitled to be fueled. In response, a driver or other operator of the system may attempt to override controls on the system so that the vehicle can be fueled when needed. Overrides may include manually authorizing fuel to be dispensed or charging fuel to an account that is not restricted as to which assets are entitled to be fueled. Overrides introduce the possibilities of errors, such as in type of fuel dispensed to a vehicle or the customer to whom that fuel is charged. These override techniques may also lead to inefficiencies because records must be manually added or changed to reflect the actual transaction after the fact. Accordingly, enabling real-time updates to information about assets may improve efficiency of operation of the system and may enable new functions.

Other subsystems may be implemented within or interact with components at the fuel dispensing sites to determine information about the system to enable functions related to operation and/or maintenance of the system. In some embodiments, components at the fuel dispensing sites may send "heart beat" signals including status information. A maintenance subsystem, for example, may provide real-time monitoring of the system itself and may communicate to the components at the fuel dispensing sites or other components to cause those components to perform repair functions, providing the system with self-healing attributes. For example, commands sent from a maintenance subsystem to computerized components at fuel dispensing sites may cause those computerized components to shut down and startup after operational errors and electricity black-outs. Other commands, for example, may update firmware or software, change configuration settings or cause other remote fix operations.

Some subsystems may also use information exchange with other subsystems and/or components at fuel dispensing sites to perform system management functions. An inventory management subsystem, for example, may receive information from the components at fuel dispensing sites relating to fuel delivered to vehicles or fuel remaining in tanks. This information may be processed within the inventory subsystem to provide information about current inventories, which may be used to trigger deliveries of specific types of fuel to specific fuel dispensing sites when needed.

In some embodiments, the information about current fuel levels may be combined with other information, such as information about historical fuel deliveries, historical fuel usage, and assets enrolled with the system to predict when specific types of fuel will be required at specific sites. These predictions may be used to forecast fuel delivery needs and/or schedule deliveries.

In some embodiments, the components at a fuel dispensing site may be implemented with a small form factor, such as by a controller attached to dispenser, which may be a fuel pump of known design. The controller may be implemented as a printed circuit board that may be wired to the electronics of the fuel dispenser. This wiring may enable the controller to extract information from the dispenser, such as amount of fuel dispensed. Alternatively or additionally, the controller may control the dispenser, such as by enabling the flow of fuel into an authorized asset or disabling the flow of fuel.

In some embodiments, other components may be present at the fuel dispensing sites. For example, a component may be attached to a fuel tank of conventional design. The component attached to the tank may include a sensor, to sense the volume of fuel in the tank and communication and processing circuits to provide reports of the fuel in the tank and to interact with those components to perform the functions as described herein.

FIG. 1 shows an illustrative example of a fuel dispensing site at which the system may be implemented. A controller 101 may be located at a fuel dispenser 104. The controller 101 may be configured to control fuel flow from the fuel dispenser 104 to one or more vehicles 102 and 103. Vehicle 102 and vehicle 103, for example, may have engines that take different types of fuel. In such an embodiment, the controller 101 may be configured to dispense the correct fuel for each vehicle 102 and 103 from the fuel dispenser 104. The fuel dispenser 104 may draw fuel from fuel tanks 105, which may contain one or more different types of fuel. The controller 101 may monitor fuel drawn from fuel tanks 105 and, using information such as historical fuel deliveries, historical fuel usage, and assets enrolled with the inventory management system, may predict when specific types of fuel at fuel tanks 105 will be depleted. These predictions may be used to forecast fuel delivery needs and/or schedule deliveries.

Figure 2:
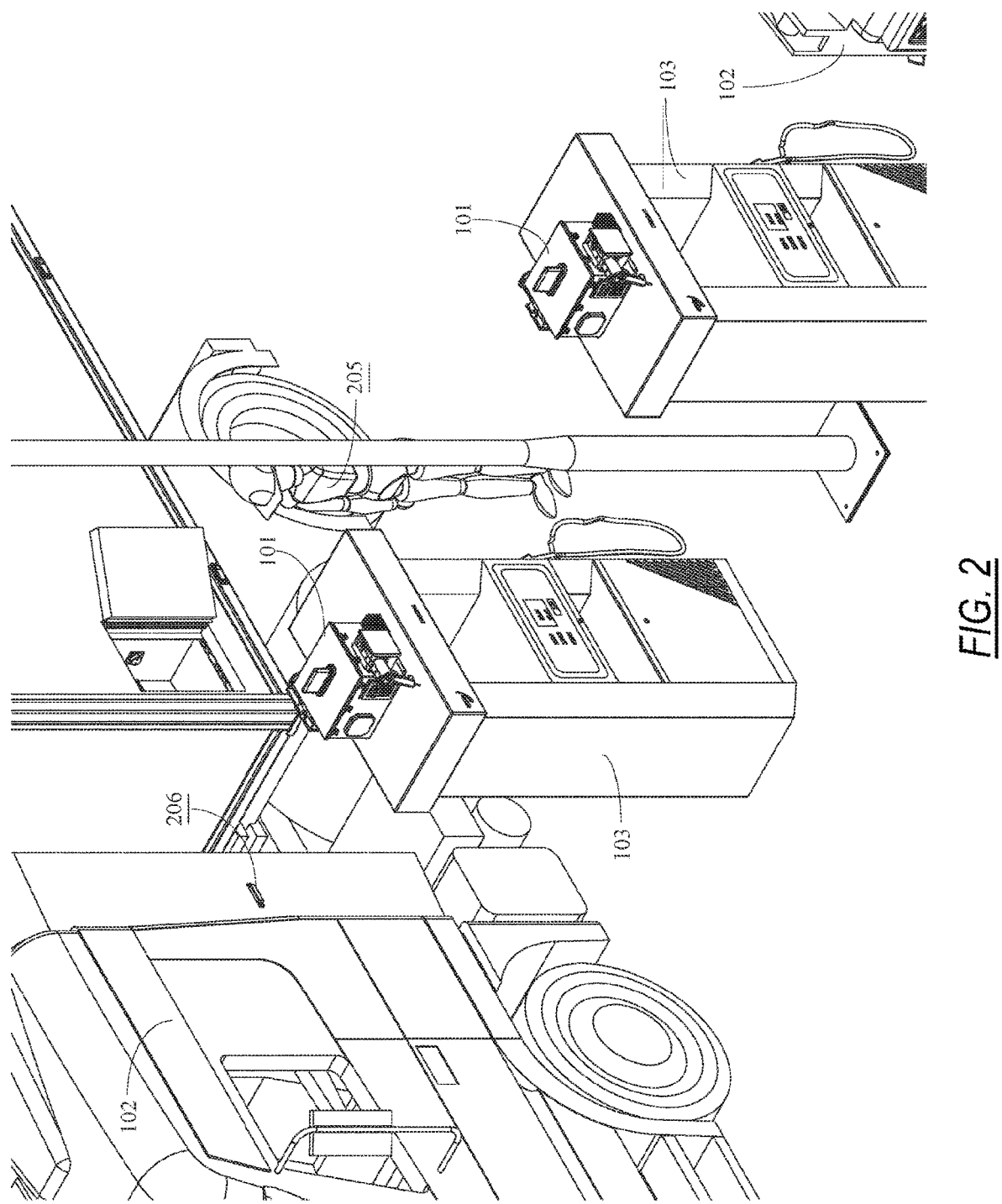
FIG. 2 shows a more detailed view of an exemplary fuel site at which the system may be implemented.

FIG. 2 shows a more detailed view of the fuel site at which the system may be implemented. Operator 205 may be able to interact with the controller 101 to fuel vehicle 102. The controller 101 may be able to communicate with vehicle 102 to gather information about vehicle 102 and facilitate fueling. This may be done, for example, through RFID (Radio Frequency Identification) by the controller 101 recognizing RFID tag 206 on vehicle 102. In other embodiments, the controller 101 may be able to communicate with vehicle 102 via other communication means, such as a barcode reader gun, Bluetooth, a driver-operated keyboard, and a cellular modem.

Figure 3:
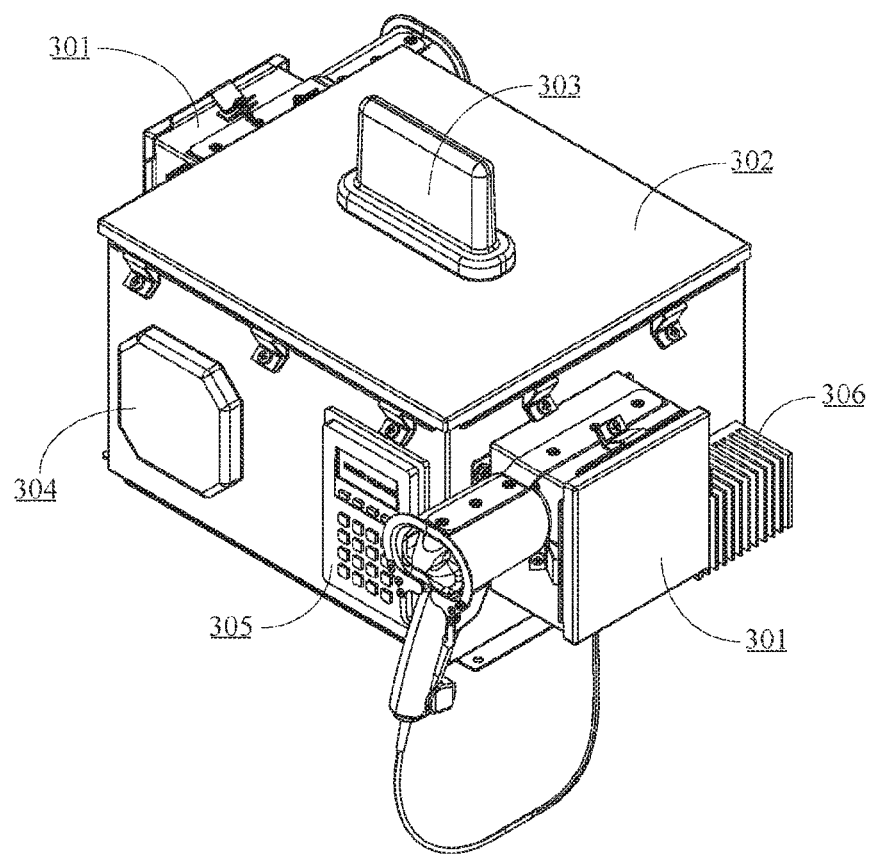
FIG. 3 shows an example configuration of controller 101.

FIG. 3 shows an example configuration of controller 101. Controller 101 may be enclosed by a weather proof enclosure 302. In one example, the controller 101 may recognize a vehicle with a barcode reader. The controller may read a barcode associated with a vehicle with a barcode reader sub-assembly 301. In another example, the controller 101 may recognize a vehicle with an RFID reader 304. In another example, the controller 101 may recognize a vehicle with a user-operated keypad and display 305. The controller may also include a heat sink 306. The controller 101 may communicate with the asset management subsystem to report fueling data for an asset. The controller 101 may communicate with the asset management subsystem via a Wi-Fi antenna sub-assembly 303.

Figure 4:
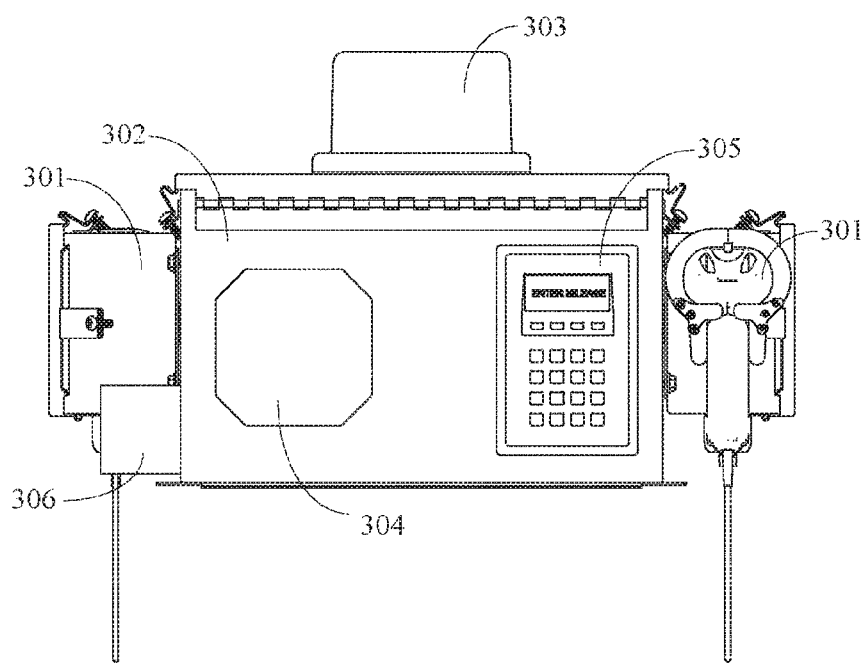
FIG. 4 shows a rear view of the example configuration shown in FIG. 3.

FIG. 4 shows a rear view of the example configuration shown in FIG. 3. In one example, a second set of the barcode reader sub-assembly 301, RFID reader 304, and user-operated keypad and display 305 may exist on the controller 101.

Figure 5:
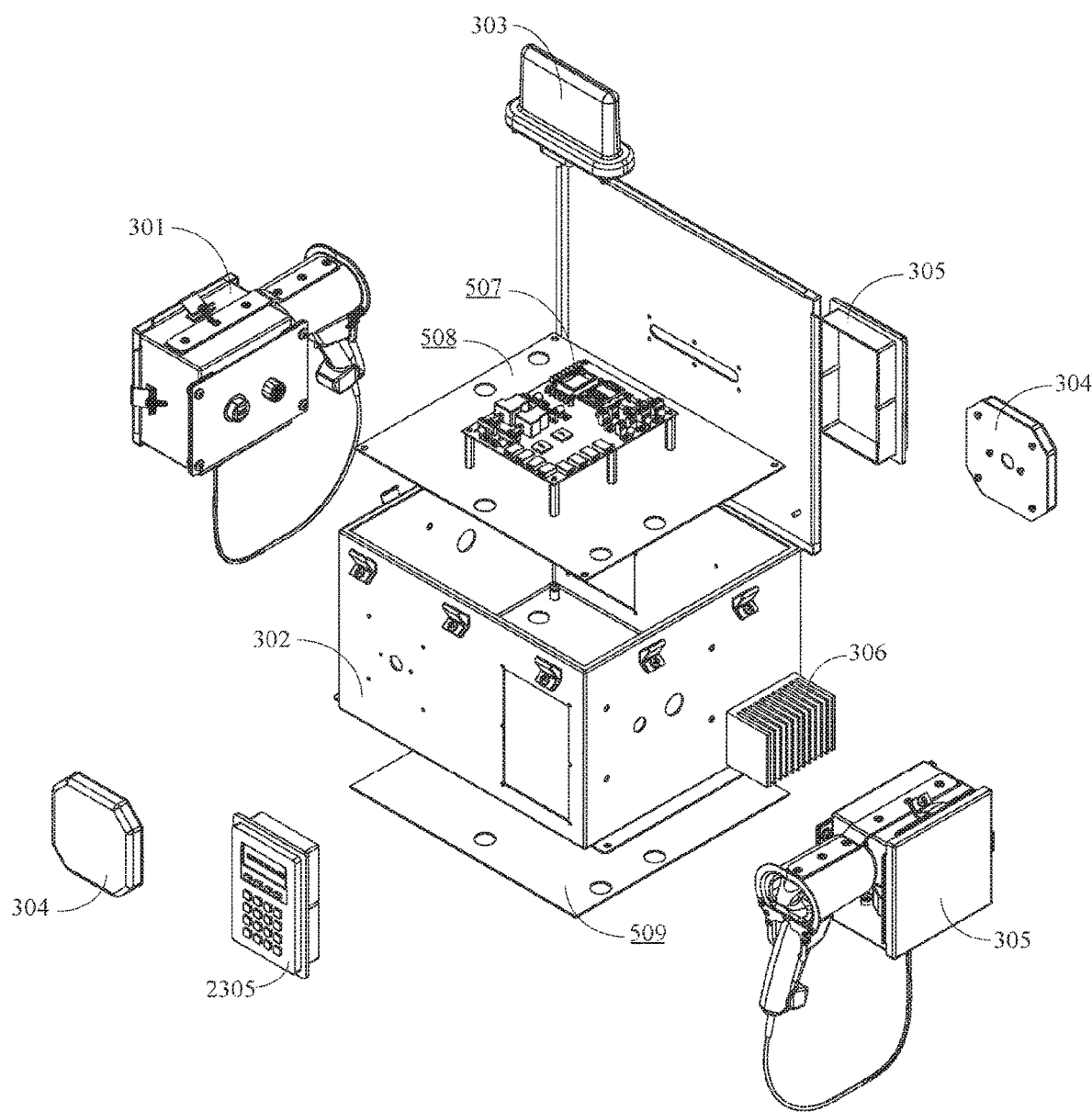
FIG. 5 shows an exploded view of the example configuration shown in FIG. 3.

FIG. 5 shows an exploded view of the example configuration shown in FIG. 3. The configuration may include a PCB (Printed Circuit Board) 507 mounted on a sub panel 508. The PCB 507 may be wired to the electronics of the fuel dispenser 104. This wiring may enable the controller 101 to extract information from the dispenser, such as the amount of fuel dispensed. Alternatively, the PCB 507 may be configured to enable the controller 101 to control the fuel dispenser 104, such as by enabling flow of fuel into an authorized asset or disabling the flow of fuel. The PCB 507 may also be configured to enable the controller 101 to communicate information about a fueling event to the asset management subsystem. The configuration may also include a rubber gasket 509 on the bottom of the controller 101 designed to create a weather proof seal between the controller 101 and a fuel dispenser 102.

Figure 6:
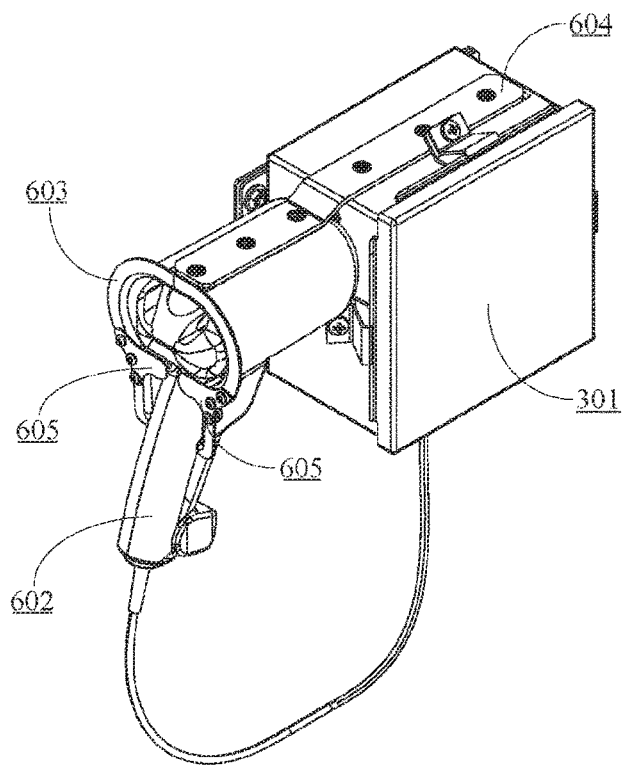
FIG. 6 shows a detailed view of an example configuration of a barcode reader sub-assembly 301.

FIG. 6 shows a detailed view of an example configuration of a barcode reader sub-assembly 301. The barcode reader sub-assembly may include a barcode reader gun 602. In some embodiments, the controller 101 may communicate with vehicle 102 via the barcode reader gun 602. The barcode reader gun 602 may recognize vehicle 102 and signal to controller 101 that vehicle 102 is authorized for fueling. The barcode reader sub-assembly may also include a plastic gun holster 603 to hold the barcode reader gun 602. The plastic gun holster 603 may be held to the controller 101 by a holster strap 604. The barcode reader sub-assembly 301 may also include spring steel flaps 605 to help hold the barcode reader gun 602 in the plastic gun holster 603.

Figure 7:
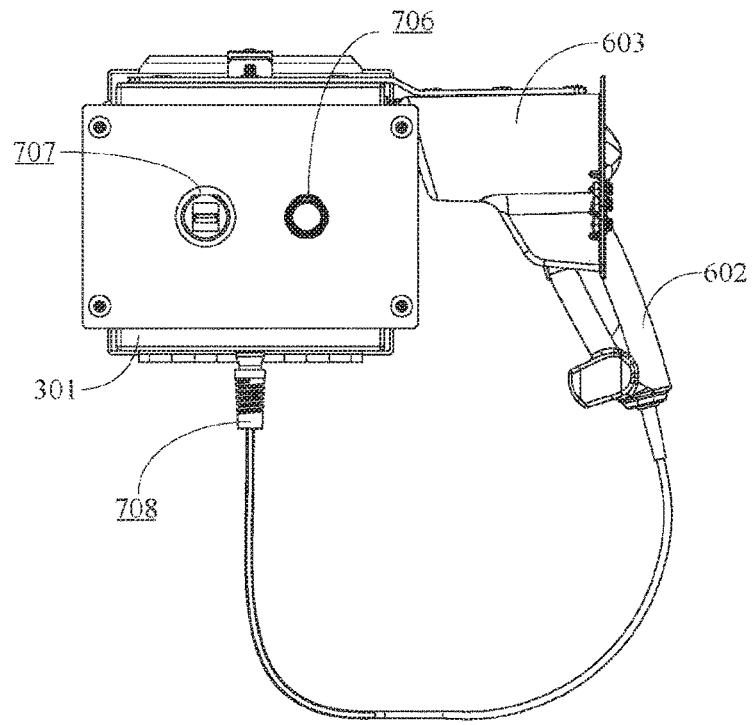
FIG. 7 shows a side view of the example configuration shown in FIG. 6.

FIG. 7 shows a side view of the example configuration shown in FIG. 6. The barcode reader sub-assembly 301 may include a cable conduit chase 706, which may allow for the connection of power cables. The example configuration may also include a USB conduit chase 707, which may connect the barcode reader sub-assembly 301 to the controller 101. The barcode reader sub-assembly 301 may communicate information with controller 101 via the USB conduit chase 707, such as whether or not a vehicle is authorized for fueling. There also may be a strain relief 708.

Figure 8:
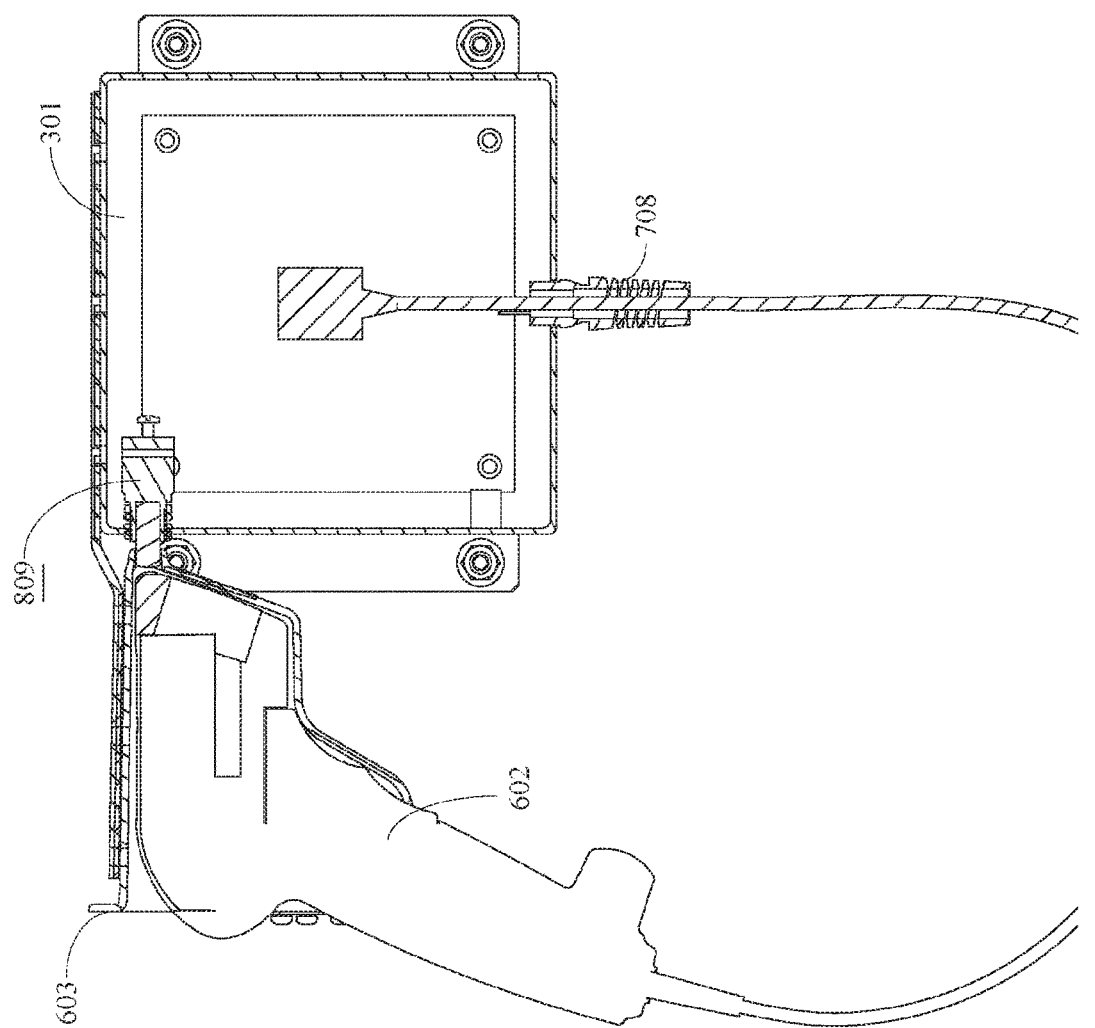
FIG. 8 shows an inside view of the example configuration shown in FIG. 6.

FIG. 8 shows an inside view of the example configuration shown in FIG. 6. The barcode reader sub-assembly 301 may include a micro-switch 809, which may indicate to the controller 101 if the barcode reader gun 602 is inside the plastic gun holster 603. In some embodiments, if the micro-switch 809 indicates to the controller 101 that the barcode reader gun 602 is not inside the plastic gun holster 603, the controller 101 may not allow fueling to occur. In some embodiments, the controller 101 may only authorize fueling if the micro-switch 809 indicates that the barcode reader gun 602 is inside the plastic gun holster 603. This may avoid damage to barcode reader gun 602, or other equipment, as it eliminates the possibility of a user forgetting to re-holster the barcode reader gun 602 after authorizing a vehicle.

In some embodiments, the barcode reader gun 602 may be configured to recognize a vehicle 102 and the controller 101 may access information from the asset management subsystem relating to vehicle 102. The information may include a type of fuel for the vehicle. The information may also include a size of a fuel tank for the vehicle 102. In such an embodiment, the controller 101, based on the information accessed by the barcode reader gun 602, may selectively enable fuel from fuel dispenser 104 to vehicle 102.

Figure 9:
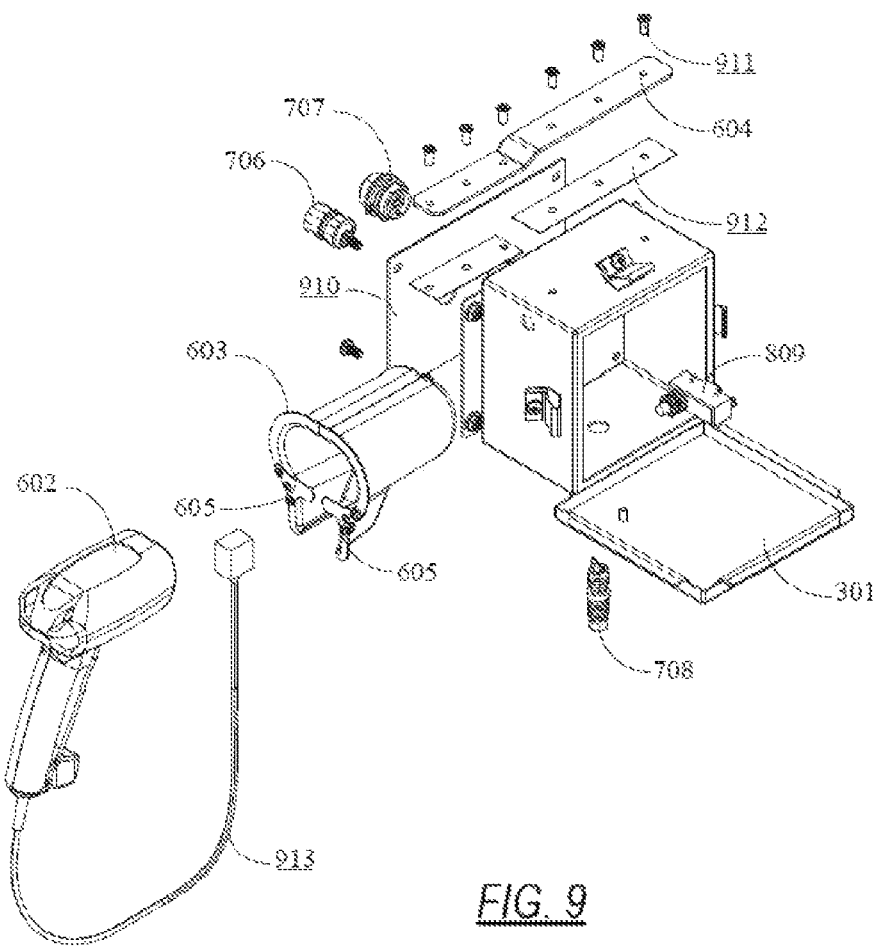
FIG. 9 shows an exploded view of the example configuration shown in FIG. 6.

FIG. 9 shows an exploded view of the example configuration shown in FIG. 6. The barcode reader sub-assembly 301 may include a rubber gasket 910 designed to create a weather proof seal between the barcode reader sub-assembly 301 and the controller 101. The barcode reader sub-assembly 301 may also include rivets 911 used to fasten the holster strap 604 to the barcode reader sub-assembly 301. There also may be included flat gaskets 912. The configuration may also include a cable 913 to couple the barcode reader gun 602 to the barcode reader sub-assembly 301.

Figure 10:
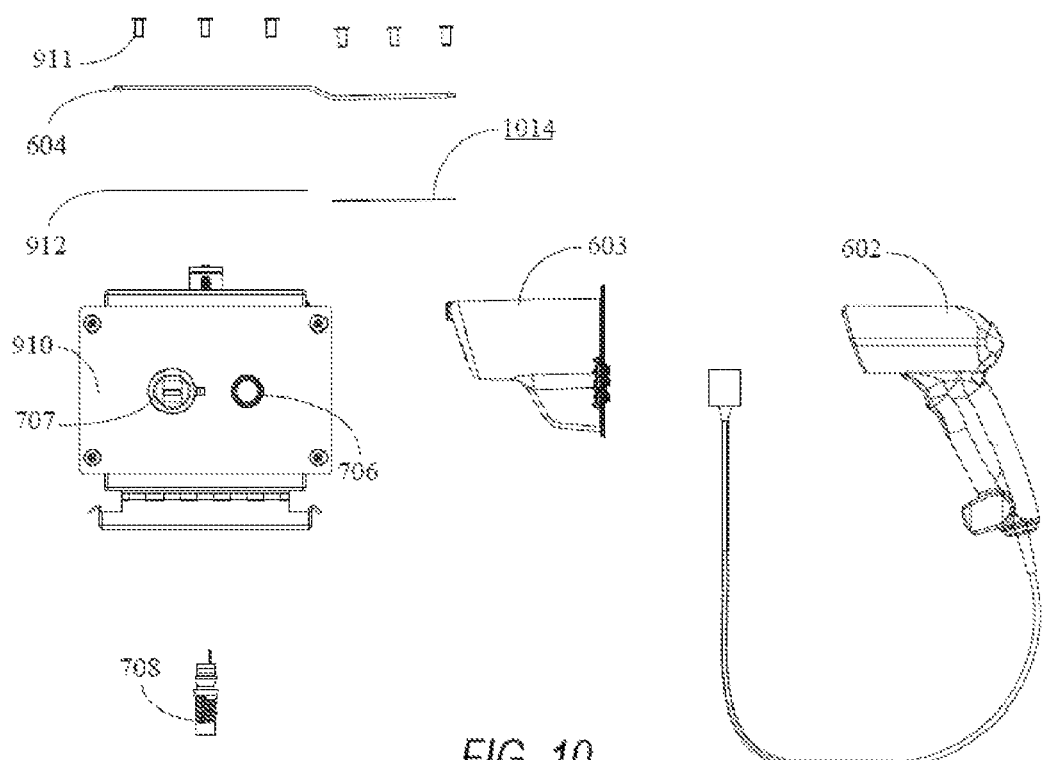
FIG. 10 shows a side view of the exploded view shown in FIG. 9.

FIG. 10 shows a side view of the exploded view shown in FIG. 9. The barcode reader sub-assembly 301 may include additional gaskets 1014 designed to assist in making the barcode reader sub-assembly 301 weather proof.

Figure 11:
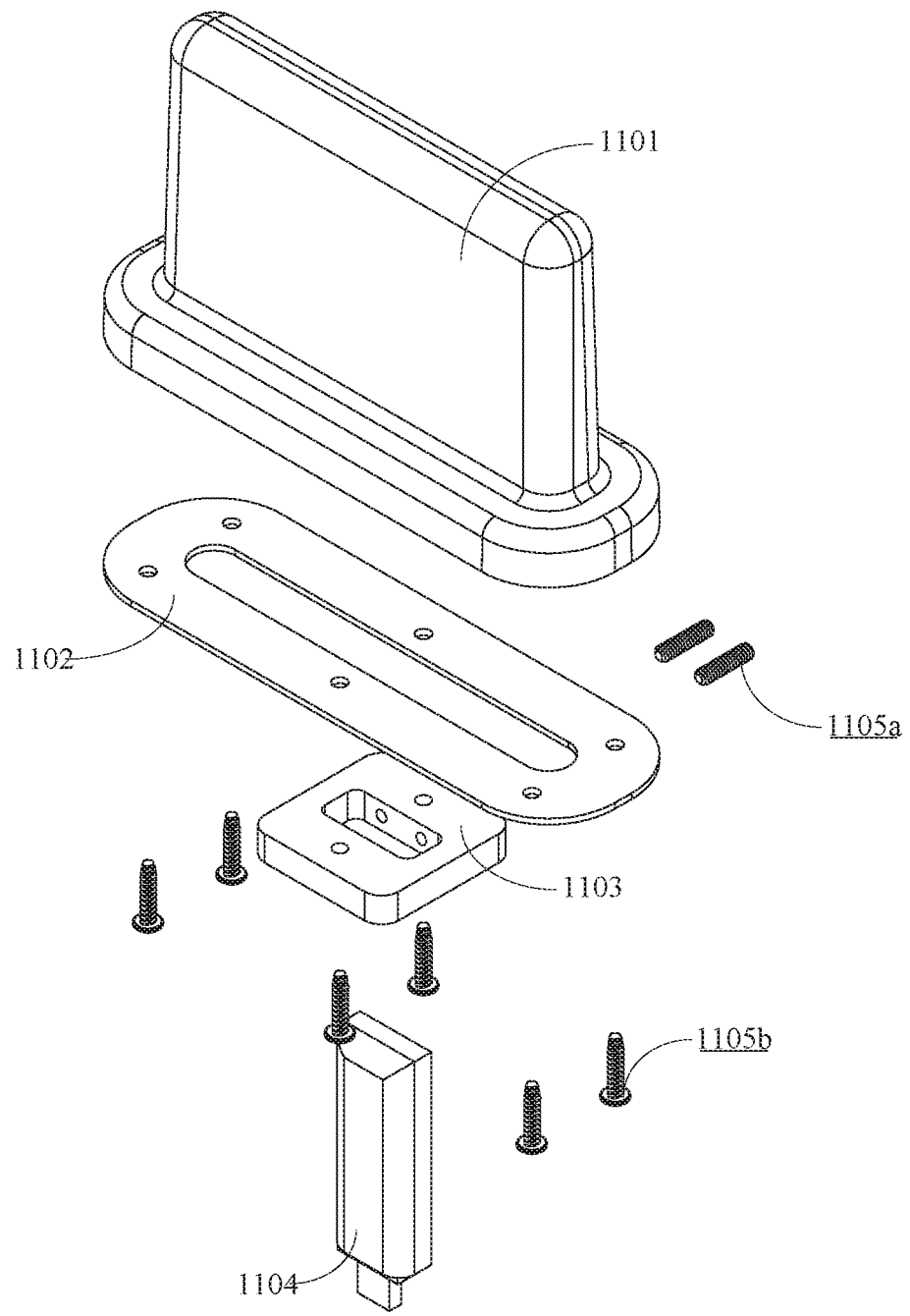
FIG. 11 shows an exploded view of an example configuration of the Wi-Fi antenna sub-assembly 303.

FIG. 11 shows an exploded view of an example configuration of the Wi-Fi antenna sub-assembly 303. In some embodiments, the controller 101 may communicate with the asset management subsystem or the inventory management subsystem via the Wi-Fi antenna sub-assembly 303. The Wi-Fi antenna sub-assembly 303 may communicate information from a fueling event to the asset management subsystem, such as asset fueled, amount of fuel dispensed, and type of fuel dispensed. The Wi-Fi antenna sub-assembly 303 may also communicate with the inventory management subsystem to allow the controller 101 to monitor fuel levels of a fuel tank located at a fuel station. The controller 101 may indicate to the inventory management subsystem that the fuel level of the fuel tank is below a threshold and needs to be refilled. The controller may also be configured to indicate a future time for fuel delivery to the fuel station based on historical data relating to fuel consumption. The configuration may include a main housing 1101 for the Wi-Fi antenna sub-assembly 303. There may also be a rubber gasket 1102 designed to create a weather proof seal between the Wi-Fi antenna sub-assembly 303 and the controller 101. The configuration may also include an aluminum bracket 1103, designed to secure a Wi-Fi antenna modem 1104 in the main housing 1101. The configuration may also include screws 1105a and 1105b designed to hold the Wi-Fi antenna sub-assembly 303 together.

Figure 12:
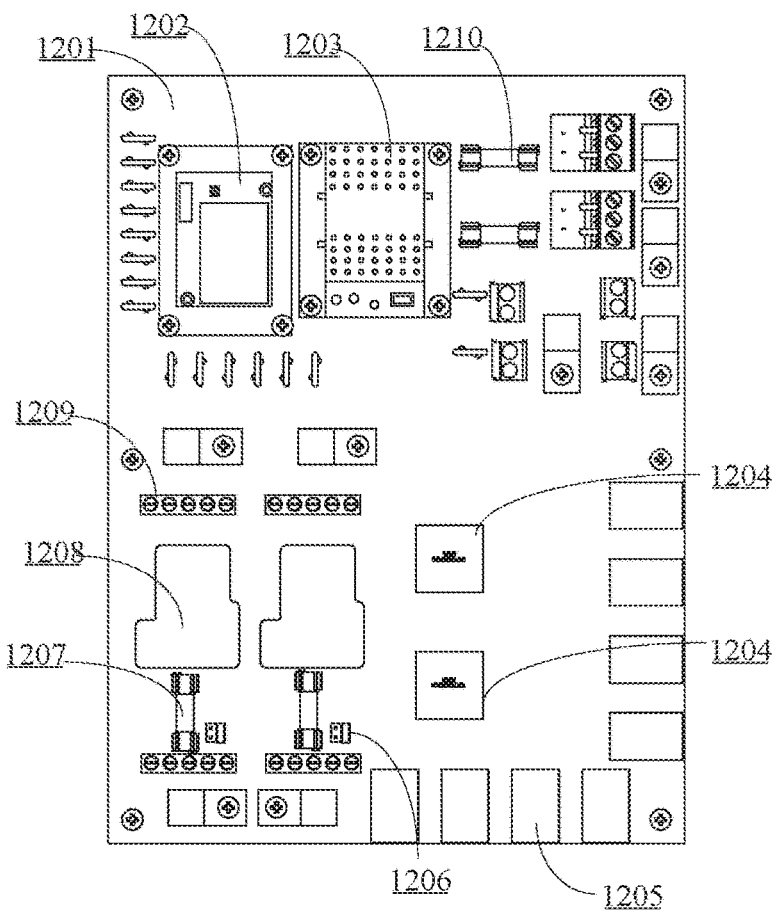
FIG. 12 shows a top view of an example configuration of the PCB 507 in the controller 101.

FIG. 12 shows a top view of an example configuration of the PCB 507 in the controller 101. FIG. 12 shows components such that the controller 101 may be correctly implemented. The example configuration may include a motherboard 1201 on which all components of the PCB 507 are located. There may be a microprocessor daughterboard 1202, an RFID reader daughterboard 1203, a serial controller for multiple I/O 1204, USB connectors 1205, replaceable fuses 1206, relays 1207, serial barcode readers 1208, and an array of digital I/O resettable fuses 1209.

Figure 13:
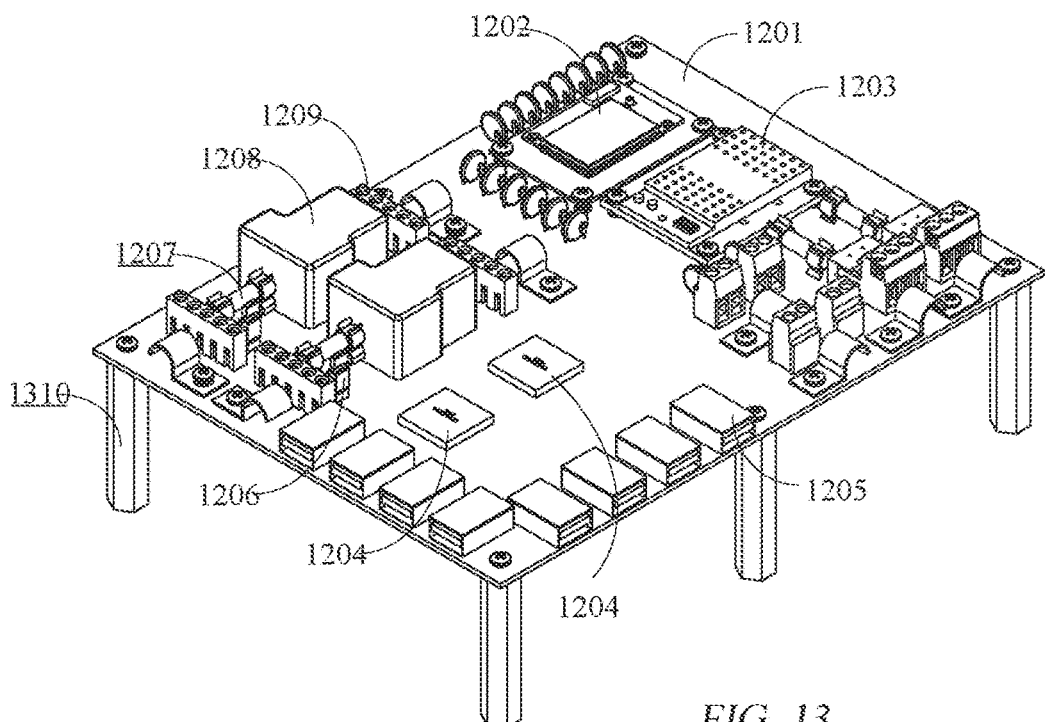
FIG. 13 shows an isometric view of the example configuration shown in FIG. 12.

FIG. 13 shows an isometric view of the example configuration shown in FIG. 12. The PCB 507 may be mounted on legs 1310.

Figure 14:
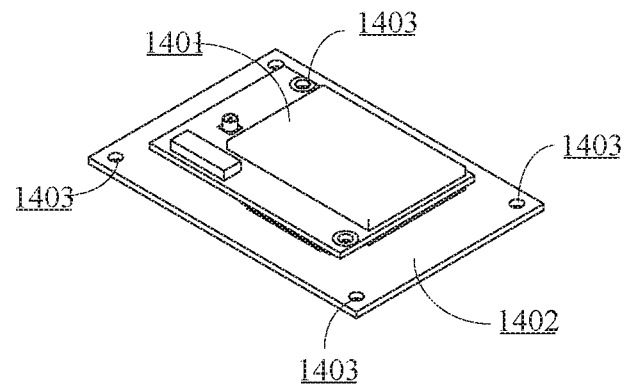
FIG. 14 shows a view of the microprocessor daughterboard 1202.

FIG. 14 shows a view of the microprocessor daughterboard 1202. The microprocessor daughterboard 1202 may include a microprocessor chipset 1401, a daughterboard 1402, and mounting holes 1403 designed to hold the microprocessor daughterboard 1202 to the PCB motherboard 1201. The microprocessor chipset 1401 may be programmed to enable the controller 101 to perform the functions previously described.

Figure 15:
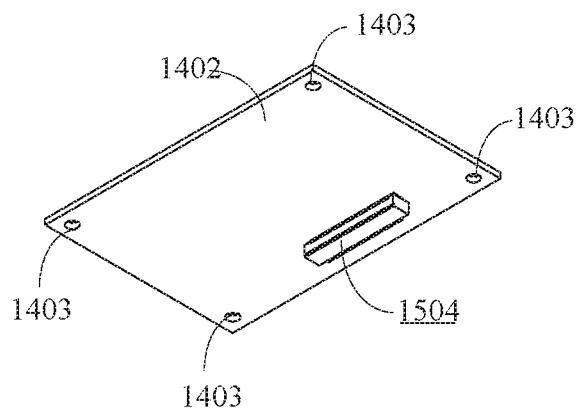
FIG. 15 shows a view of the underside of the microprocessor daughterboard 1202.

FIG. 15 shows a view of the underside of the microprocessor daughterboard 1202. There may be included a connector 1504 designed to communicate information from the microprocessor daughterboard 1202 to the PCB motherboard 1201.

Figure 16:
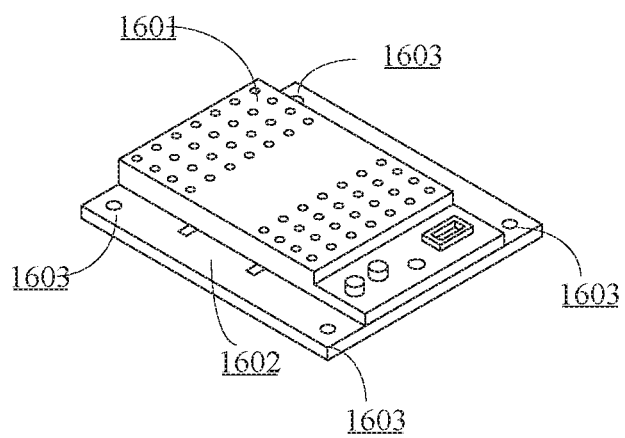
FIG. 16 shows a view of the RFID reader daughterboard 1203.

FIG. 16 shows a view of the RFID reader daughterboard 1203. The RFID reader daughterboard 1203 may include a processing chipset 1601, a daughterboard 1602, and mounting holes 1603 designed to hold the RFID reader daughterboard 1203 to the PCB motherboard 1201. The processing chipset 1601 may be programmed to enable RFID reader 304 to communicate with an RFID tag 206 on vehicle 102. This communication may allow controller 101 to recognize vehicle 102 and authorize fueling.

Figure 17:
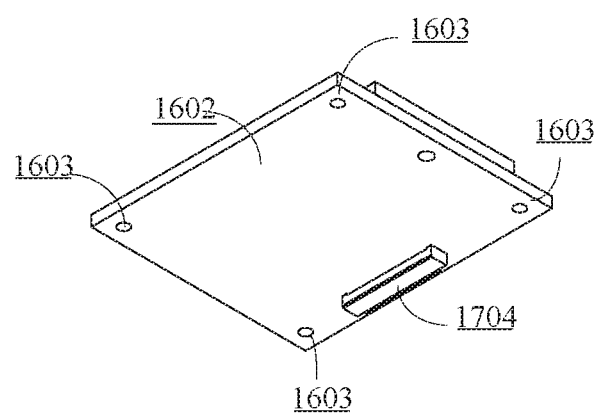
FIG. 17 shows a view of the underside of the RFID reader daughterboard 1203.

FIG. 17 shows a view of the underside of the RFID reader daughterboard 1203. There may be included a connector 1704 designed to communicate information from the RFID reader daughterboard 1203 to the PCB motherboard 1201.

In some embodiments, a user may be able to access the asset management subsystem on a mobile device. The asset management subsystem may present the user with various user interfaces on the mobile device, allowing the user to navigate through the asset management subsystem and perform the functions mentioned above, such as registering or removing assets as well as viewing fueling information.

A site operating user may also be able to access the inventory management subsystem on a mobile device. The inventory management subsystem may present the user with various user interfaces on the mobile device, allowing the site operating user to navigate through the inventory management subsystem and perform the functions mentioned above, such as reviewing fuel levels in fuel tanks at fuel dispensing sites and managing deliveries of fuel to specific fuel dispensing sites when needed.

Figure 18:
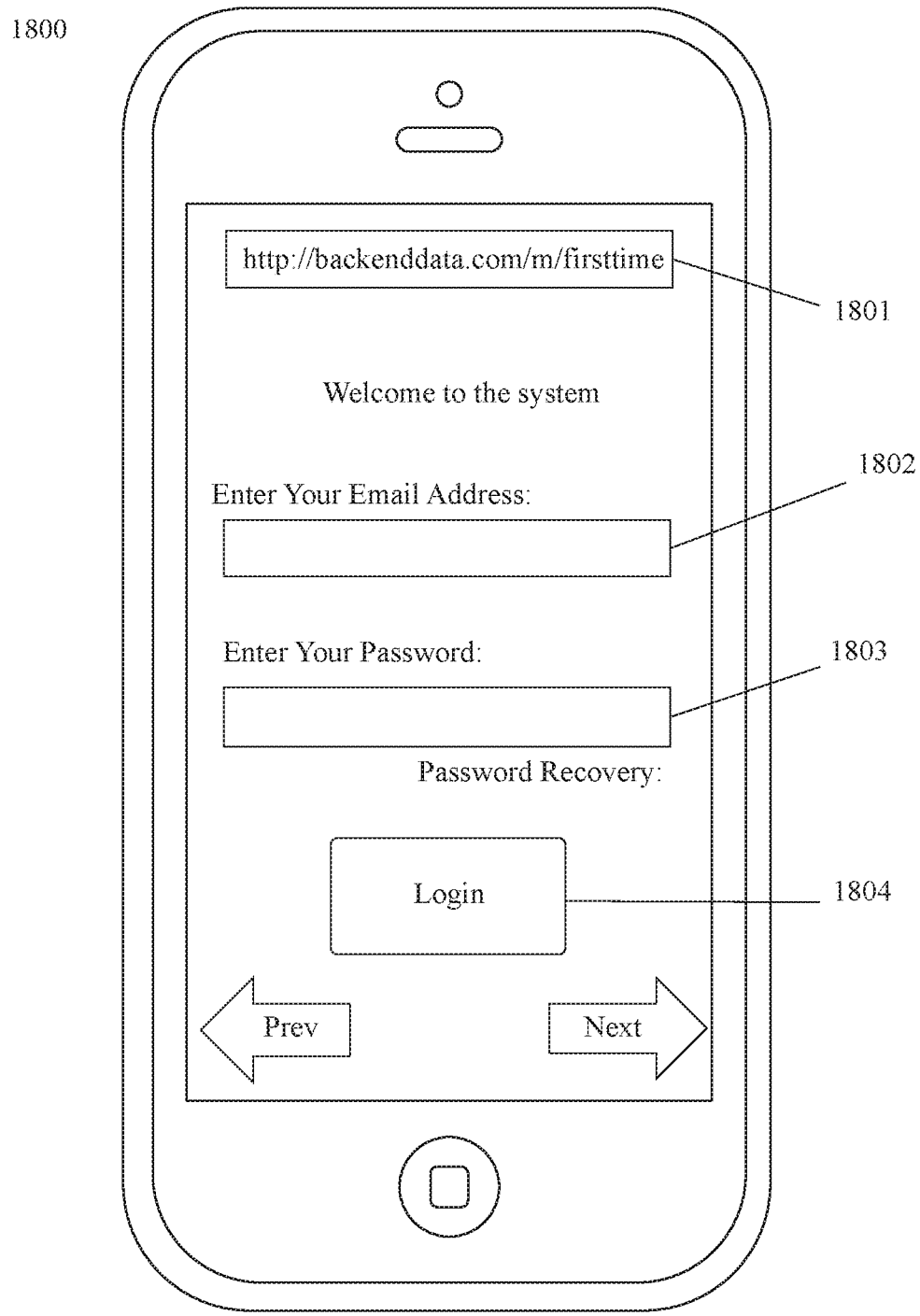
FIG. 18 shows a user interface 1800 on a mobile device that allows a user to log into the asset management subsystem.

FIG. 18 shows a user interface 1800 on a mobile device that allows a user to log into the asset management subsystem. User interface 1800 may include an address field 1801, an email address field 1802, a password field 1803, and a login button 1804. A user may enter an email address into email address field 1802, a password into password field 1803, and then click the login button 1804 to log into the asset management subsystem.

Figure 19:
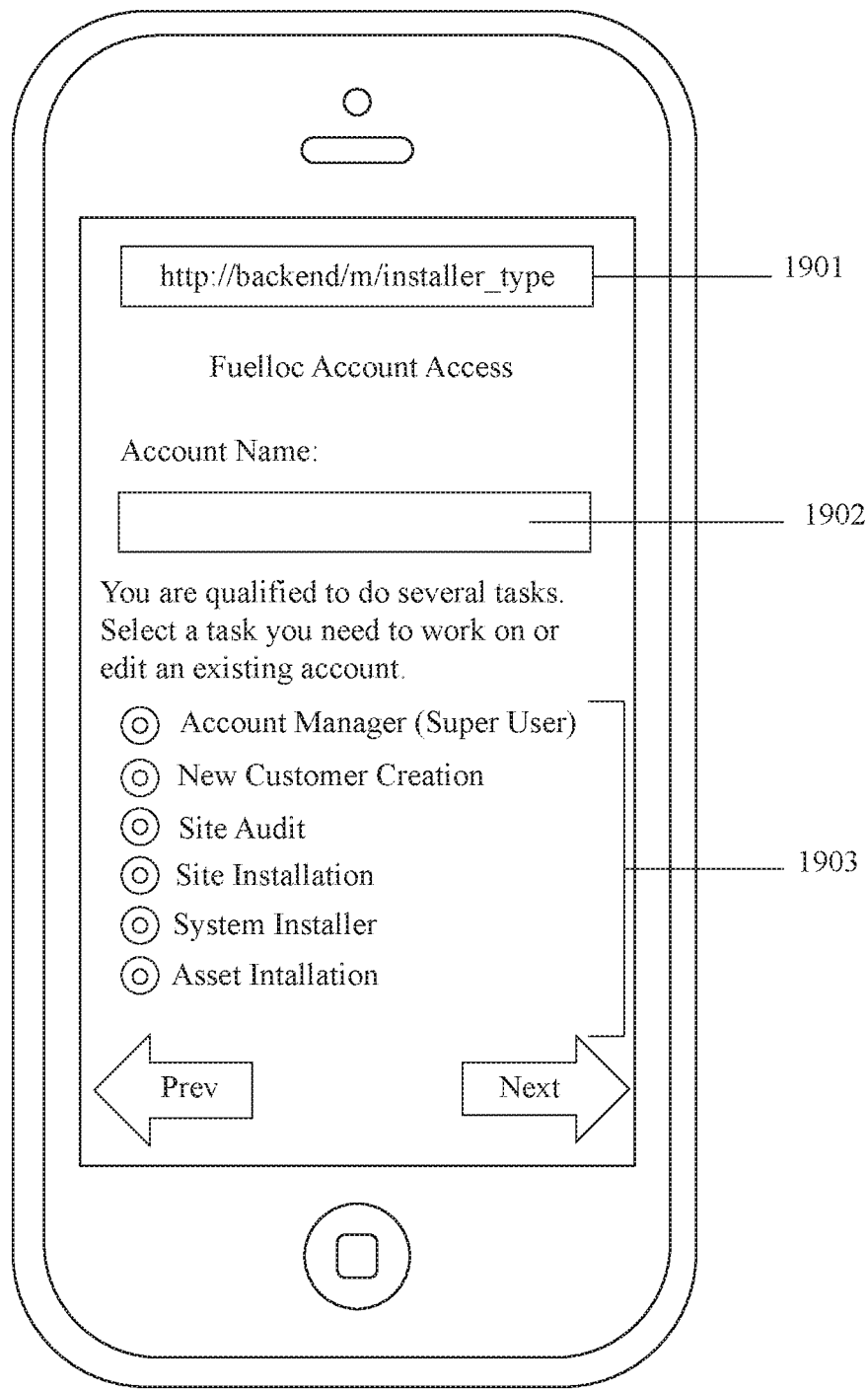
FIG. 19 shows a user interface 1900 on a mobile device that displays a user's home screen in the asset management subsystem.

FIG. 19 shows a user interface 1900 on a mobile device that displays a user's home screen in the asset management subsystem. User interface 1900 may include an address field 1901, an account name field 1902, and a list of options 1903 from which the user can select a task to perform.

Figure 20:
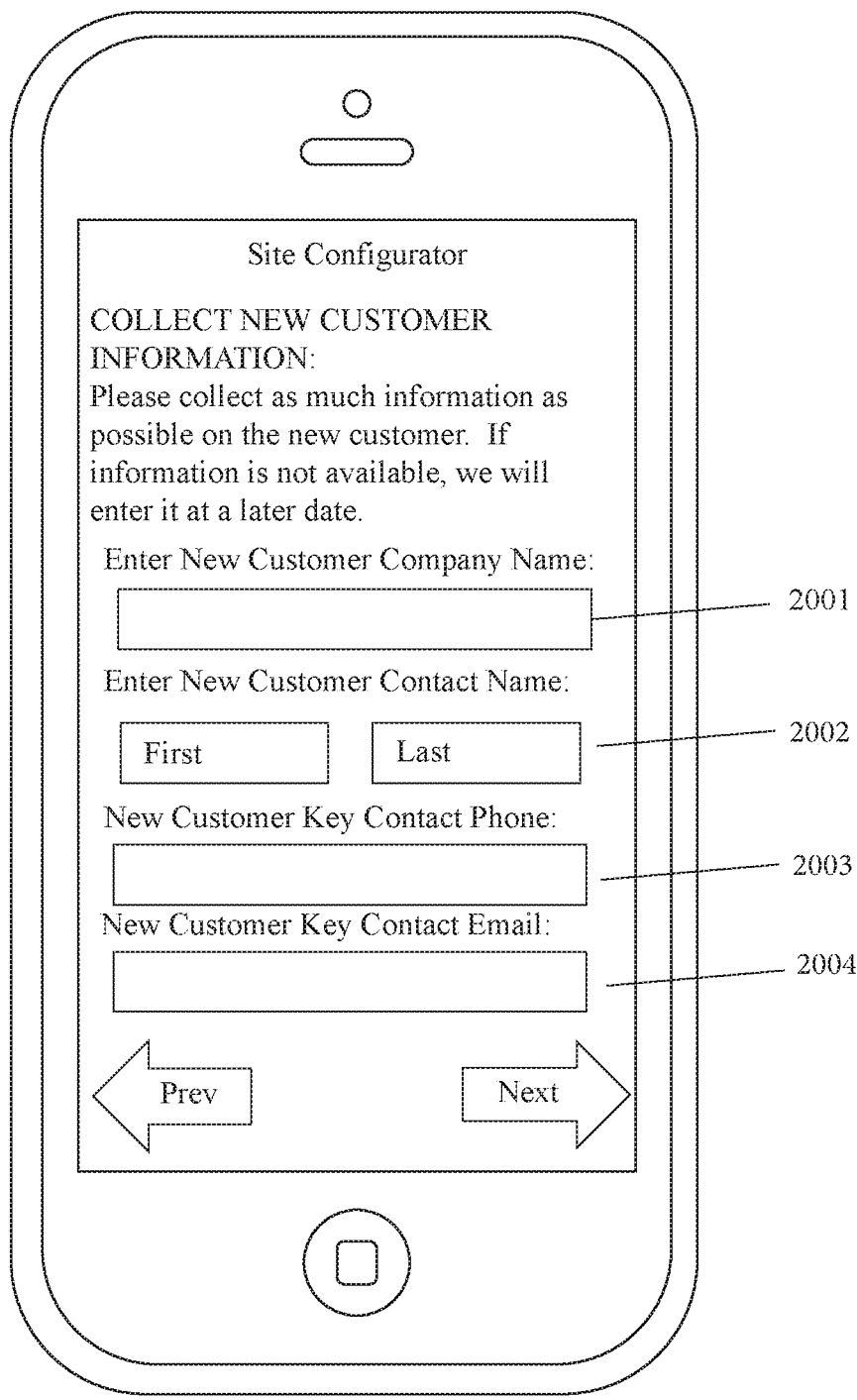
FIG. 20 shows a user interface 2000 on a mobile device that allows a user to add or update customer information in the asset management subsystem.

FIG. 20 shows a user interface 2000 on a mobile device that allows a user to add or update customer information in the asset management subsystem. User interface 2000 may include a customer company name field 2001, a customer contact name field 2002, a customer key contact phone field 2003, and a customer key contact email field 2004. A user may add or update customer information in the asset management subsystem by entering a customer company name into customer company name field 2001, a customer contact name into customer contact name field 2002, a customer key contact phone number into customer key contact phone field 2003, and a customer key contact email address into customer key contact email field 2004.

Figure 21:
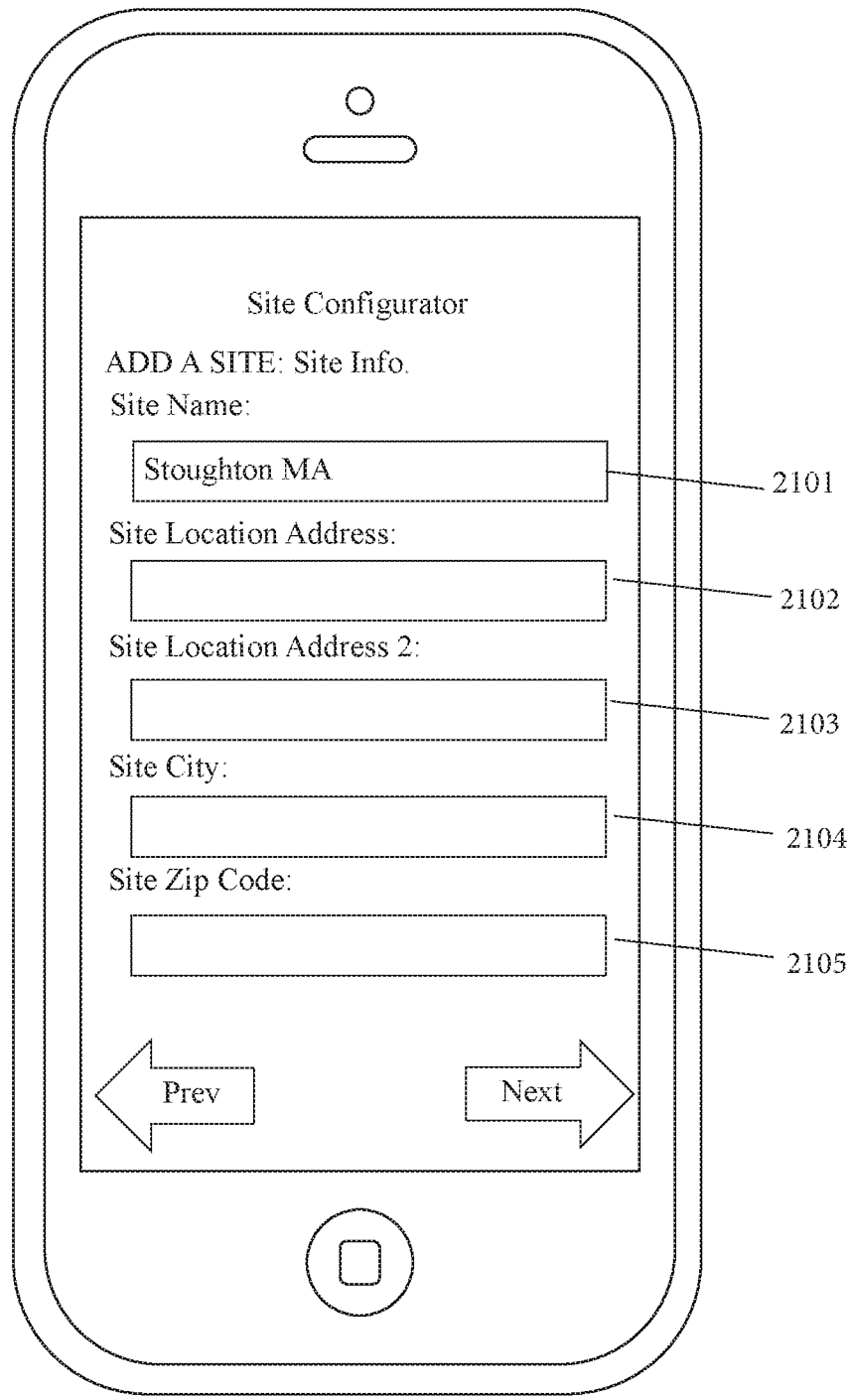
FIG. 21 shows a user interface 2100 on a mobile device that allows a site operating user to add a new site to the inventory management subsystem.

FIG. 21 shows a user interface 2100 on a mobile device that allows a site operating user to add a new site to the inventory management subsystem. User interface 2100 may include a site name field 2101, a site location address field 2102, a second site location address field 2103, a site city field 2104, and a site zip code field 2105. A user may add a new site to the inventory management subsystem by entering a site name into the site name field 2101, a site location address into the site location address field 2102, a second site location address into second site location address field 2103, a site city field into site city field 2104, and a site zip code into site zip code field 2105.

Figure 22:
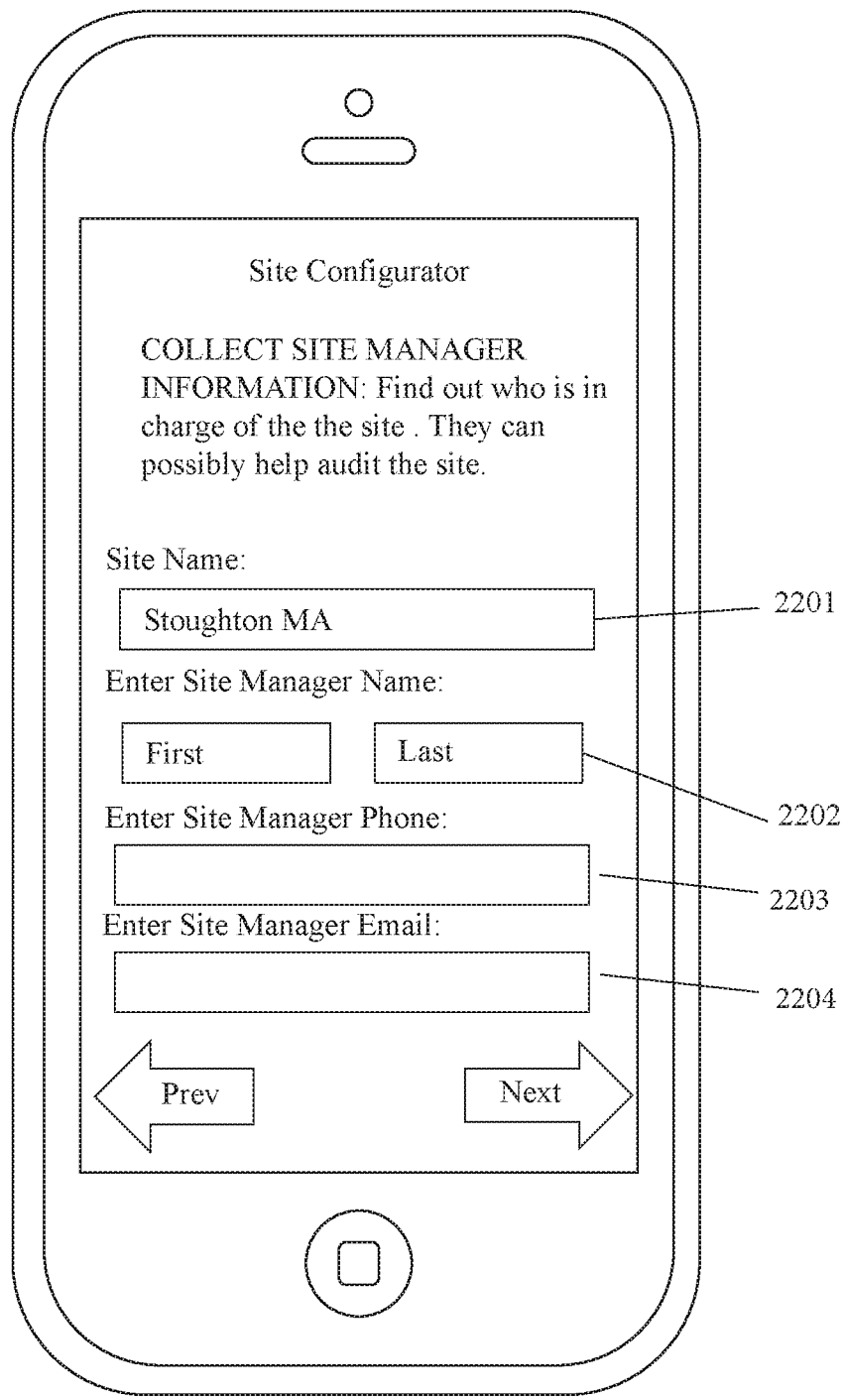
FIG. 22 shows a user interface 2200 on a mobile device that allows a site operating user to gather information about a site, such as the site name and information about the site manager, from the inventory management subsystem.

FIG. 22 shows a user interface 2200 on a mobile device that allows a site operating user to gather information about a site, such as the site name and information about the site manager, from the inventory management subsystem. User interface 2200 may include a site name field 2201, a site manager name field 2202, a site manager phone field 2203, and a site manager email field 2204.

Figure 23:
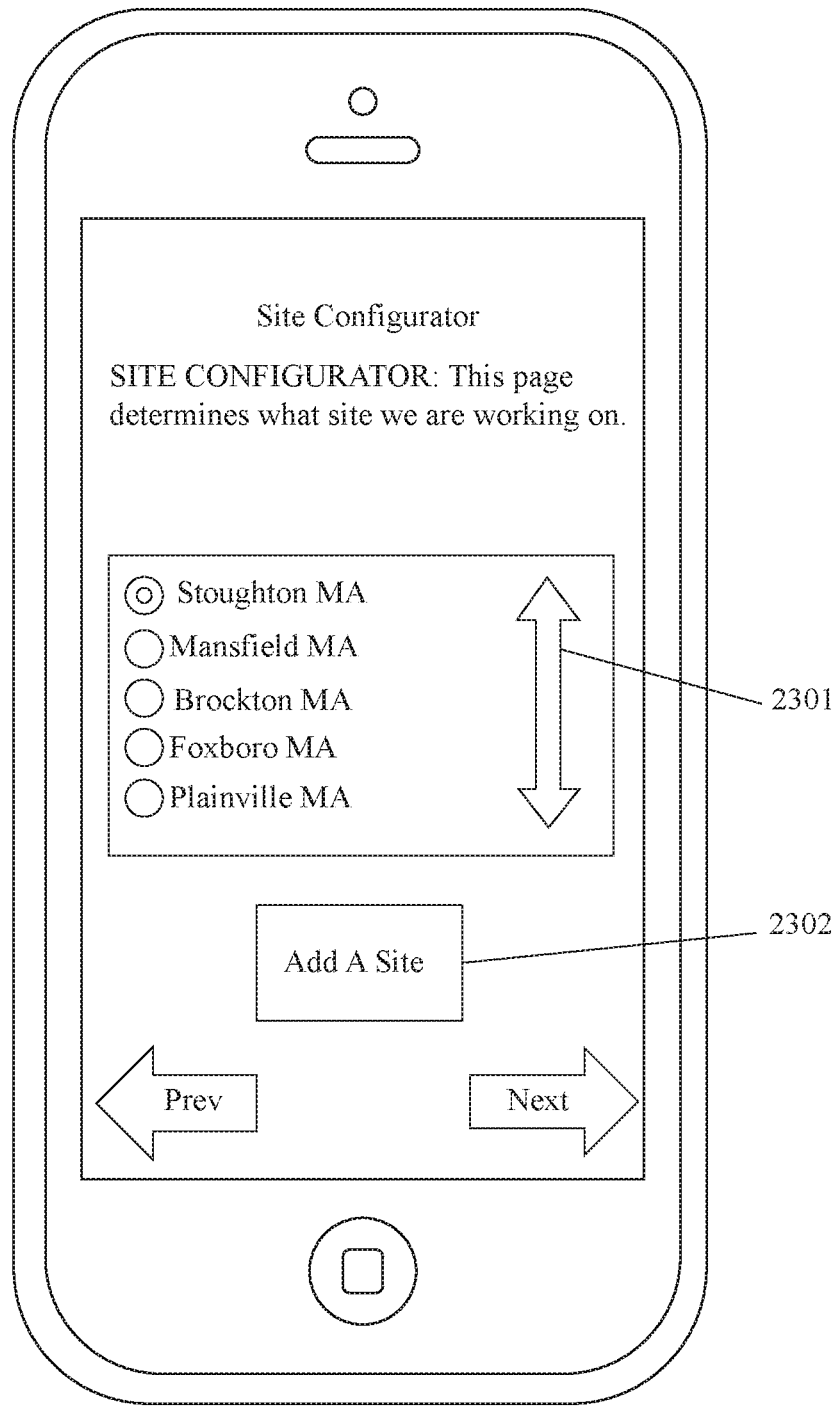
FIG. 23 shows a user interface 2300 on a mobile device that allows a site operating user to manage their various sites in the inventory management subsystem.

FIG. 23 shows a user interface 2300 on a mobile device that allows a site operating user to manage their various sites in the inventory management subsystem. User interface 2300 may include a list of sites 2301 from which the user can select a site, and an add site button 2302. User interface 2300 may provide a user with information about a site, such as remaining fuel and historical information regarding fuel dispensing rates, to assist a user in managing the site, such as by helping a user plan fuel deliveries to the site when needed.

Figure 24:
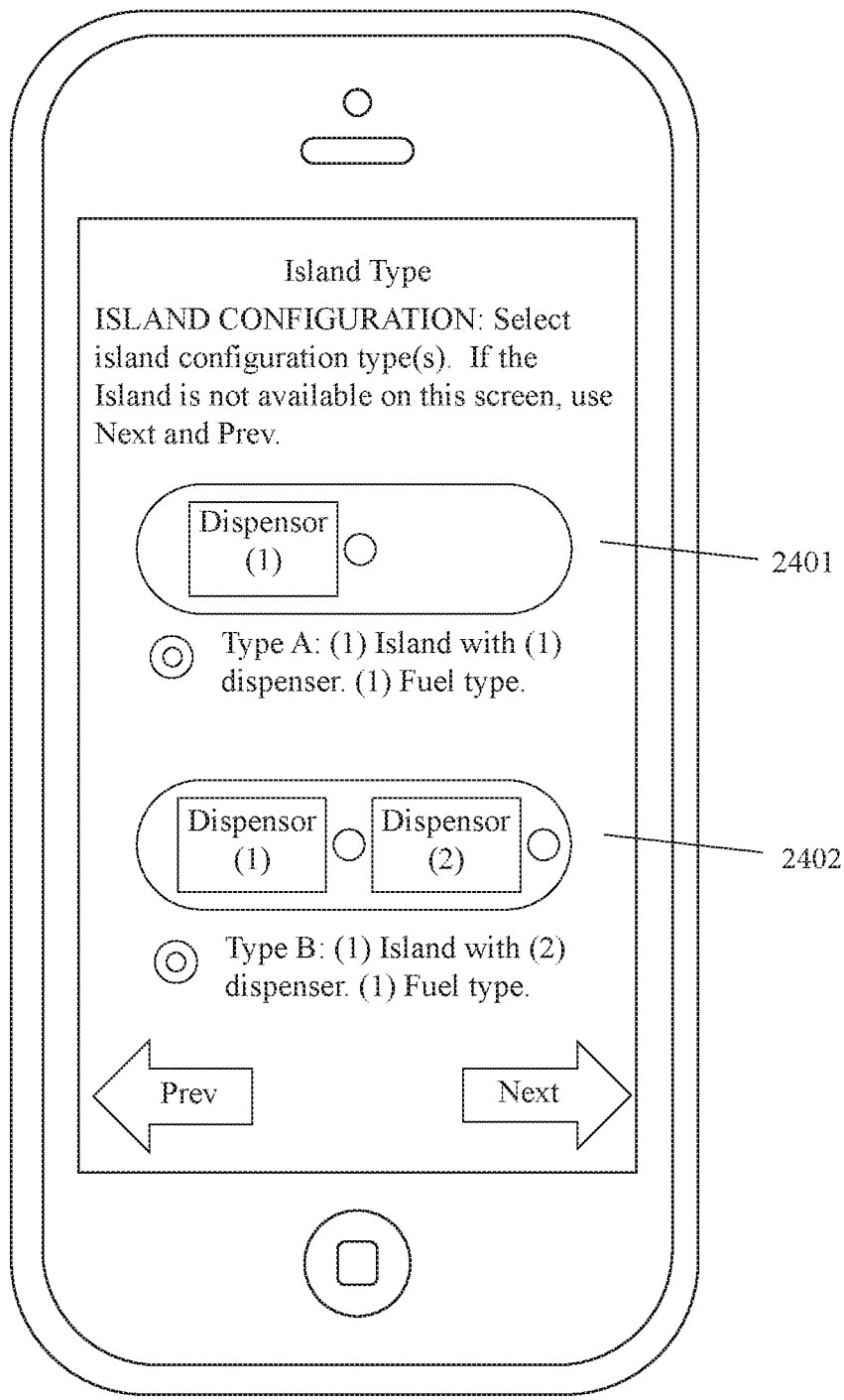
FIG. 24 shows a user interface 2400 on a mobile device that allows a site operating user to enter the configuration of a fueling site.

FIG. 24 shows a user interface 2400 on a mobile device that allows a site operating user to enter the configuration of a fueling site. User interface 2400 may include a display of a type A fuel site 2401 and a display of a type B fuel site 2402. A type A fuel site comprises one island with one dispenser and one fuel type. A type B fuel site comprises one island with two dispensers and one fuel type. In user interface 2400, a user may select if a site is a type A fuel site or a type B fuel site, and this information may be stored in the inventory management subsystem.

Figure 25:
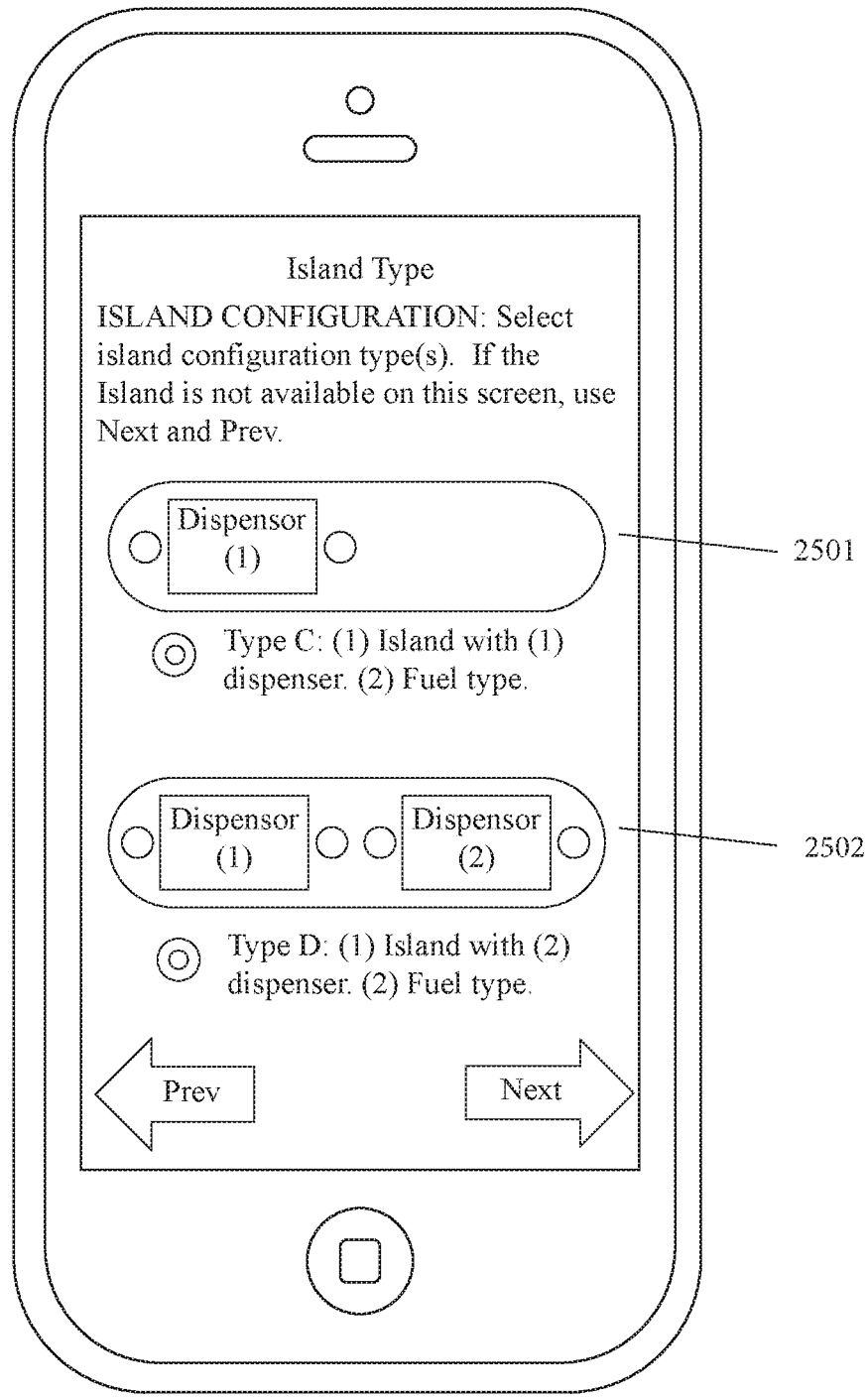
FIG. 25 shows a user interface 2500 on a mobile device that allows a site operating user to enter the configuration of a fueling site.

FIG. 25 shows a user interface 2500 on a mobile device that allows a site operating user to enter the configuration of a fueling site. User interface 2500 may include a display of a type C fuel site 2501 and a display of a type D fuel site 2502. A type C fuel site comprises one island with one dispenser and two fuel types. A type D fuel site comprises one island with two dispensers and two fuel types. In user interface 2500, a user may select if a site is a type C fuel site or a type D fuel site, and this information may be stored in the inventory management subsystem.

Figure 26:
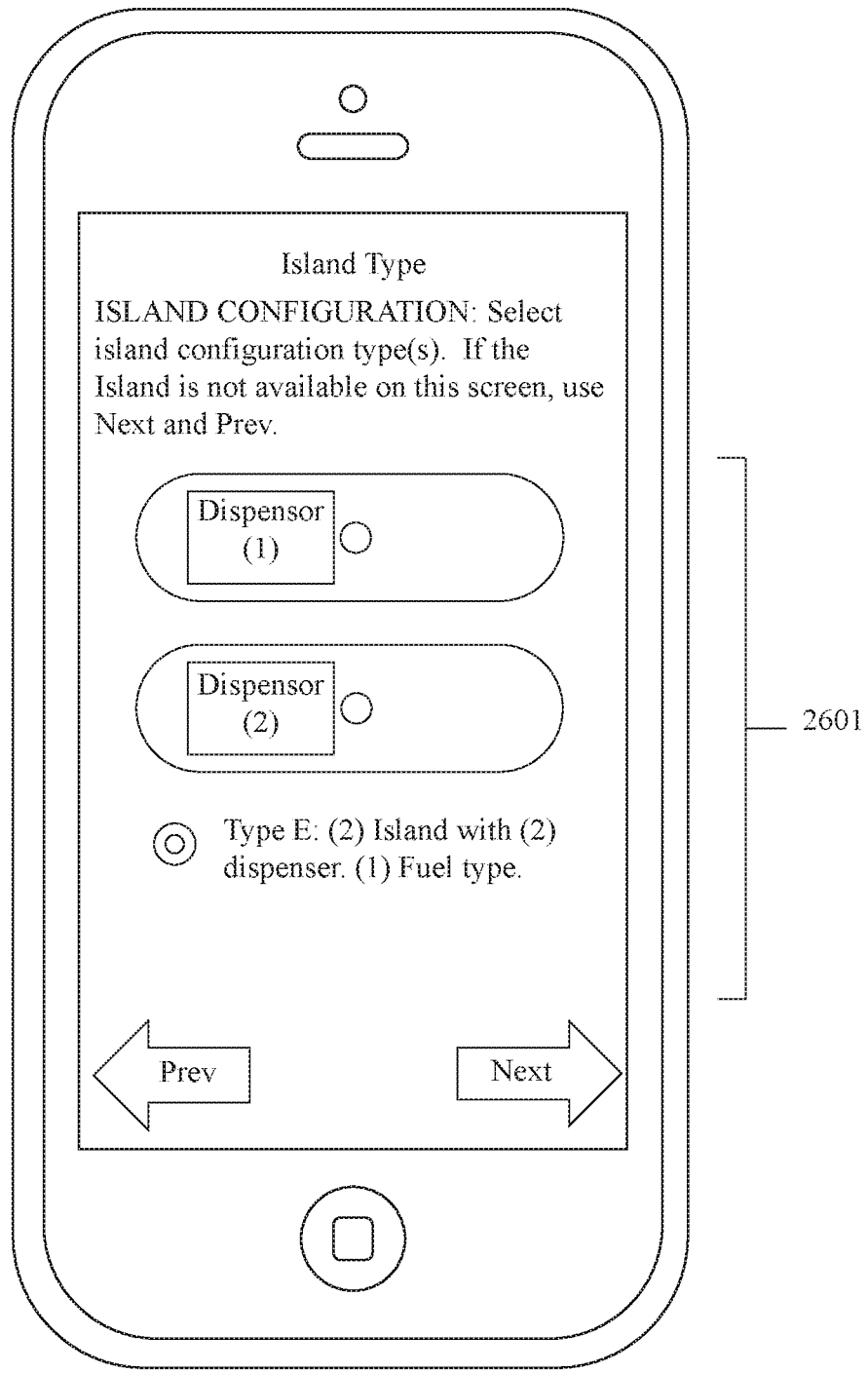
FIG. 26 shows a user interface 2600 on a mobile device that allows a site operating user to enter the configuration of a fueling site.

FIG. 26 shows a user interface 2600 on a mobile device that allows a site operating user to enter the configuration of a fueling site. User interface 2600 may include a display of a type E fuel site 2601. A type E fuel site comprises two islands with two total dispensers and one fuel type. In user interface 2600, a user may select if a site is a type E fuel site, and this information may be stored in the inventory management subsystem.

Figure 27:
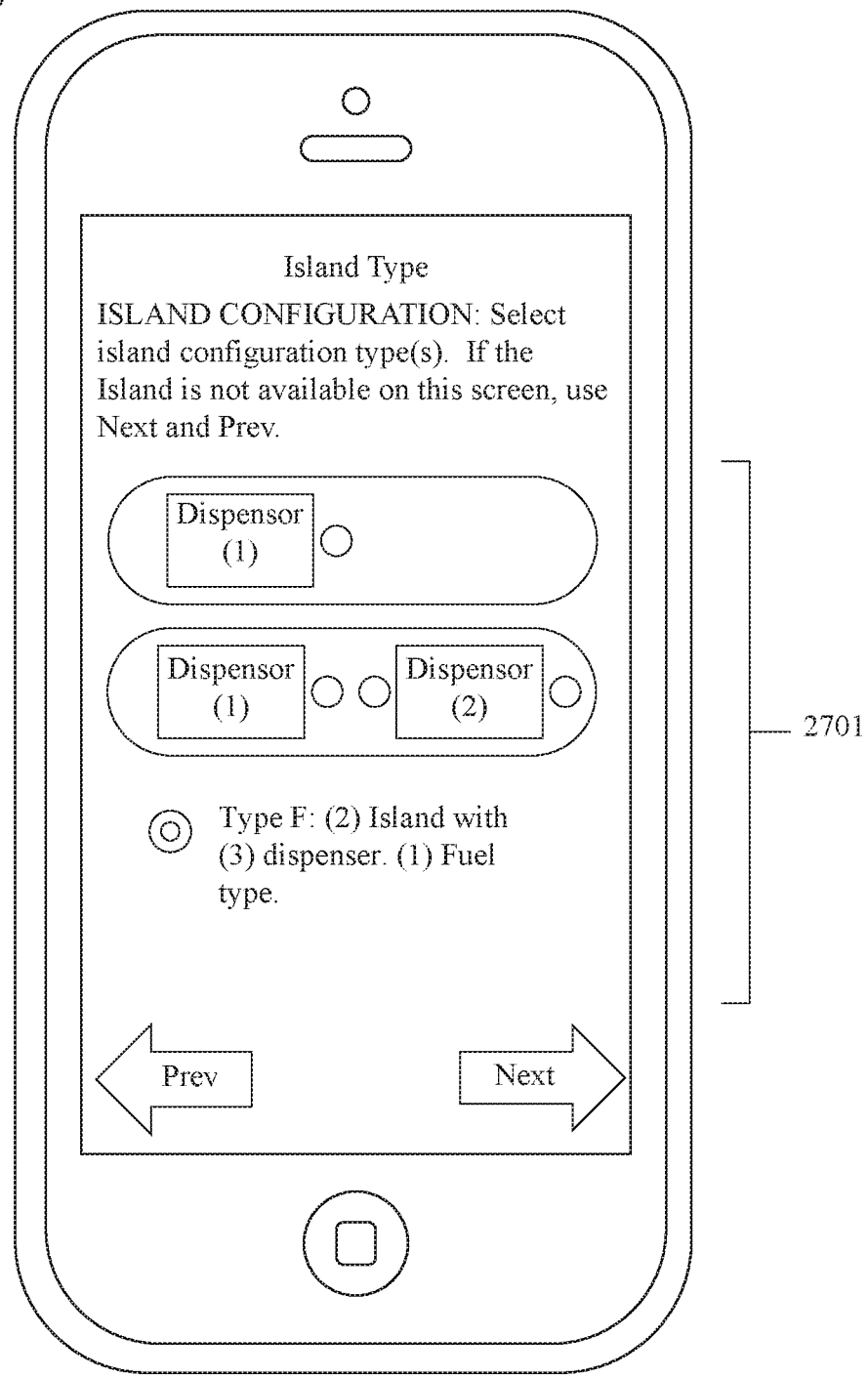
FIG. 27 shows a user interface 2700 on a mobile device that allows a site operating user to enter the configuration of a fueling site.

FIG. 27 shows a user interface 2700 on a mobile device that allows a site operating user to enter the configuration of a fueling site. User interface 2700 may include a display of a type F fuel site 2701. A type F fuel site comprises two islands with three total dispensers and one fuel type. In user interface 2700, a user may select if a site is a type F fuel site, and this information may be stored in the inventory management subsystem.

Figure 28:
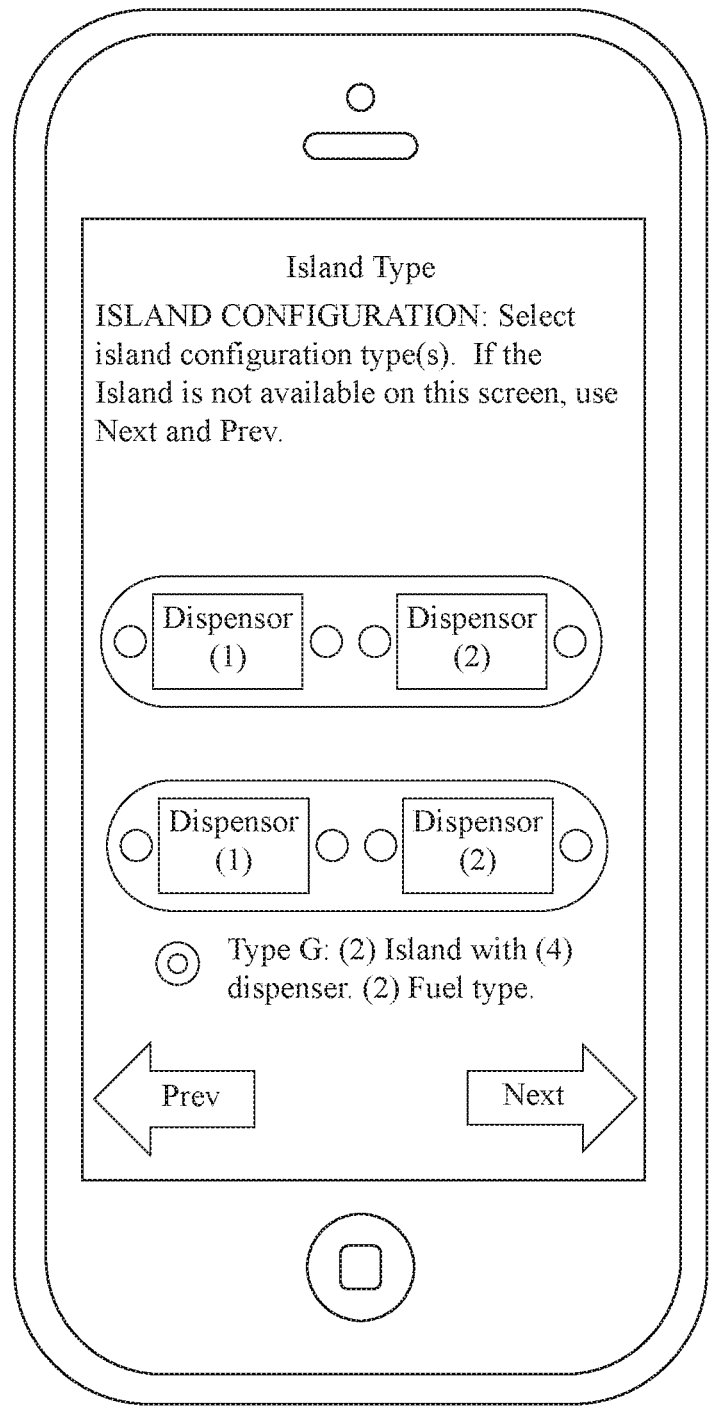
FIG. 28 shows a user interface 2800 on a mobile device that allows a site operating user to enter the configuration of a fueling site.

FIG. 28 shows a user interface 2800 on a mobile device that allows a site operating user to enter the configuration of a fueling site. User interface 2800 may include a display of a type G fuel site 2801. A type G fuel site comprises two islands with four total dispensers and two fuel types. In user interface 2800, a user may select if a site is a type G fuel site, and this information may be stored in the inventory management subsystem.

Figure 29:
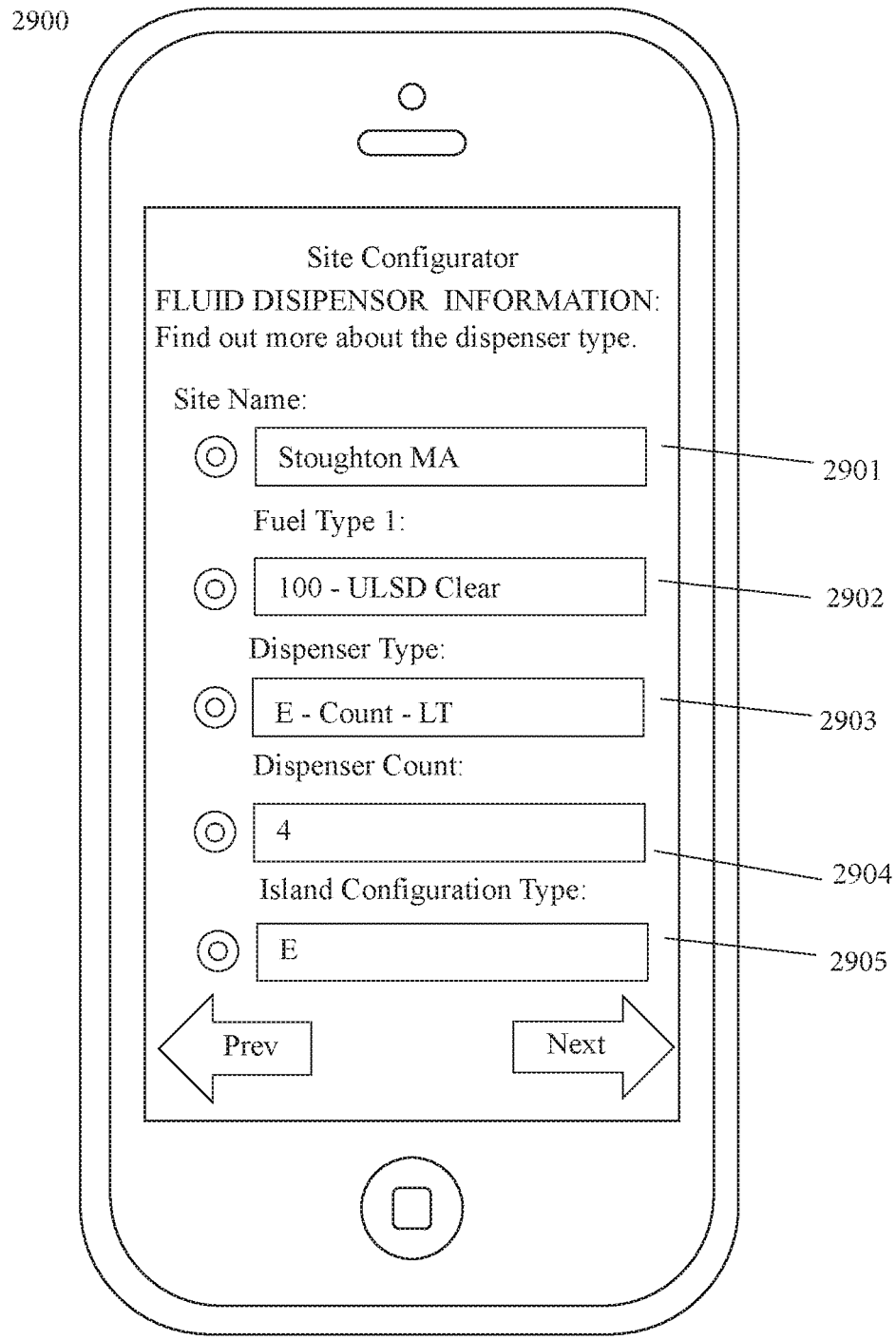
FIG. 29 shows a user interface 2900 on a mobile device that allows a site operating user to review a new site's information as it gets entered into the inventory management subsystem.

FIG. 29 shows a user interface 2900 on a mobile device that allows a site operating user to review a new site's information as it gets entered into the inventory management subsystem. User interface 2900 may include a site name field 2901, a fuel type field 2902, a dispenser type field 2903, a dispenser count field 2904, and an island configuration type field 2905. A user may add or edit information in the site name field 2901, the fuel type field 2902, the dispenser type field 2903, the dispenser count field 2904, and/or the island configuration type field 2905.

Figure 30:
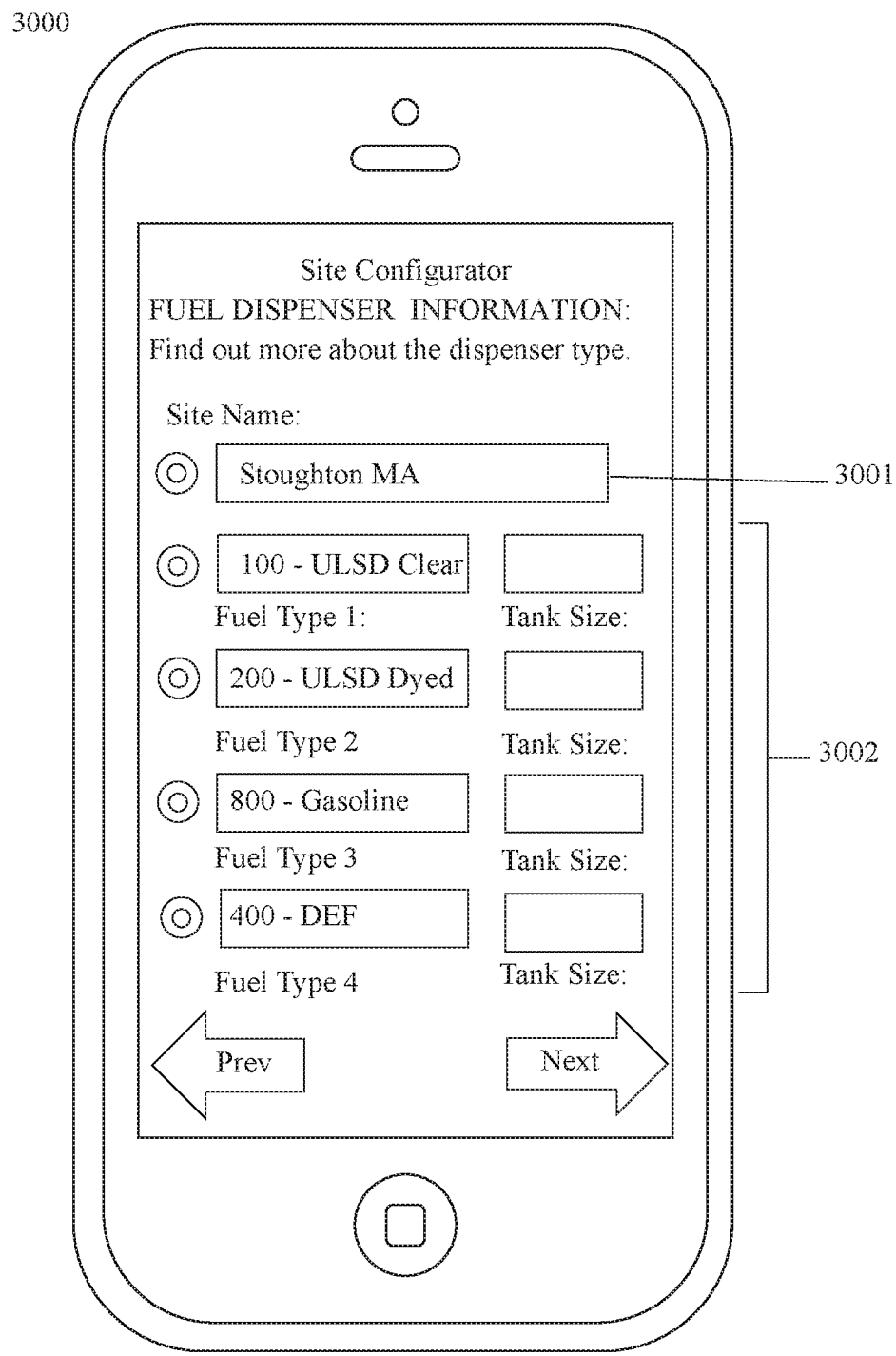
FIG. 30 shows a user interface 3000 on a mobile device that allows a site operating user to add or update information about fuel dispensers on a site.

FIG. 30 shows a user interface 3000 on a mobile device that allows a site operating user to add or update information about fuel dispensers on a site. User interface 3000 may include a site name field 3001, and dispenser information fields 3002 that allow a user to enter a dispenser's fuel type and tank size. A user may add or edit information in the site name field 3001 and/or the dispenser information fields 3002.

Figure 31:
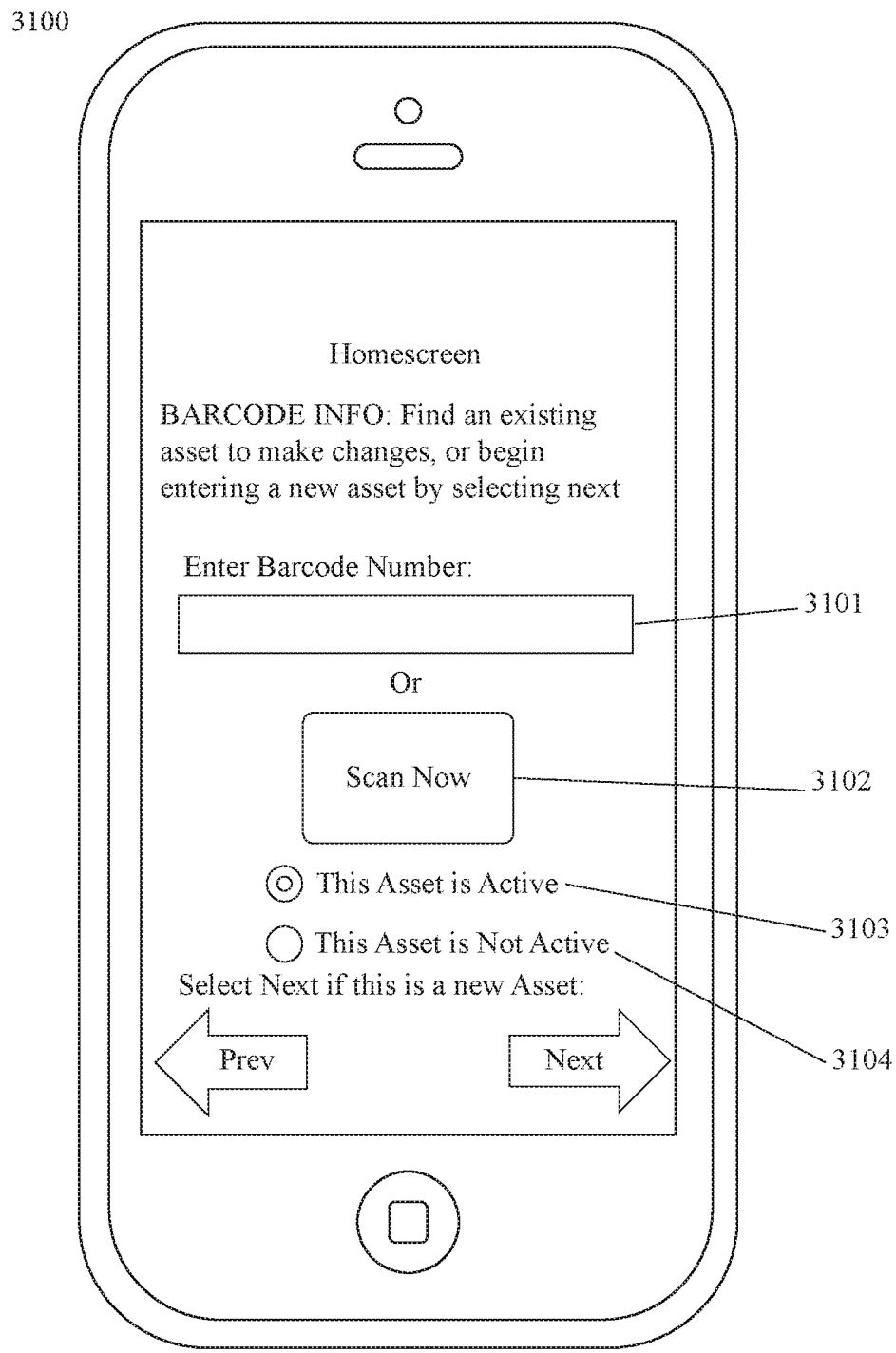
FIG. 31 shows a user interface 3100 on a mobile device that allows a user to identify a vehicle asset and enter the active status of the vehicle asset.

FIG. 31 shows a user interface 3100 on a mobile device that allows a user to identify a vehicle asset and enter the active status of the vehicle asset. User interface 3100 may include a barcode number field 3101, a scan now button 3102, and buttons 3103 and 3104 that allow a user to determine if a vehicle asset is active or not active, respectively. A user may enter the vehicle asset's active status, for example, by entering the vehicle asset's barcode number into barcode number field 3101 and selecting either button 3103 or button 3104. Alternatively, a user may enter the vehicle asset's active status by scanning the vehicle asset's barcode, for example with a camera on the mobile device, and selecting either button 3103 or button 3104.

In some embodiments, a user may be able to add a new vehicle asset to the asset management subsystem with a portable electronic device, such as a smart phone.

Figure 32:
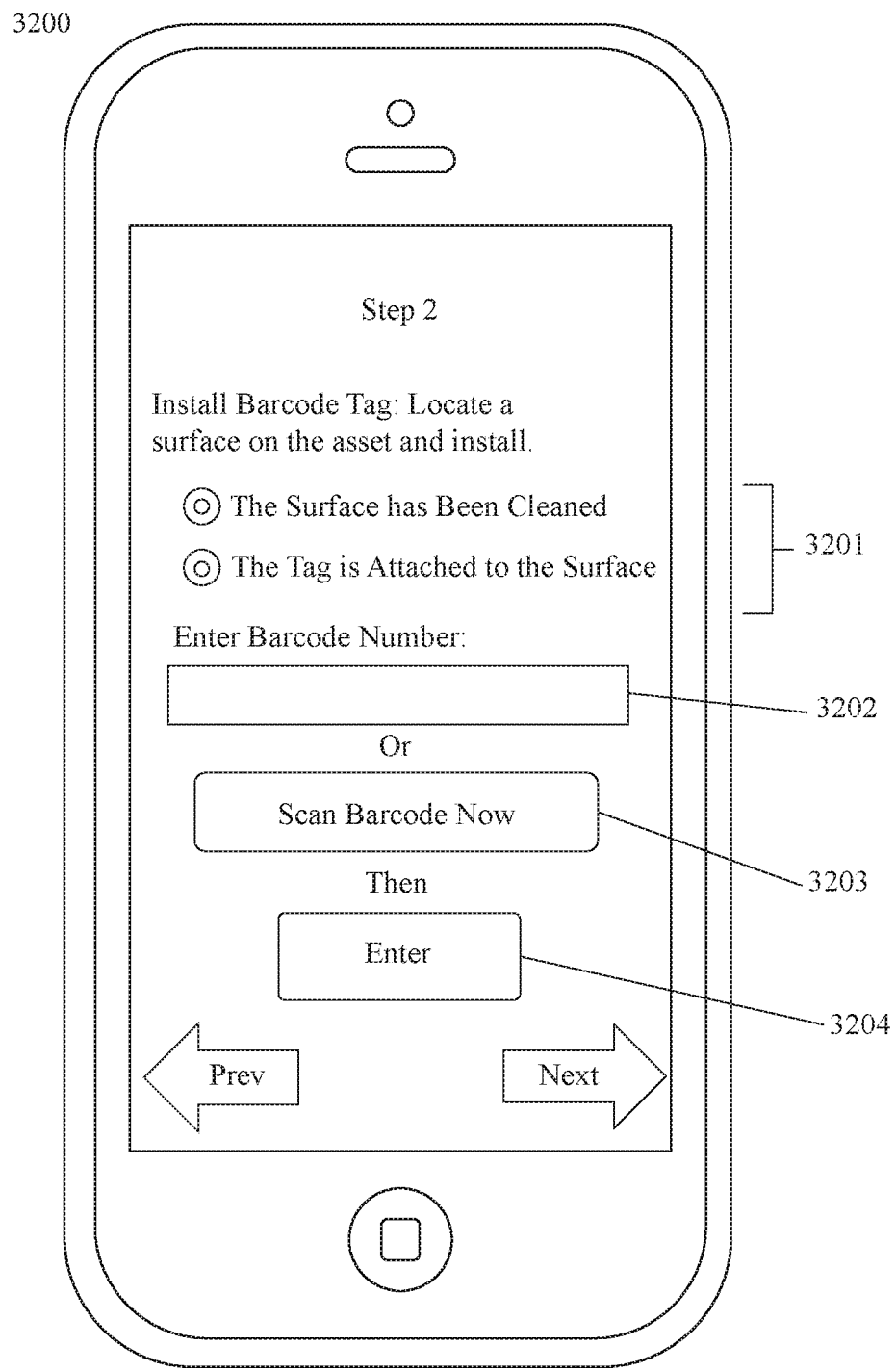
FIG. 32 shows a user interface 3200 on a mobile device that allows a user to add a new vehicle asset and save its information to the asset management subsystem.

FIG. 32 shows a user interface 3200 on a mobile device that allows a user to add a new vehicle asset and save its information to the asset management subsystem. User interface 3200 may include buttons 3201 designed to ensure a user correctly applies a barcode tag to the new vehicle asset, barcode number field 3202, a scan barcode now button 3203, and an enter button 3204 to finalize the addition of the new vehicle asset. A user may add the new vehicle asset to the asset management subsystem by selecting buttons 3201, entering a barcode number into barcode number field 3202, scanning the barcode, for example with a camera on the mobile device, and selecting the scan barcode now button 3203, and then selecting the enter button 3204.

Figure 33:
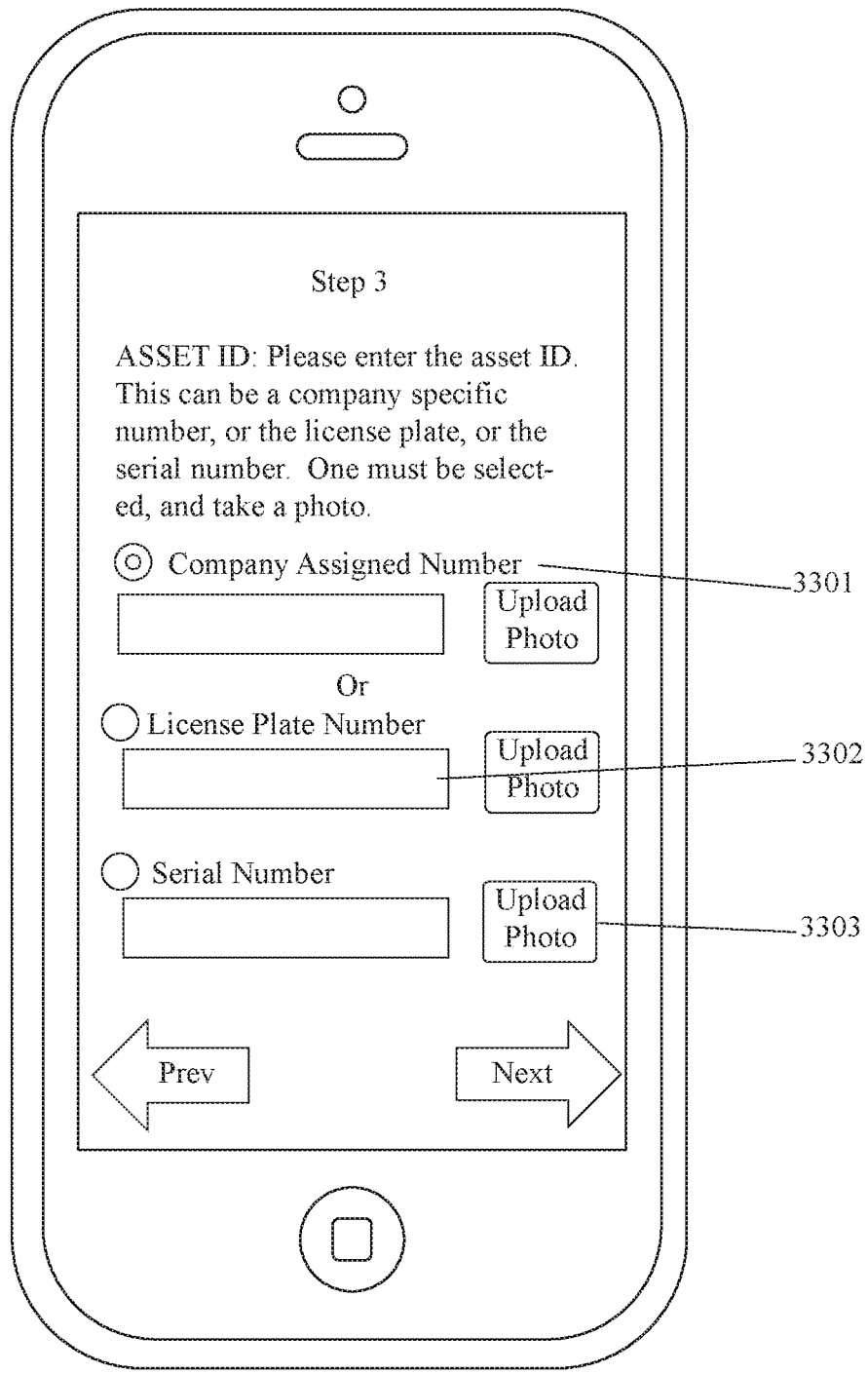
FIG. 33 shows a user interface 3300 on a mobile device that allows a user to identify a vehicle asset.

FIG. 33 shows a user interface 3300 on a mobile device that allows a user to identify a vehicle asset. User interface 3300 may include a company assigned number field 3301, a license plate number field 3302, and a serial number field 3303. A user may identify a vehicle asset by entering a company assigned number into company assigned number field 3301, a license plate number into license plate number field 3302, or a serial number into serial number field 3303. Alternatively, a user may upload a photo, for example with a camera on the mobile device, to satisfy field 3301, 3302, or 3303.

Figure 34:
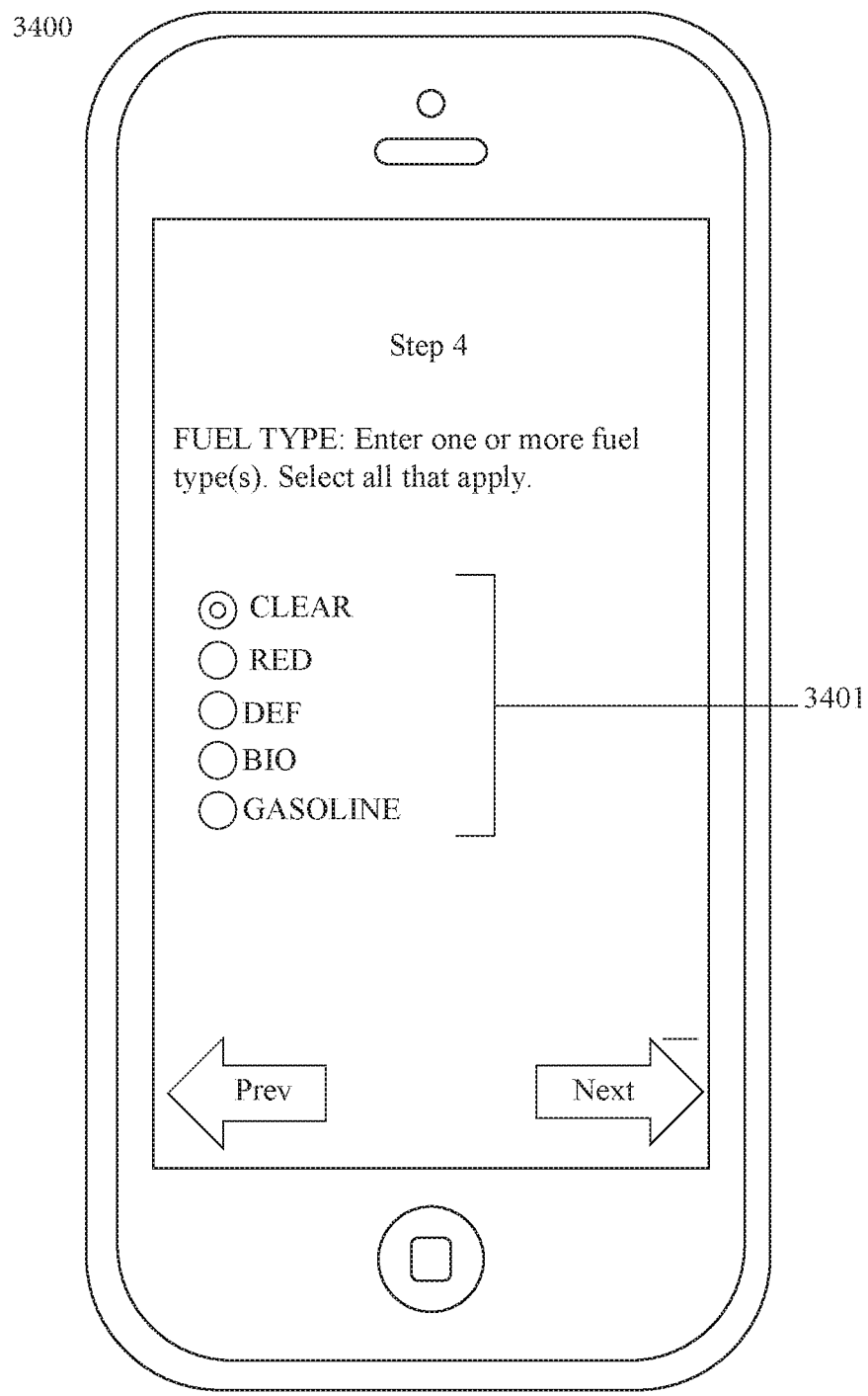
FIG. 34 shows a user interface 3400 on a mobile device that allows a user to select a fuel type that a vehicle asset consumes.

FIG. 34 shows a user interface 3400 on a mobile device that allows a user to select a fuel type that a vehicle asset consumes. User interface 3400 may include buttons 3401 that allow a user to select the appropriate fuel type.

Figure 35:
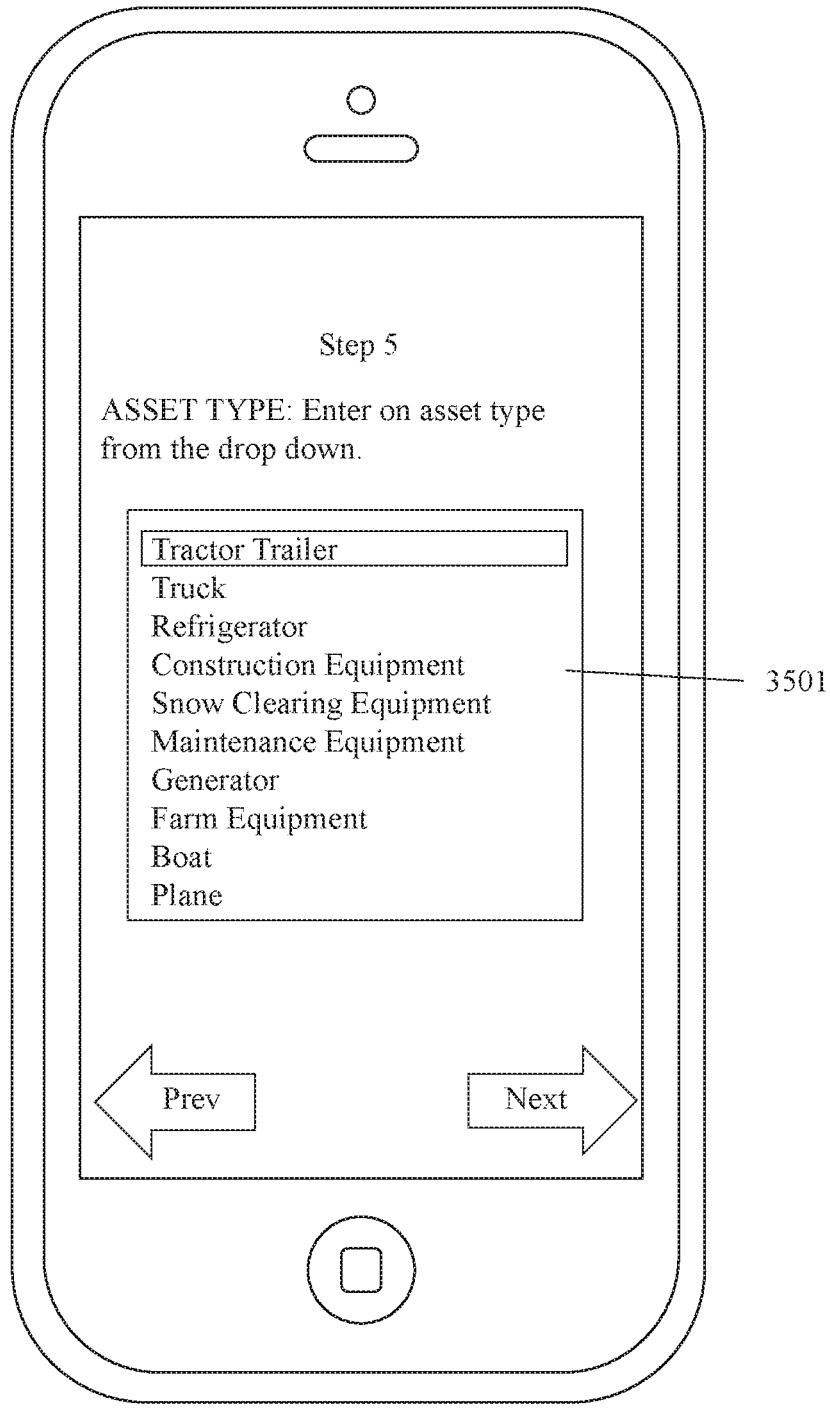
FIG. 35 shows a user interface 3500 on a mobile device that allows a user to select a vehicle type for a vehicle asset.

FIG. 35 shows a user interface 3500 on a mobile device that allows a user to select a vehicle type for a vehicle asset. User interface 3500 may include a drop down menu 3501 that allows a user to select the appropriate vehicle type.

Figure 36:
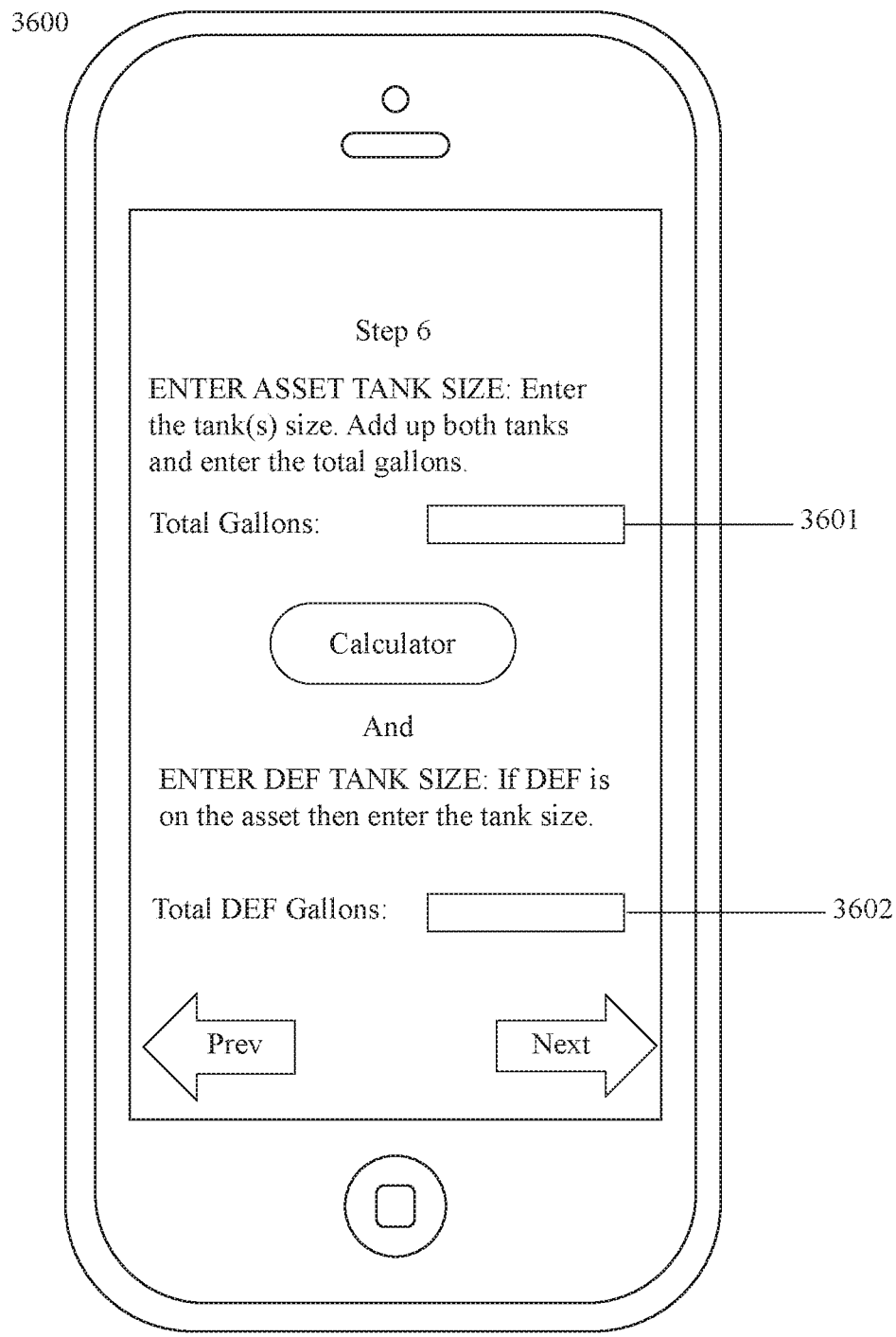
FIG. 36 shows a user interface 3600 on a mobile device that allows a user to provide tank size information for a vehicle asset.

FIG. 36 shows a user interface 3600 on a mobile device that allows a user to provide tank size information for a vehicle asset. User interface 3600 may include a field 3601 for a user to enter a vehicle asset's tank volume, and a field 3602 for a user to enter a DEF (Diesel exhaust fluid) tank volume.

Figure 37:
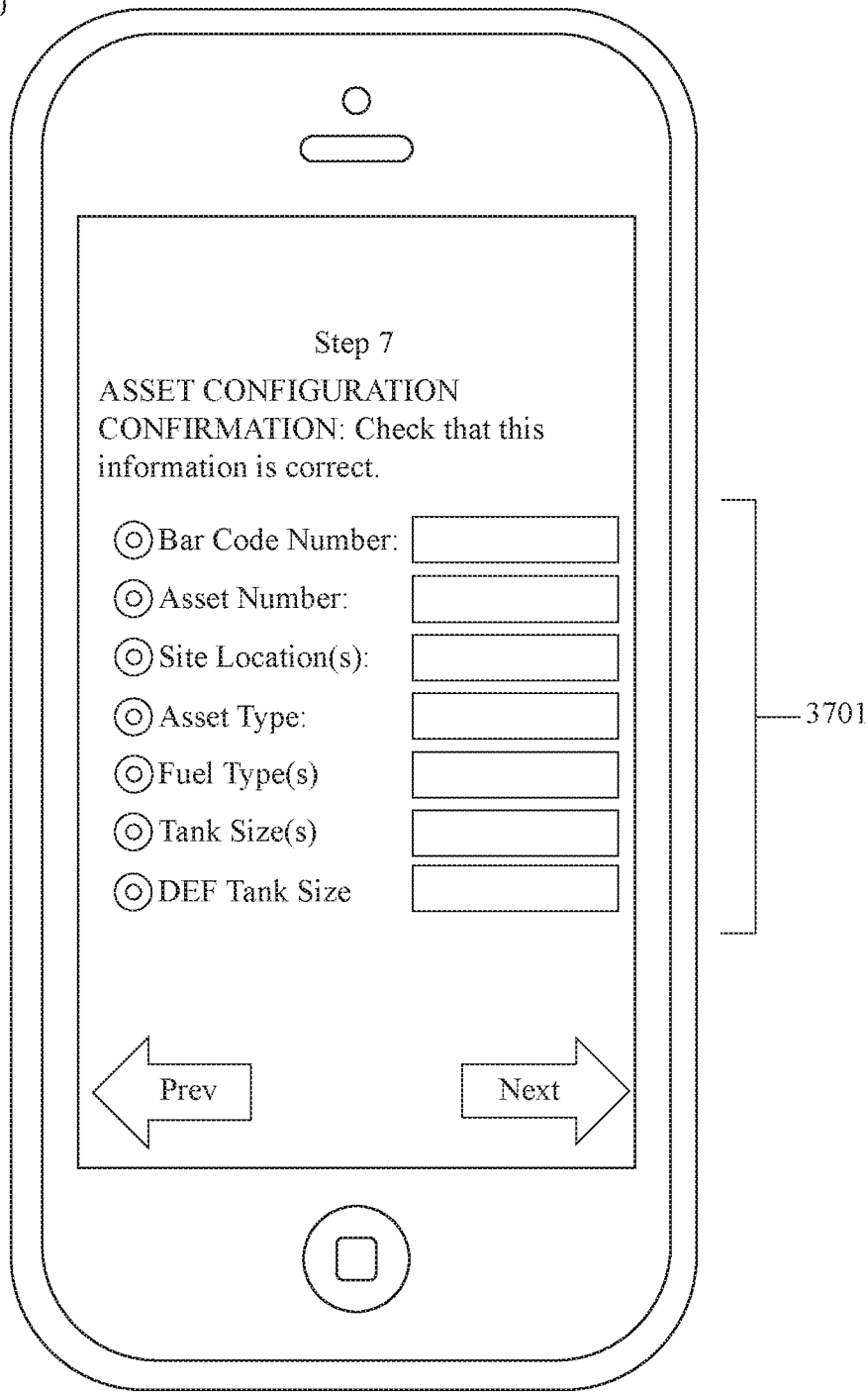
FIG. 37 shows a user interface 3700 on a mobile device that shows an overview of a vehicle asset.

FIG. 37 shows a user interface 3700 on a mobile device that shows an overview of a vehicle asset. User interface 3700 may include fields 3701 that provide various information for a vehicle asset, such as bar code number, asset number, site location(s), asset type, fuel type(s), tank size(s), etc. A user may add or edit information for a vehicle asset by providing input into one or more of fields 3701.

Figure 38:
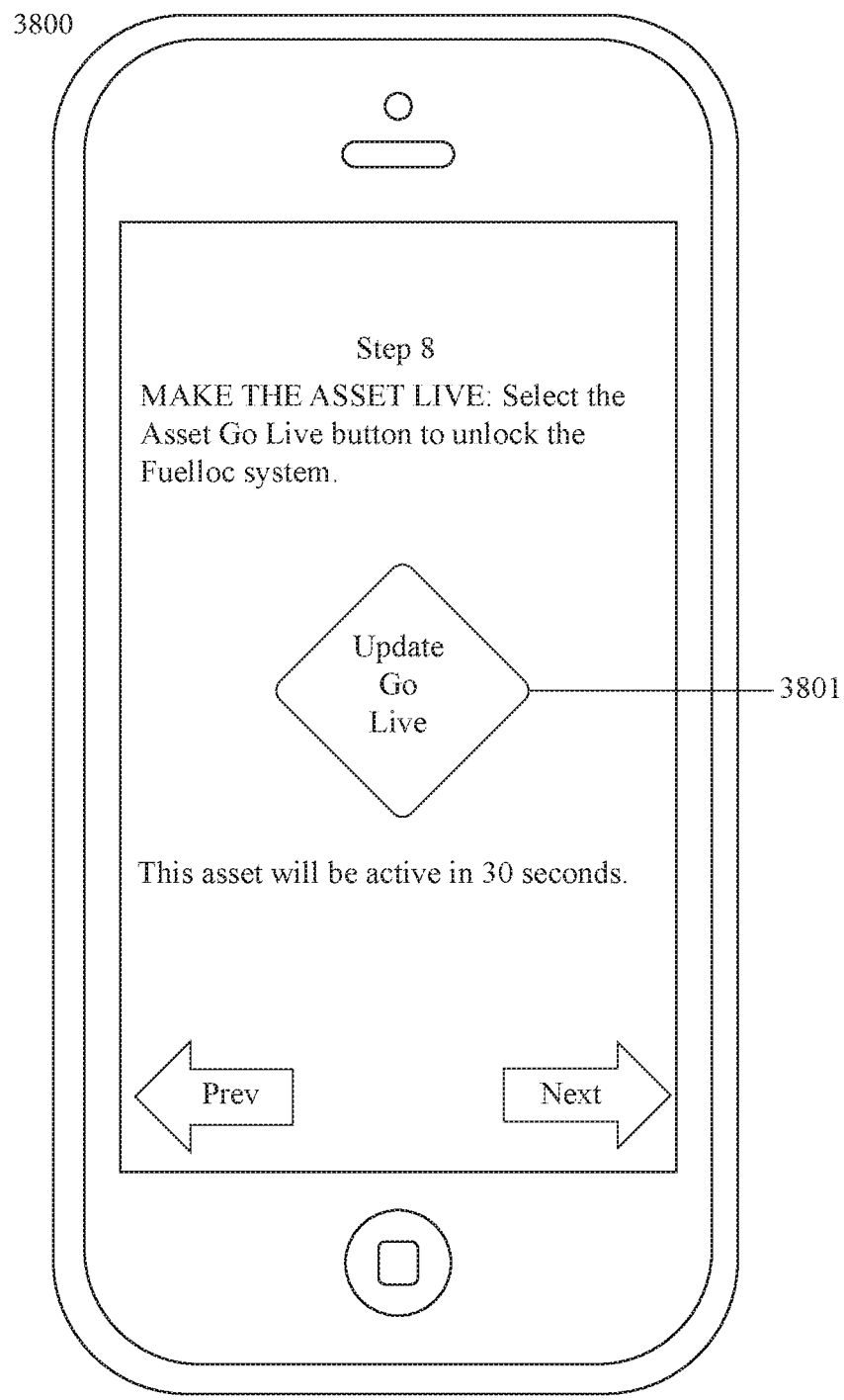
FIG. 38 shows a user interface 3800 on a mobile device that allows a user to confirm the addition of a new asset.

FIG. 38 shows a user interface 3800 on a mobile device that allows a user to confirm the addition of a new asset. User interface 3800 may include a button 3801 that, when pressed, confirms the addition of the vehicle asset and causes it to go live. A user can confirm the addition of a new asset by pressing button 3801.

Figure 39:
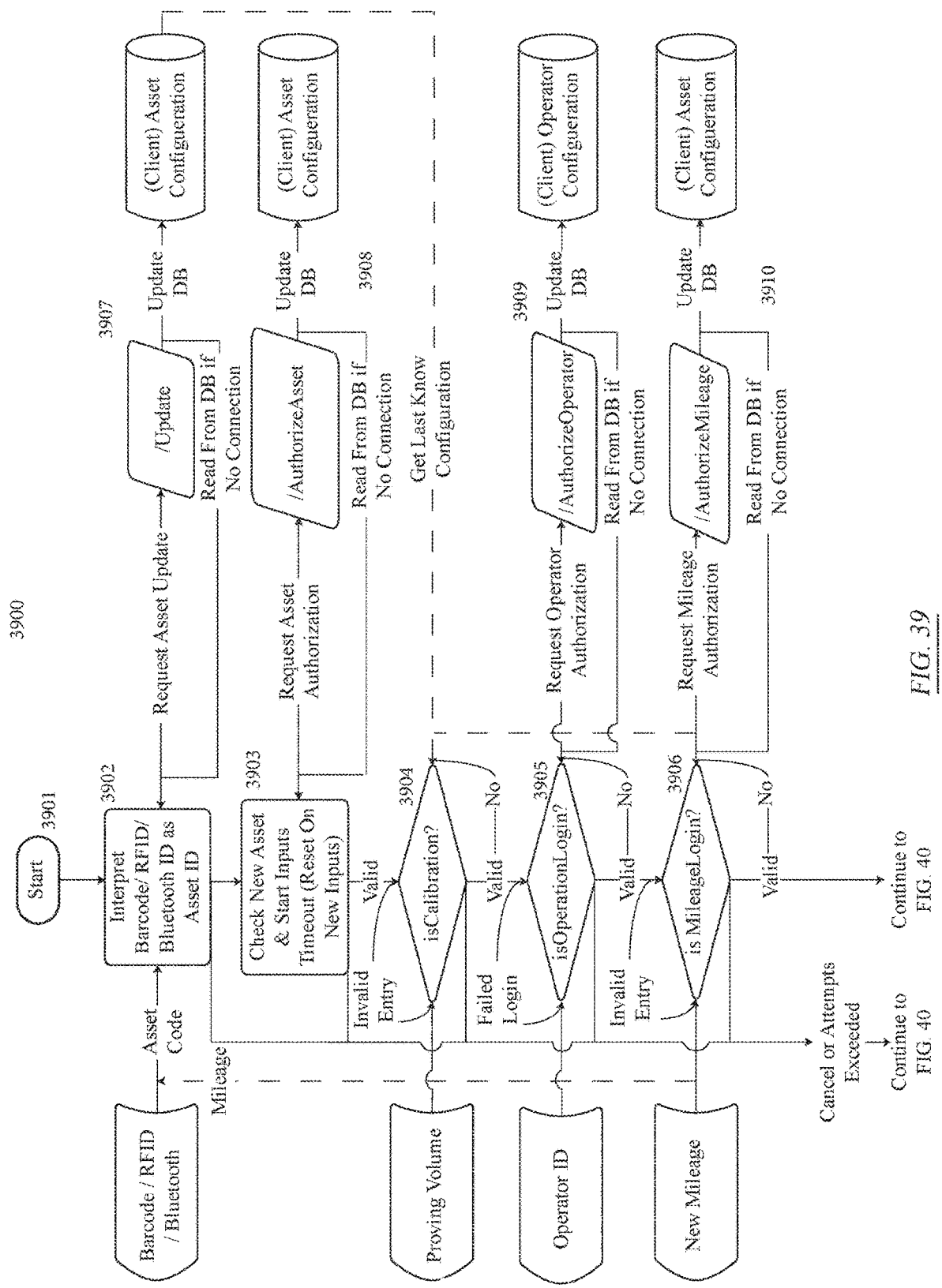
FIG. 39 shows a logic diagram 3900 for a process, performed by the controller 101, of checking and authorizing the ID of a vehicle asset.

FIG. 39 shows a logic diagram 3900 for a process, performed by the controller 101, of checking and authorizing the ID of a vehicle asset. This logic diagram continues onto FIG. 40. The process may begin at 3901 where it may interpret the barcode/RFID/Bluetooth ID as the asset ID at 3902. The process may then check the new asset and start inputs timeout at 3903. If the new asset is valid, the process may then proceed to 3904 where it may check if the asset is calibrated. If the new asset is not valid, the process may request asset authorization and authorize the asset at 3908, and then may proceed to 3904. At 3904, if the asset is calibrated, the process may proceed to 3905 where it may check if the operator is authorized. At 3905, if the operator is authorized, the process may proceed to 3906 where it may check if mileage is authorized. If the operator is not authorized, the process may request operator authorization and authorize the operator at 3909, and then proceed to 3906. At 3906, if the mileage is authorized, the process may proceed to 4011 on FIG. 40. If the mileage information is not authorized, the process may request mileage authorization at 3910, and then proceed to 4011 on FIG. 40.

Figure 40:
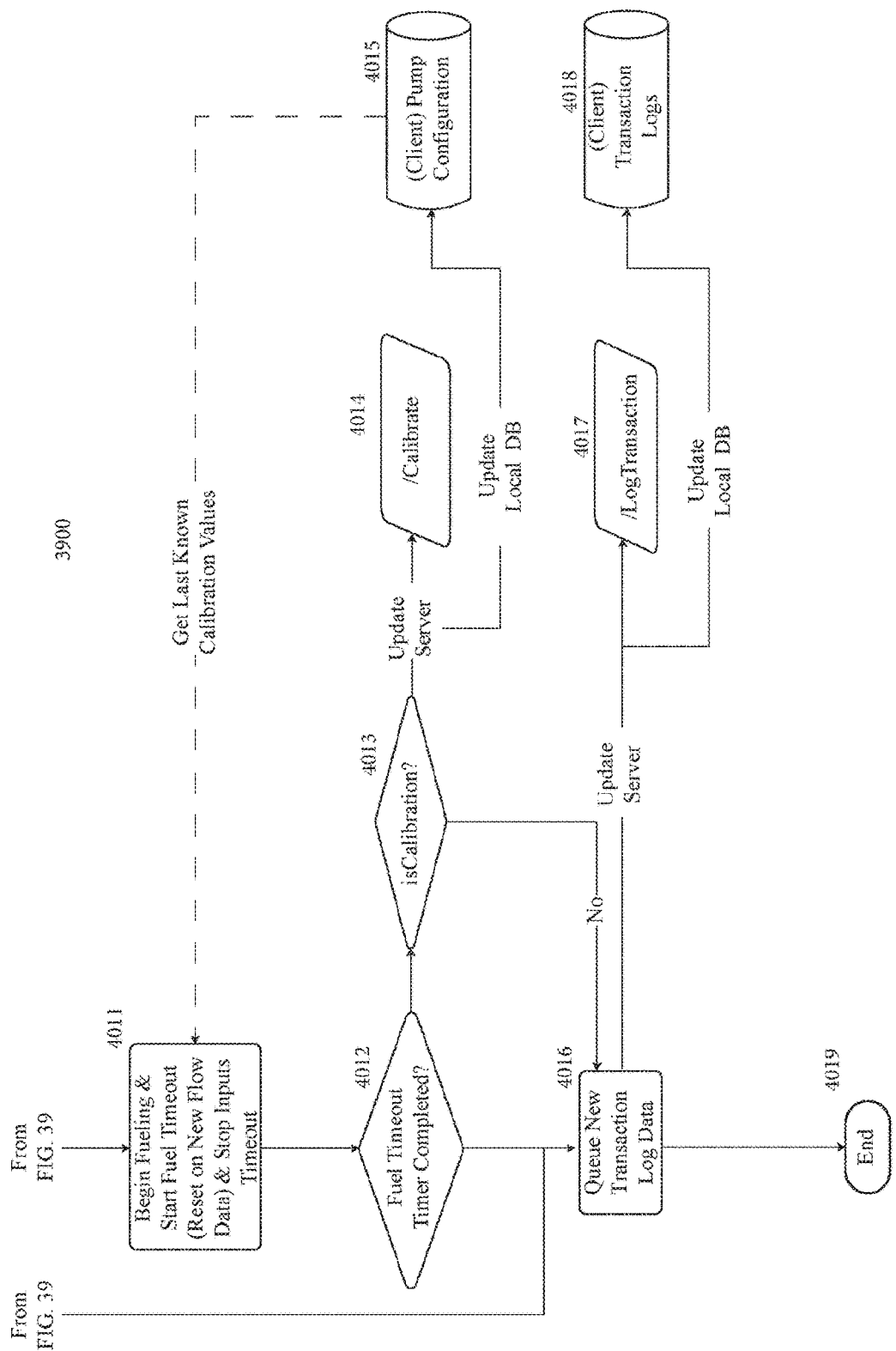
FIG. 40 shows the end of the logic diagram 3900 shown in FIG. 39.

FIG. 40 shows the end of the logic diagram 3900 shown in FIG. 39. At 4011, the process may begin fueling and start fuel timeout at 4011. The process then may check if the fuel timeout timer is completed at 4012. If the fuel timeout timer is completed, the process may check to see if the timer is calibrated at 4013. If the timer is calibrated, the process may then calibrate and update the pump at 4014 and 4015, respectively. If the timer is not calibrated, the process may proceed to 4016 and queue new transition log data. The process may then add the new transaction data and update the transaction logs at 4017 and 4018, respectively. The process may then end at 4019.

Figure 41:
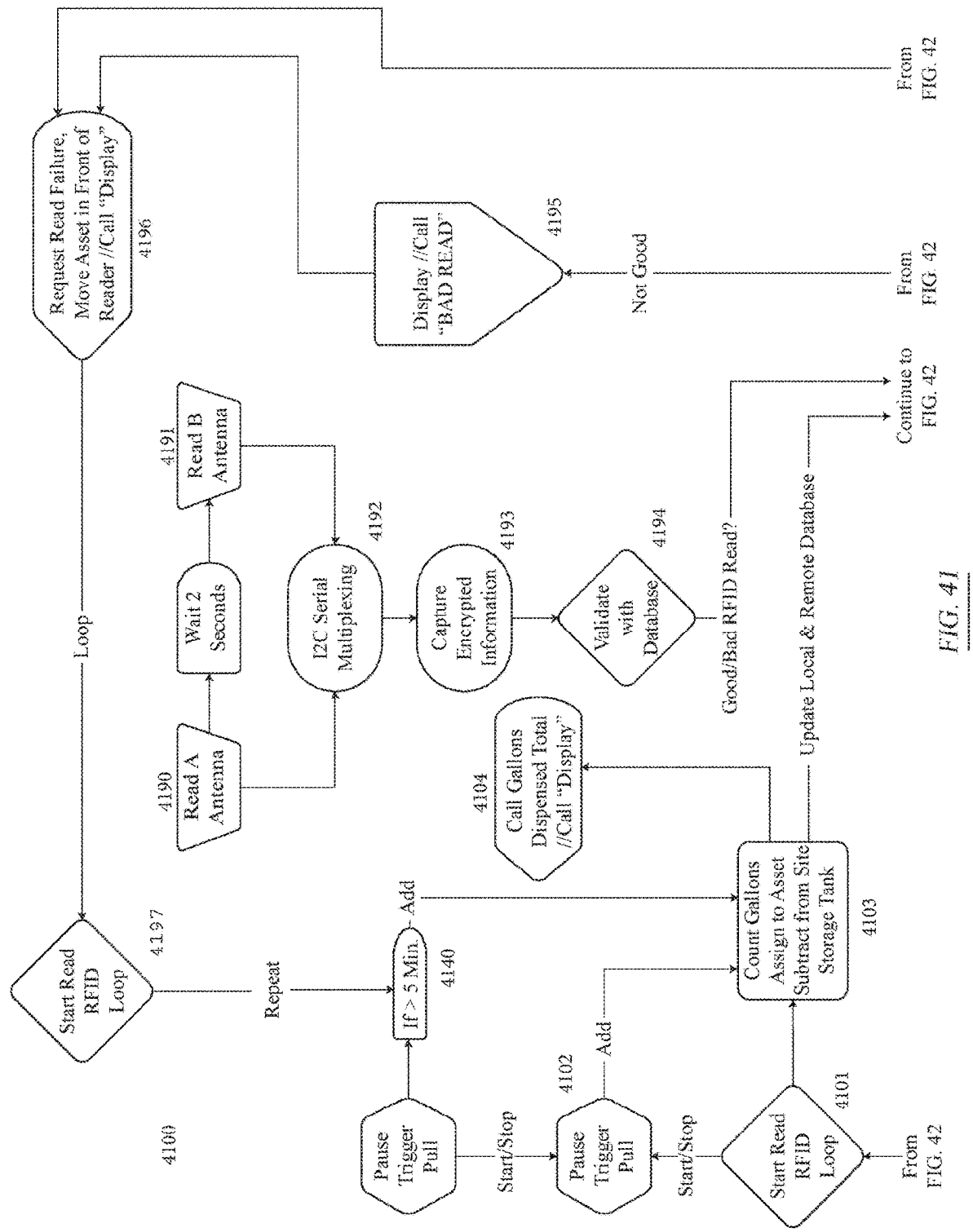
FIG. 41 shows a logic diagram 4100 for a process, performed by the controller 101, of identifying and fueling a vehicle asset.

FIG. 41 shows a logic diagram 4100 for a process, performed by the controller 101, of identifying and fueling a vehicle asset. In the embodiment illustrated, the vehicle asset is identified by reading identifying data through RFID. This logic diagram continues onto FIG. 42.

The process may begin with the controller 101 executing a loop, awaiting input that will trigger an RFID value to be read, such that an asset may be identified. That loop, for example, may include act 4207 a act 4207 illustrates processing that may be performed by a controller that is connected to dispensing station with more than one pump. Information may be tracked for each pump separately, as different assets may be serviced by each pump. Processing may involve selecting the input data source, including the antenna and the meter providing PWM values for the same asset at one time, but to multiplex the processing so that data is processed for each asset.

Regardless of the number of pumps, for the selected pump, processing may proceed to act 4209. At act 4209, a message may be presented on a display, such as display 305 linked to the controller 101. That message may prompt a user for input indicating that an asset is positioned at the reader and is ready for the RFID to be read. Processing may then proceed to act 4210, where the process branches, depending on whether that input is received. If not, a timer may be initiated at act 4220, which may be used to track a timeout period. In this example 5 minutes is used as an example of a timeout period. If the timer counts for the timeout period, without the button press being detected at act 4210, processing passes to act 4196 (FIG. 41).

At act 4196, an error message or instructions to the user may be presented on the display. The message, for example, may indicate that an RFID tag of a vehicle could not be read and may include instructions to the user to move the vehicle closer to the dispensing station or to take other action to initiate an RFID read. The process may then continue to act 4197, indicating that the loop, awaiting a valid read of an asset RFID tag, continues.

Conversely, when the button press is detected, processing may proceed to subprocess 4230, in which information may be collected to determine fuel dispensed to the asset. Additionally, processing may include act 4101 which indicates a read RFID loop is initiated. Such processing, for example, may result in information about an asset being read throughout a refueling operation. The loop may repeatedly read information about an asset such that, if the asset at the fueling station is not the asset for which the transaction was initiated, an error may be detected and fueling may be suspended.

Processing may continue at act 4101, for example, in response to a user pressing a button on the device identified as a command to perform an RFID read, such as act 4210. However, it should be appreciated that the read RFID loop may be initiated in any suitable way, including, for example, by a sensor that detects the presence of a vehicle at a fueling station or an attempt by a user to dispense fuel.

At act 4103 information is acquired from a pump to be authorized to dispense fuel for the asset. in some embodiments, the controller may be wired to a meter in the pump that provides a PWM value that changes in response to amount of fuel that is dispensed. Initially during a fueling process, an initial value of the PWM may be recorded. As the fueling process continues, updated PWM values may captured and used to compute fuel dispensed. That information may be supplied to act 4205. Additionally, at act 4104, information about fuel dispensed may also be displayed to the user, such as by showing the user the number of total gallons dispensed.

At act 4205 (on FIG. 42) an Information Group may be identified for use in tracking fuel delivered to the vehicle identified by information read from the vehicle asset. In the embodiment illustrated, this Information Group includes values for variables such as "Pump PWM," "Function Button," "Asset," "Gallons," "Time/Date," and "Site Storage Subtraction." These values may represent values obtained from other components of the system. Pump PWM, for example, may indicate the value of a PWM encoder in a pump, and is indicative of a reading of a meter in a pump that counts amount of fuel that has been dispensed. Some of these values may be determined at the start of the fueling transaction, such as the "Asset," which is information identifying the asset at the fueling station, the "Time/Date" which may be read from clock hardware and "Function Button" which may indicate a button pressed by a user to initiated the transaction. In some embodiments, this value Pump PWM may represent a reading from that meter at the initiation of the transaction.

Others of the values may reflect values for the transaction that may be updated during the transaction. "Gallons", for example, may be calculated based on changes to the Pump PWM value read from the pump as the transaction progresses. This value may represent amount of fuel added to the asset. Similarly, the "Site Storage Subtraction," which may indicate the amount of fuel removed from a storage tank at the site may also be calculated based on changes to the Pump PWM and stored as the transaction progresses.

Regardless of the conditions that may trigger an RFID reading, which may occur at the initiation of a transaction or throughout the transaction to confirm that the same asset is present at the fuel pump, when an RFID read is to be performed, the process may perform act 4190, where data is read using a first antenna, identified as "A Antenna." In the embodiment illustrated, a read is also performed with a B Antenna. In the embodiment illustrated, the B Antenna is read after a wait of 2 seconds, but any suitable timing of reads though multiple antennas may be implemented by appropriate programming of controller 101 or in any other suitable way. Such processing may be appropriate for a controller connected in a system in which fuel may be dispensed to two assets at once.

Act 4192 illustrates that data read through the antennas may be passed to a processor where it may be processed and/or communicated. In the embodiment illustrated, processing within act 4192 illustrates communication of the data from A Antenna and B Antenna multiplexed on an I2C serial bus. However, the data may be formatted and communicated in any suitable way.

The communicated information may be captured at act 4193. In the embodiment illustrated, information read from a vehicle is encrypted. At act 4194, that information is validated by comparing it to data about vehicles in a database. Processing at act 4194, may in some embodiments include decrypting the information. However, in other embodiments, the data may be processed and stored in encrypted formed, including by making comparisons to other information that is also encrypted.

Figure 42:
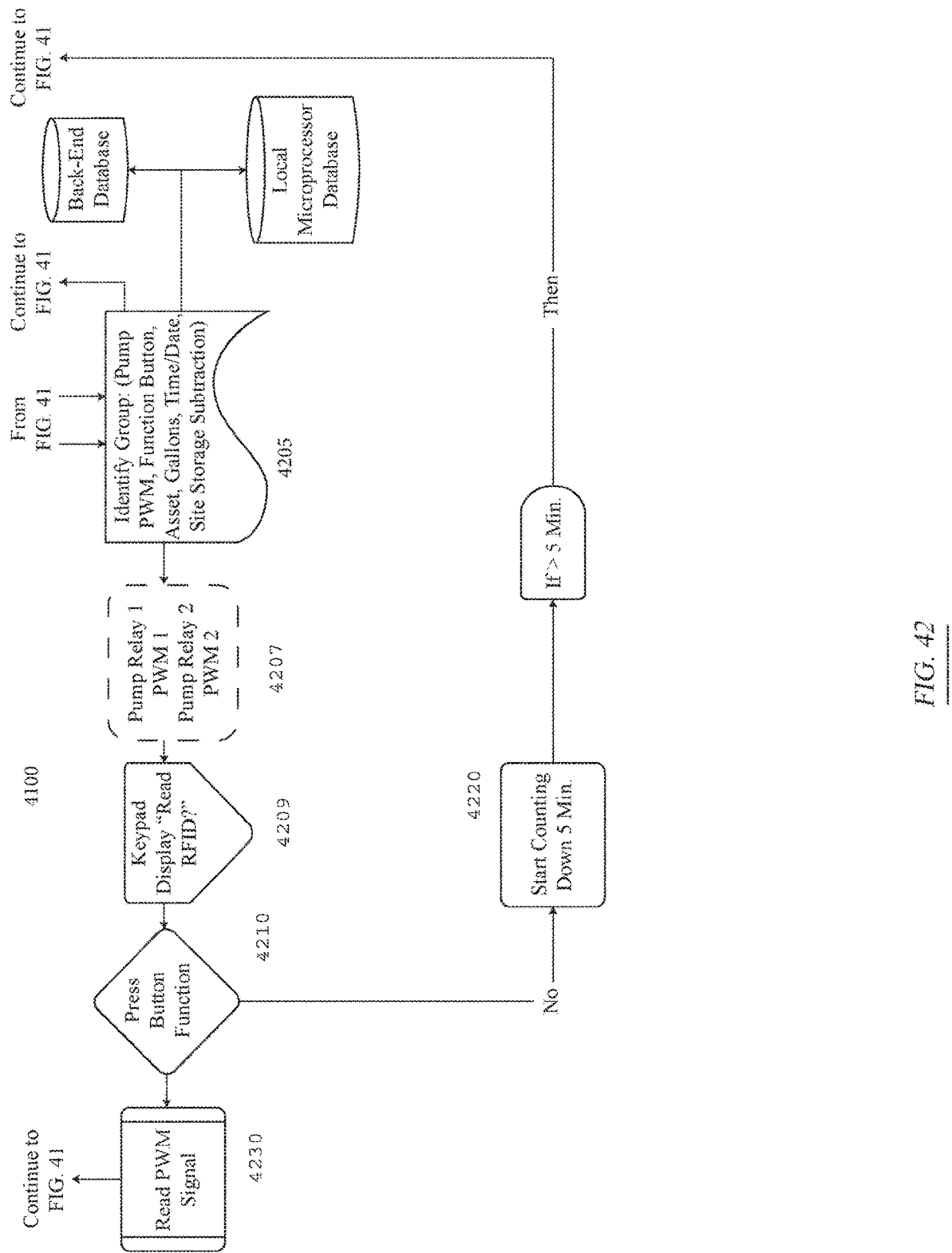
FIG. 42 shows the end of the logic diagram 4100 shown in FIG. 41.

FIGS. 41 and 42 illustrates that information representing updates to these values may be supplied to processing at act 4205 as a transaction progresses such that the Information Group may be updated. These figures indicate that updates may be triggered based on events or passage of time. Acts 4101 and 4210 indicate that, in response to an input, such as a user depressing a trigger on a nozzle of a fuel dispensing station that might start or stop the flow of fuel, an update may be performed. When an update, processing may repeat act 4103. Alternatively or additionally, act 4140 indicates that, if a timeout period has elapsed, which in this example is indicated to be 5 minutes, data may again be obtained from the pump at act 4103, and provided as an update to act 4205.

The initial values of the Information Group, as well as updates during the transaction, may be entered in a local and/or remote data bases. The information Group, for example, may be written as a record in a database storing records of transactions. However, it should be appreciated that the Information Group may be recorded in any suitable way. In some embodiments, the data for each transaction, including updates as a transaction progresses, may be initially stored in a local database, which may be implemented in non-volatile memory within controller 101. At periodic intervals, or in response to trigger conditions, such as completion of a transaction, the data may be transferred to the remote database.

Conversely, if the processing in act 4205 is unable to form or update an Information Group, such as a result of an inability to read an asset identifier or a change in an asset identifier, processing may continue to act 4195 where an error message is displayed. A corrective action may be taken in response to the detection of the error. In the illustrated example, that corrective action includes an error message displayed to a user at act 4195.

FIG. 42 shows the end of the logic diagram 4100 shown in FIG. 41.

Figure 43:
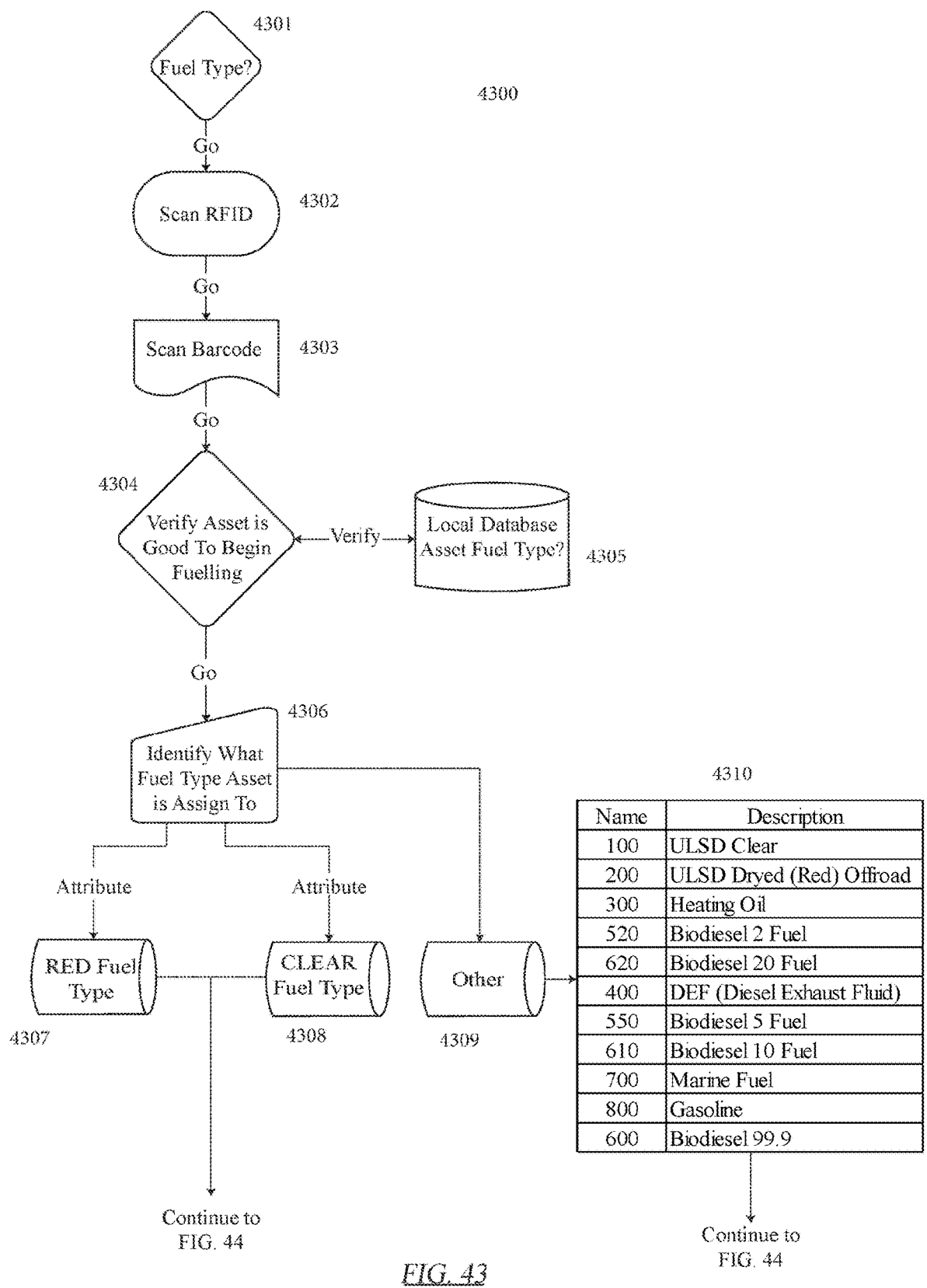
FIG. 43 shows a logic diagram 4300 for a process, performed by the controller 101, for providing a vehicle asset the right type of fuel.

FIG. 43 shows a logic diagram 4300 for a process, performed by the controller 101, for providing a vehicle asset the right type of fuel. This logic diagram continues onto FIG. 44. The process may start at 4301 and check a vehicle for the fuel type it takes. The process may scan the vehicle's RFID at 4302 or it may scan its barcode at 4303. The process may then proceed to 4304 where it may verify that the vehicle is ready for fueling. The process may then check a local database at 4305 to determine the vehicle's fuel type. If it is not stored in the local database, the process may proceed to 4306 and identify what fuel type is assigned to the vehicle. The process may determine at 4307 that the vehicle takes a RED fuel type, or determine at 4308 that the vehicle takes a CLEAR fuel type. The process may also determine at 4309 that it is neither of these two, and determine it is another type from table 4310. At 4411, the process may confirm that the vehicle is in front of the correct pump to dispense the correct fuel. If the vehicle takes the RED fuel type and is located at a RED fuel pump, the process may unlock the RED fuel pump at 4412, 4413, and 4414, respectively. If the vehicle takes the RED fuel type and is located at a CLEAR fuel pump, the process may display to a driver to move the vehicle to the RED fuel pump at 4412, 4415, and 4416, respectively. If the vehicle takes the CLEAR fuel type and is located at a CLEAR fuel pump, the process may unlock the CLEAR fuel pump at 4417, 4418, and 4419, respectively. If the vehicle takes the CLEAR fuel type and is located at a RED fuel pump, the process may display to a driver to move the vehicle to the CLEAR fuel pump at 4417, 4420, and 4421, respectively.

Figure 44:
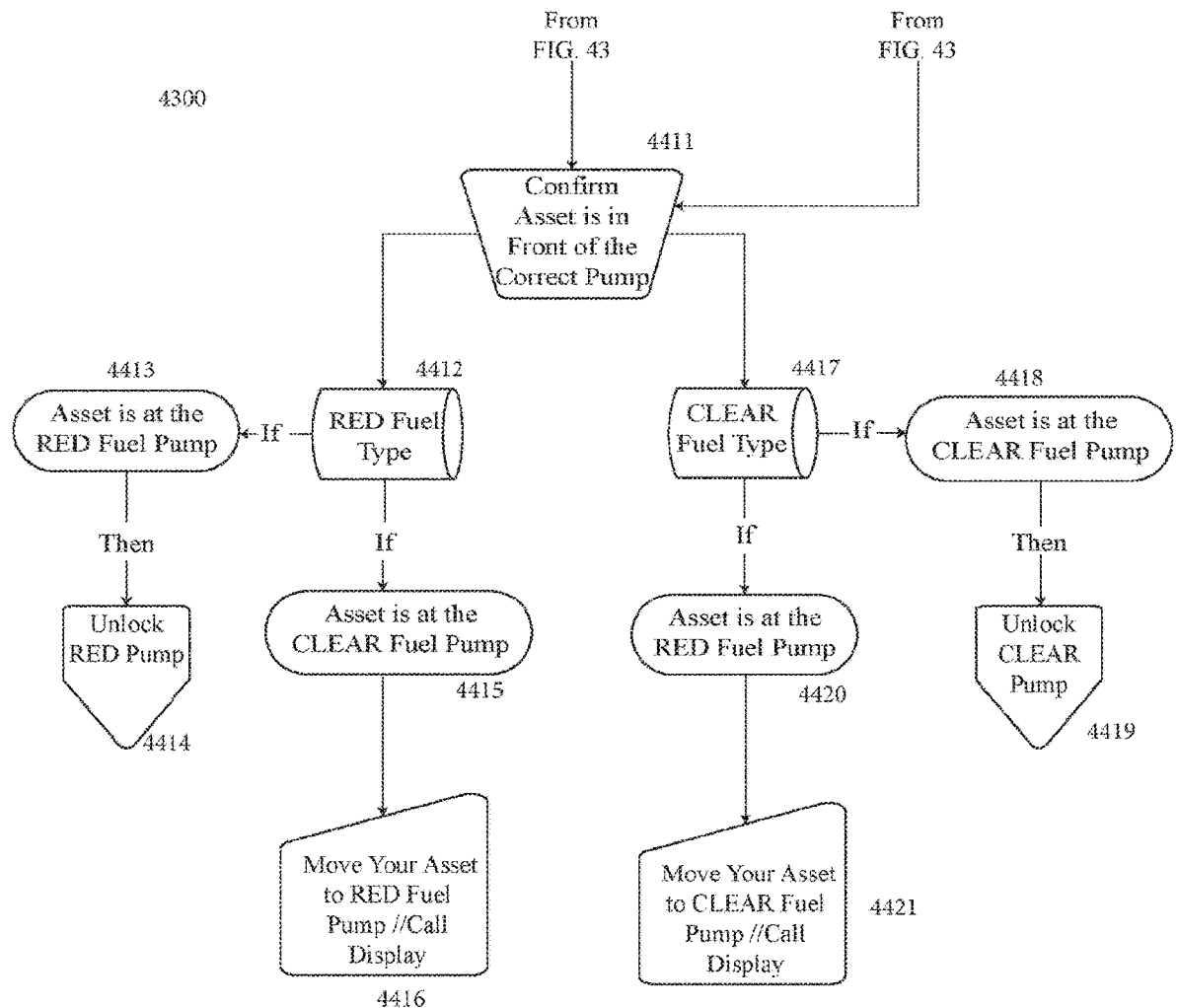
FIG. 44 shows the end of the logic diagram 4300 shown in FIG. 43.

FIG. 44 shows the end of the logic diagram 4300 shown in FIG. 43.

Figure 45:
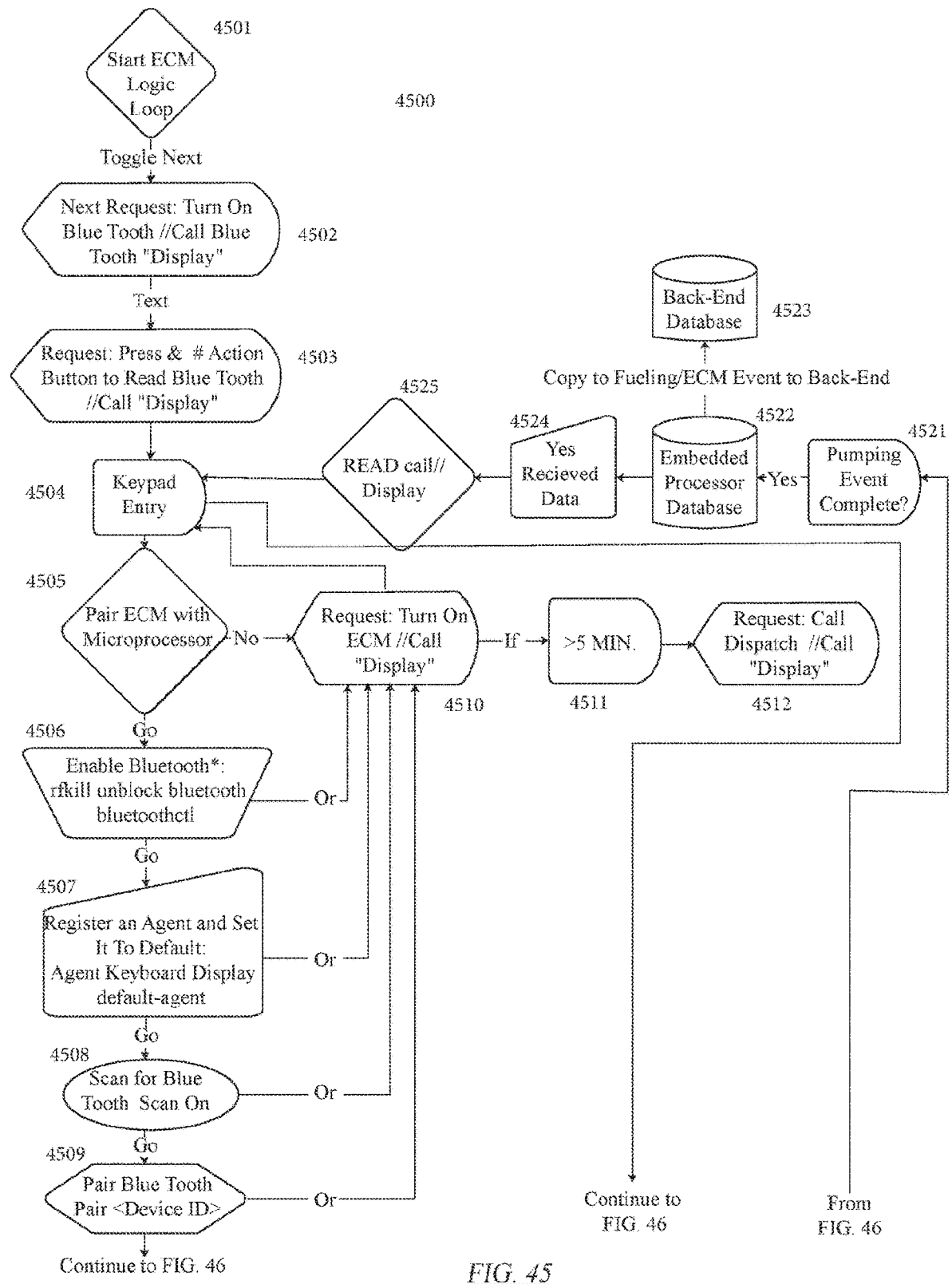
FIG. 45 shows a logic diagram 4500 for a process, performed by the controller 101, for communicating with a vehicle asset through Bluetooth to the vehicle asset's Engine Control Module (ECM).

FIG. 45 shows a logic diagram 4500 for a process, performed by the controller 101, for communicating with a vehicle asset through Bluetooth to the vehicle asset's Engine Control Module (ECM). This logic diagram continues onto FIG. 46. In some embodiments, the controller 101 may access information relating to the vehicle asset by communicating with the vehicle asset's ECM. This information may cause the controller 101 to generate control signals to a fuel dispenser, such as selectively enabling or disabling fueling, or choosing the type of fuel to be dispensed to the vehicle asset.

The process may start an ECM logic loop at 4501 and display a message to a driver indicating that the Bluetooth must be turned on at 4502. At 4503, the process may display to the driver that he must press a button to initiate a Bluetooth read. At 4504, the driver may enter into a keypad if the vehicle has an ECM that is new and must be paired, or if the ECM has already been paired. If the ECM is new, the process may then pair the ECM associated with the vehicle with a microprocessor at 4505. If the ECM cannot be read, the process may display to the driver at 4510 that the ECM must be turned on. The process may begin a timeout at 4511. If the timeout exceeds 5 minutes, the process at 4512 may display to the driver that dispatch should be called.

If the ECM is found, the process may enable Bluetooth at 4506, register an agent and set it to default at 4507, scan for Bluetooth at 4508, and pair Bluetooth at 4509. The process then may connect the new ECM at 4613 (on FIG. 46) and add the new ECM to the asset management subsystem, and then may request ECM fueling event and attributes at 4615.

The process may then proceed to 4616 where it determines ECM vitals. Depending on the ECM attributes, the process may then begin fueling at a first pump at 4617 or a second pump at 4618.

If, at the keypad entry at 4504, the driver indicates that the ECM is already paired, the process may identify existing ECM attributes to a pump at 4620. Depending on the ECM attributes, the process may then begin fueling at the first pump at 4617 or the second pump at 4618.

At 4521, the process may determine if the fueling event is complete. If it is complete, the process may store data relating to the fueling event in a processor database at 4522 and send to the asset management subsystem at 4523. If data is correctly received at 4524, the process displays at 4525 to the driver that the fueling event is complete.

Figure 46:
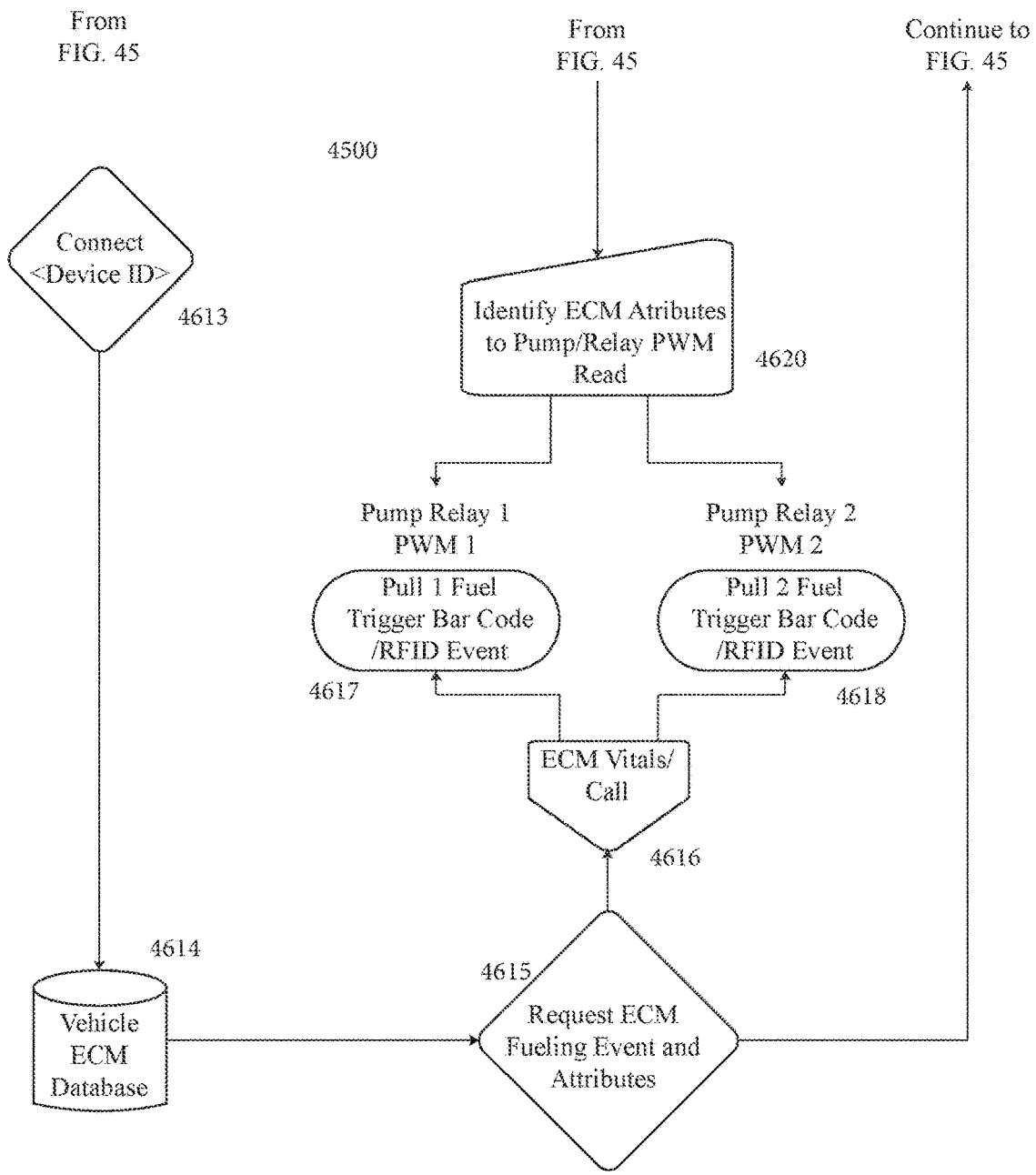
FIG. 46 shows the end of the logic diagram 4500 shown in FIG. 45.

FIG. 46 shows the end of the logic diagram 4500 shown in FIG. 45.

Figure 47:
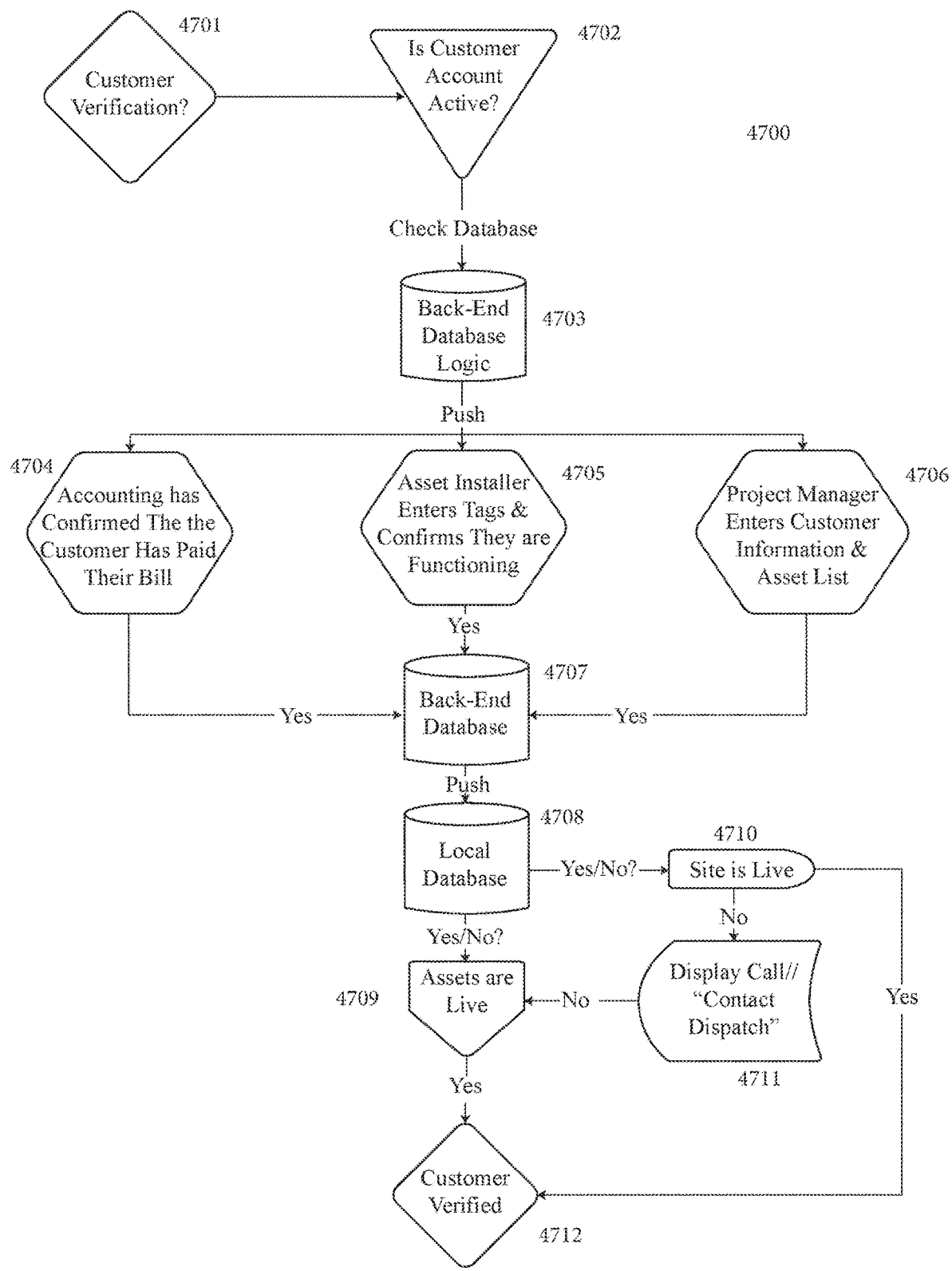
FIG. 47 shows a logic diagram 4700 for a process, performed by the controller 101, for a customer account activation process.

FIG. 47 shows a logic diagram 4700 for a process, performed by the controller 101, for a customer account activation process. At 4701 the process may begin verifying a customer. At 4702, the process may determine if a customer account is active. The process may then check a database at 4703, and may determine if the customer has paid their bills at 4704, may determine tags on the customer's vehicle assets are functioning at 4705, and may enter customer information at 4706. This information may all be sent to the database at 4707. The process may then push the data to a local database at 4708, determine if the assets are live at 4709, and confirm the customer is verified at 4712. If the site is not live at 4711, the process may at 4711 display to the driver that he should contact dispatch.

Figure 48:
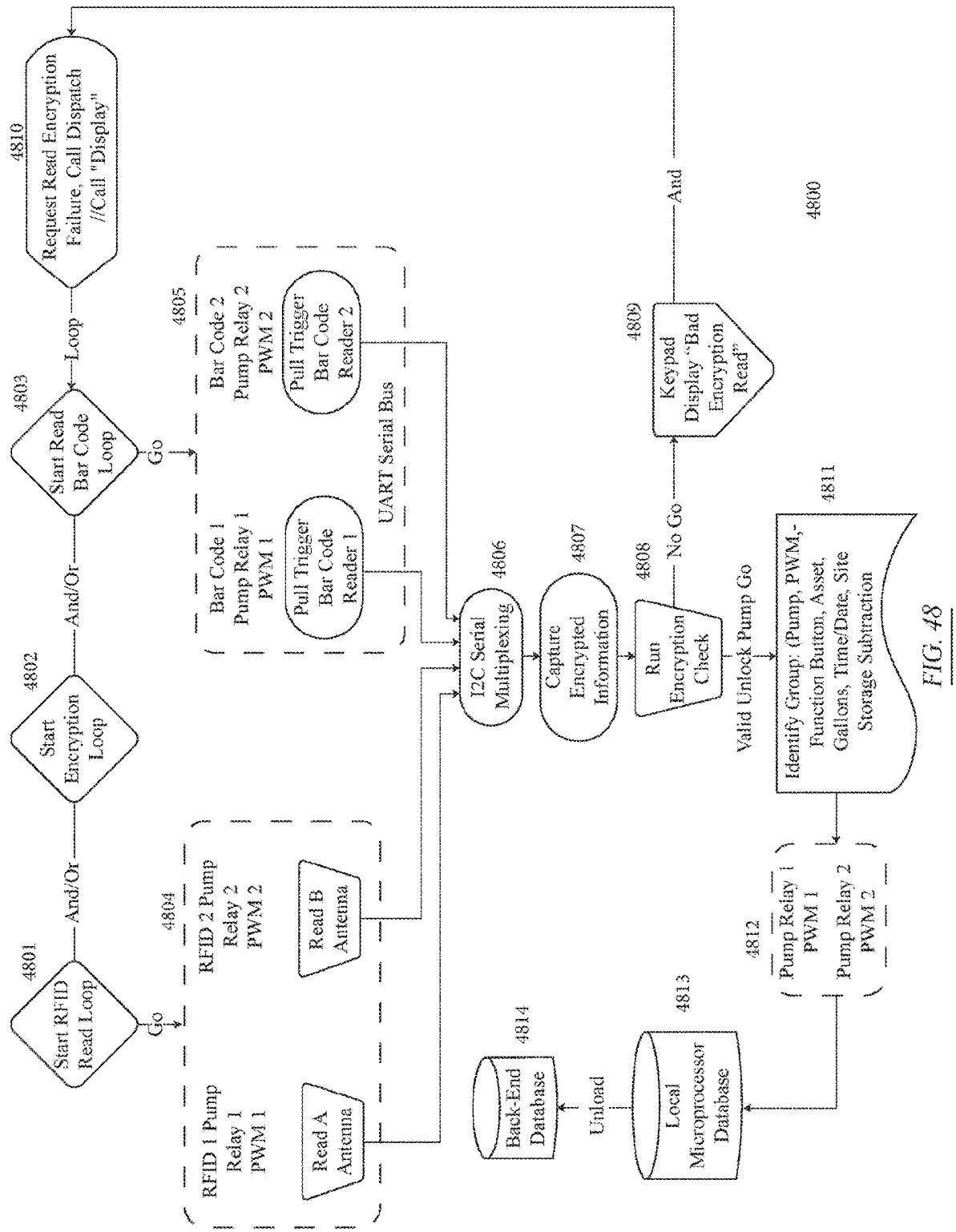
FIG. 48 shows a logic diagram 4800 for a process, performed by the controller 101, for RFID encryption and a process in which a pump is unlocked through RFID communication.

FIG. 48 shows a logic diagram 4800 for a process, performed by the controller 101, for RFID encryption and a process in which a pump is unlocked through RFID communication. In some embodiments, the controller 101 may access information relating to the vehicle asset by reading the vehicle asset's RFID tag. This information may cause the controller 101 to generate control signals to a fuel dispenser, such as selectively enabling or disabling fueling, or choosing the type of fuel to be dispensed to the vehicle asset.

The process may begin an RFID read loop at 4801, an encryption loop at 4802, and/or a barcode read loop at 4803. If the process begins the RFID read loop at 4801, the process may proceed to 4804 where it reads signals from a first antenna and a second antenna and send the signals to 4806 for I2C serial multiplexing.

If the process begins the barcode read loop at 4803, the process may proceed to 4806 where it may read a barcode responsive to a pull of a trigger of a barcode reader gun. The read may then be sent to 4806. The process may then capture encrypted information at 4807, and may then run an encryption check at 4808. If this is not able to be done, the process may proceed to 4809 and display to the driver that there was a bad encryption read. If there is an encryption failure, the process may proceed to 4810 and display to the driver that he should call dispatch. If the encryption read is successful, the process may proceed to 4811, where it identifies attributes about the vehicle such as the asset, the type of fuel it takes, and the number of gallons of fuel it needs. The process may then proceed to 4812 where fueling is executed. The process may then proceed to 4813 where it stores data relating to the fueling event at a local microprocessor database, which may then be uploaded to the asset management subsystem at 4814.

Figure 49:
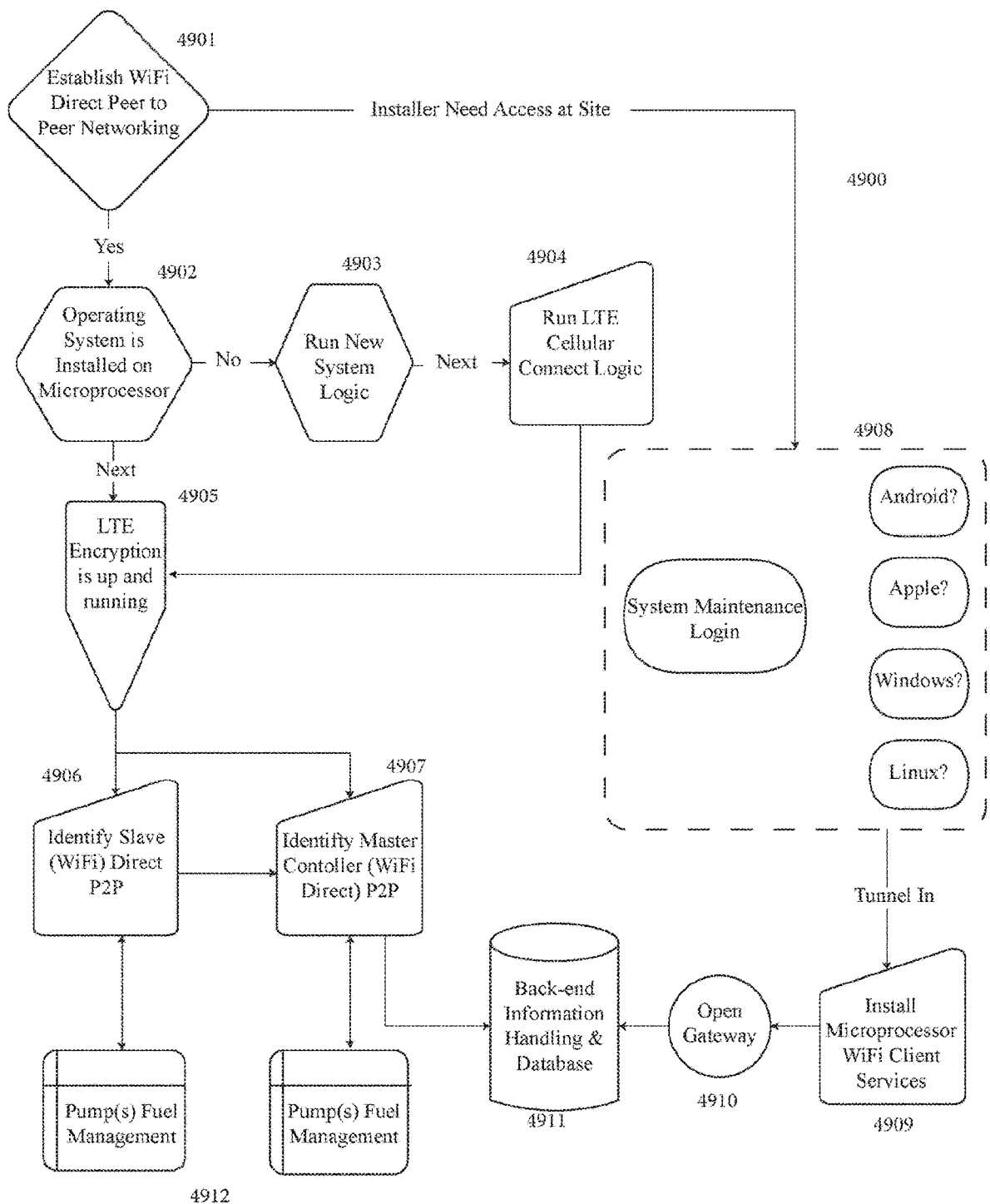
FIG. 49 shows a logic diagram 4900 of a process, performed by the controller 101, to establish Peer to Peer Wi-Fi networking between multiple fuel pumps.

FIG. 49 shows a logic diagram 4900 of a process, performed by the controller 101, to establish Peer to Peer Wi-Fi networking between multiple fuel pumps. The process may begin at 4901, where it begins establishing Peer to Peer Wi-Fi networking. The process may determine at 4902 if an appropriate operating system is installed on a microprocessor. If it is not, the process may run new system logic at 4903 and run LTE cellular connect logic at 4904. If the appropriate operating system is installed, the process may proceed to 4905. The process may then, at 4906 and 4907, the slave P2P and the master controller P2P, respectively. The process may then access the pump(s) fuel management at 4912, and relay information to the inventory management subsystem at 4911.

At 4901, if an installer needs access at a site, the process may identify system maintenance logic and appropriate software at 4908. The process may then install microprocessor Wi-Fi client services at 4909, open a gateway at 4910, and relay the information to the inventory management subsystem at 4911.

Figure 50:
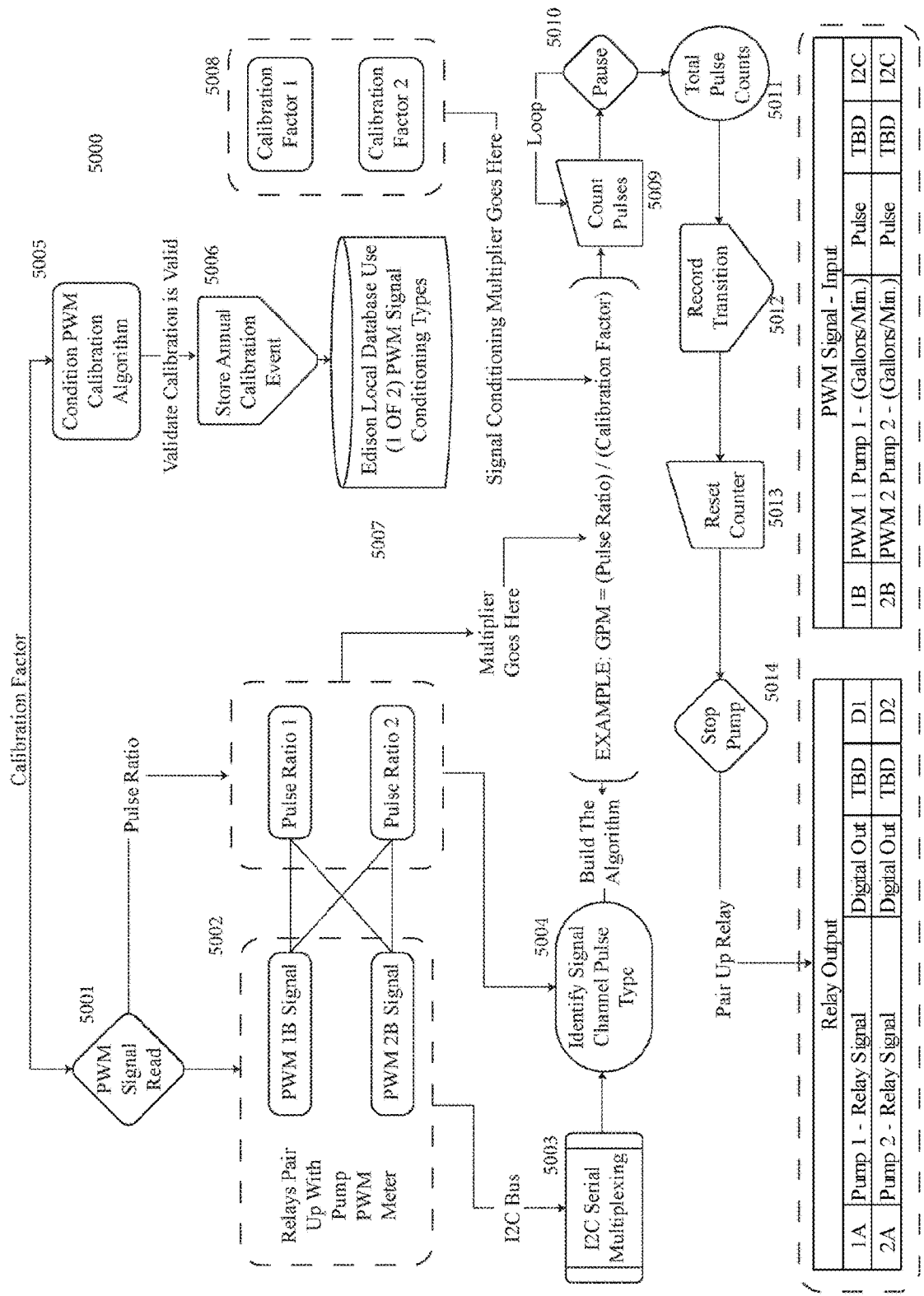
FIG. 50 shows a logic diagram 5000 for a process, performed by the controller 101, that calibrates and accurately measures fuel dispensing.

FIG. 50 shows a logic diagram 5000 for a process, performed by the controller 101, that calibrates and accurately measures fuel dispensing. The process may begin at 5001 and reads a PWM signal and a pulse ratio. At 5002, the process may pair relays with a PWM meter in a pump. The process may then perform I2C serial multiplexing at 5003 and identify a pulse type of the signal channel 5004. At 5005, the process may condition a PWM calibration algorithm. If the calibration is valid, the process may store an annual calibration event at 5006. This may be stored in a local database at 5007. The process may then include at least one calibration factor at 5008. Once calibration is completed, the process may begin counting pulses at 5009. The process may pause and loop to continue counting pulses at 5010. The process may keep track of a total of pulses at 5011. The process may then record the total number of pulses at 5012, reset the counter at 5013, and stop the pump at 5014.

Figure 51:
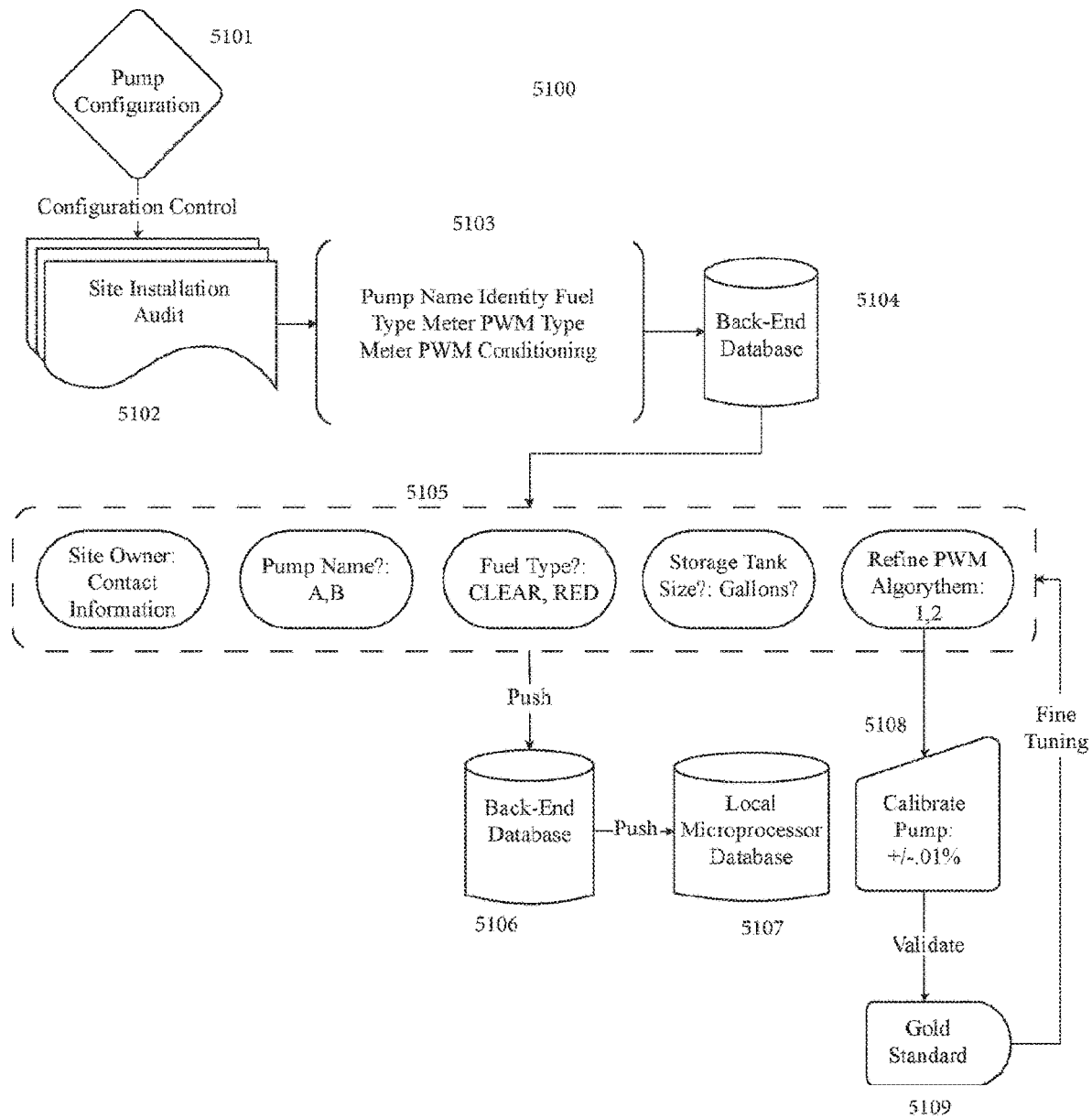
FIG. 51 shows a logic diagram 5100 for a process, performed by the controller 101, that configures a site and pumps with regard to fuel variables, such as site owner, pump type, and fuel type.

FIG. 51 shows a logic diagram 5100 for a process, performed by the controller 101, that configures a site and pumps with regard to fuel variables, such as site owner, pump type, and fuel type. The process may begin at 5101 and begin pump configuration. The process may, at 5102, audit the site and determine information, such as pump name, meter type, and fuel type, at 5103. This information may be then pushed to the inventory management subsystem at 5104. At 5105, the process may determine information relating to the site, such the type of site, the types of fuel in the dispensers, and the size of storage tanks. This information may be pushed to the inventory management subsystem at 5106 and subsequently pushed to a local database at 5107. An algorithm for counting pulses at pumps may be calibrated at 5108 and set to a gold standard at 5109.

Figure 52:
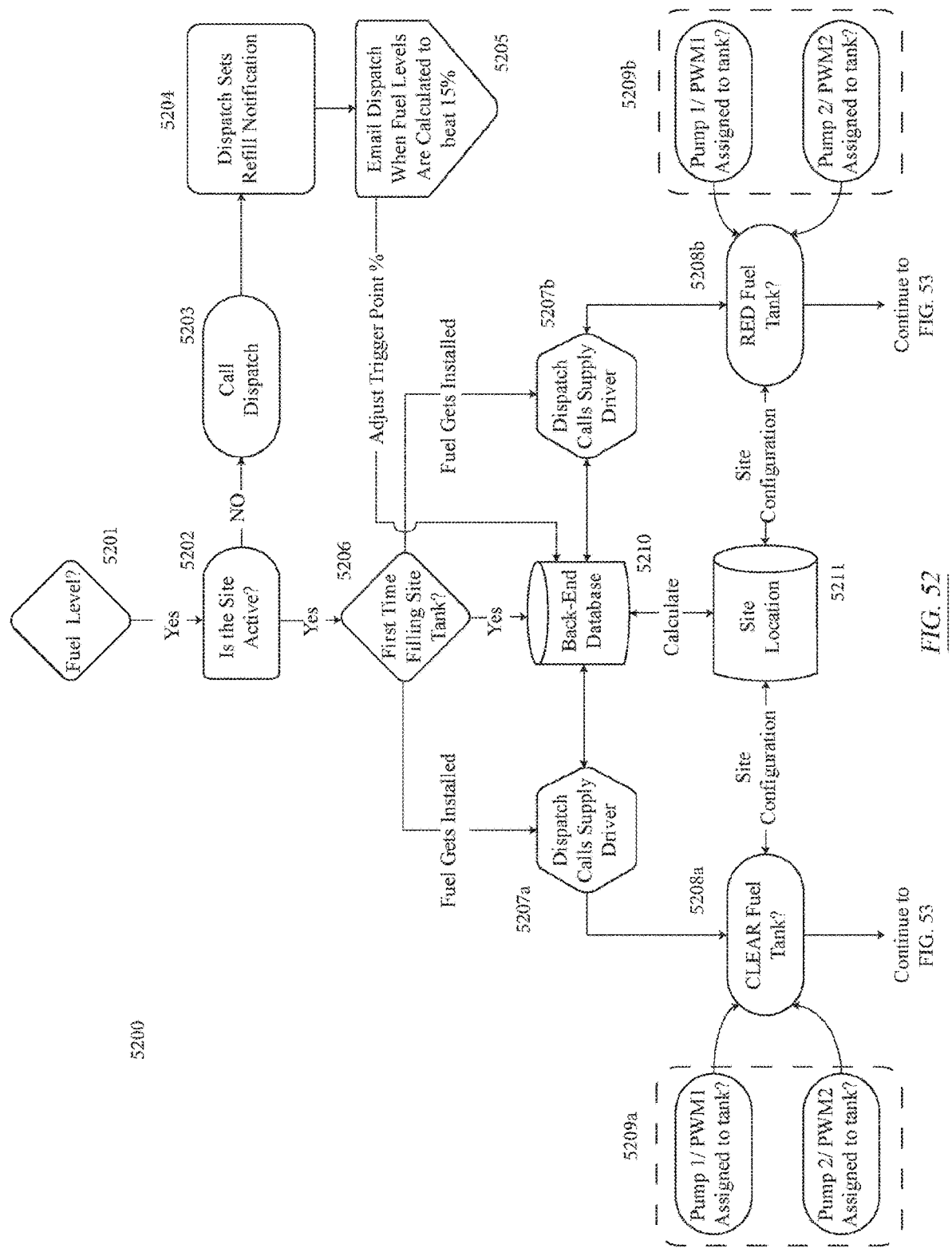
FIG. 52 shows a logic diagram 5200 for a process, performed by the controller 101, for detecting that a fuel site needs to be restocked with fuel.

FIG. 52 shows a logic diagram 5200 for a process, performed by the controller 101, for detecting that a fuel site needs to be restocked with fuel. This logic diagram continues onto FIG. 53. The process may begin at 5201, where it may determine a fuel level. The process may determine if the site is active at 5202. If it is not, the process may call dispatch at 5203, and provide information relating to refilling at 5204 and 5205 and store the information in the inventory management subsystem at 5210. If the site is active, the process may determine at 5206 if it is the first time filling a tank at the site. If the fuel being refilled is a CLEAR fuel, the process may have dispatch call a supply driver at 5207a, identify the fuel tank at 5208a, check the site configuration and site location at 5211, check pumps assigned to the tank at 5209a, check the fuel tank size at 5312a, deliver the fuel at 5313 (on FIG. 53), and store information relating to the refilling event into the inventory management subsystem at 5210. The process may similarly proceed, if the fuel being refilled is a RED fuel, at 5207*b*, 5208, 5211, 5209*b*, 5312*b*, 5313, and 5210.

After refilling, the process may, at 5314, have the driver call dispatch and report the information relating to the refilling event. The process may reset the fuel level of the refilled fuel tank at 5315, calculate the fuel level at 5316, store this information in a local database at 5317, and push the information to the inventory management subsystem at 5318. The process may then display, at the inventory management subsystem, the fuel level of the fuel tank at 5319. This information may be used for accounting at 5320.

Figure 53:
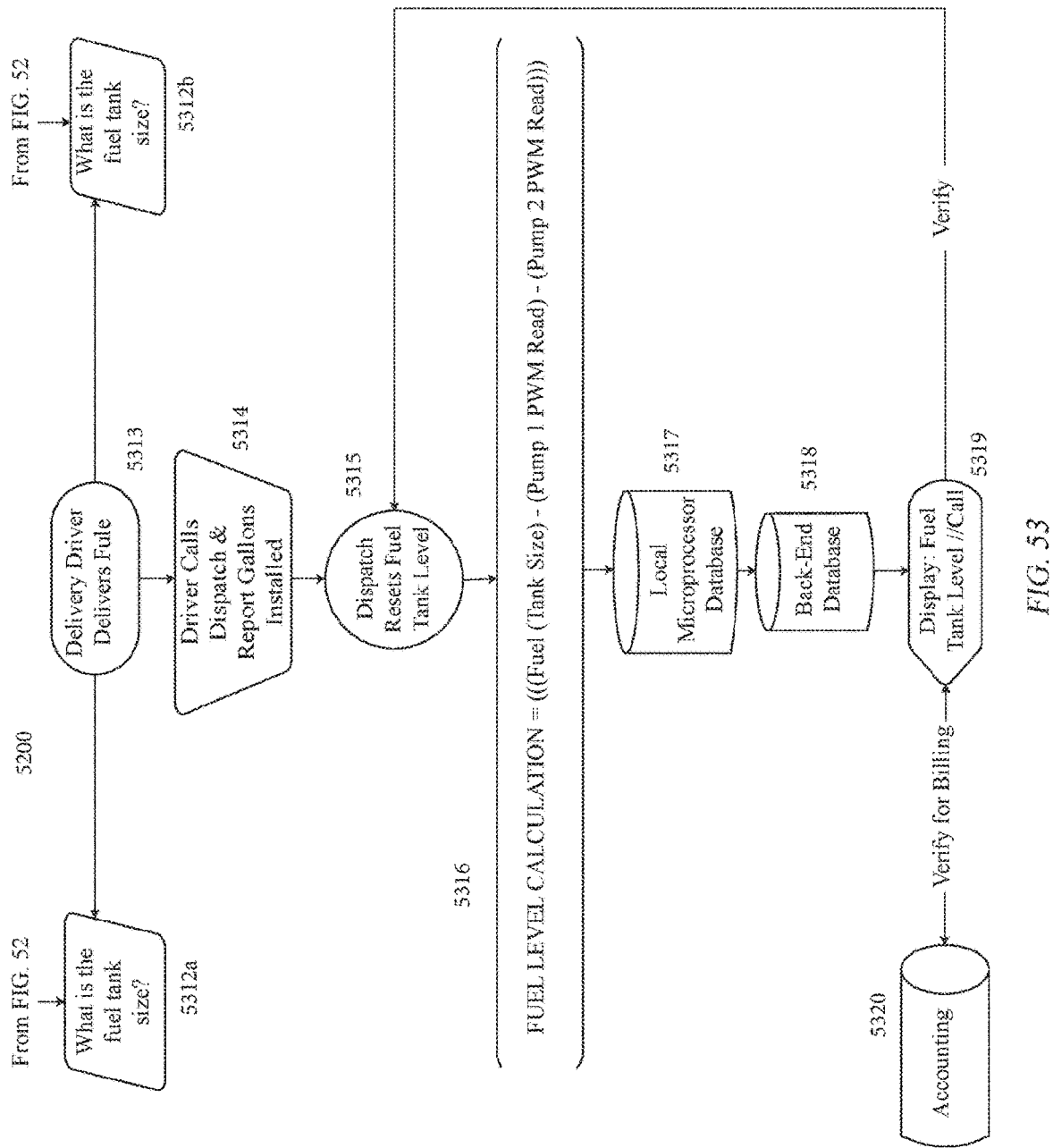
FIG. 53 shows the end of the logic diagram 5200 shown in FIG. 52.

FIG. 53 shows the end of the logic diagram 5200 shown in FIG. 52.

Figure 54:
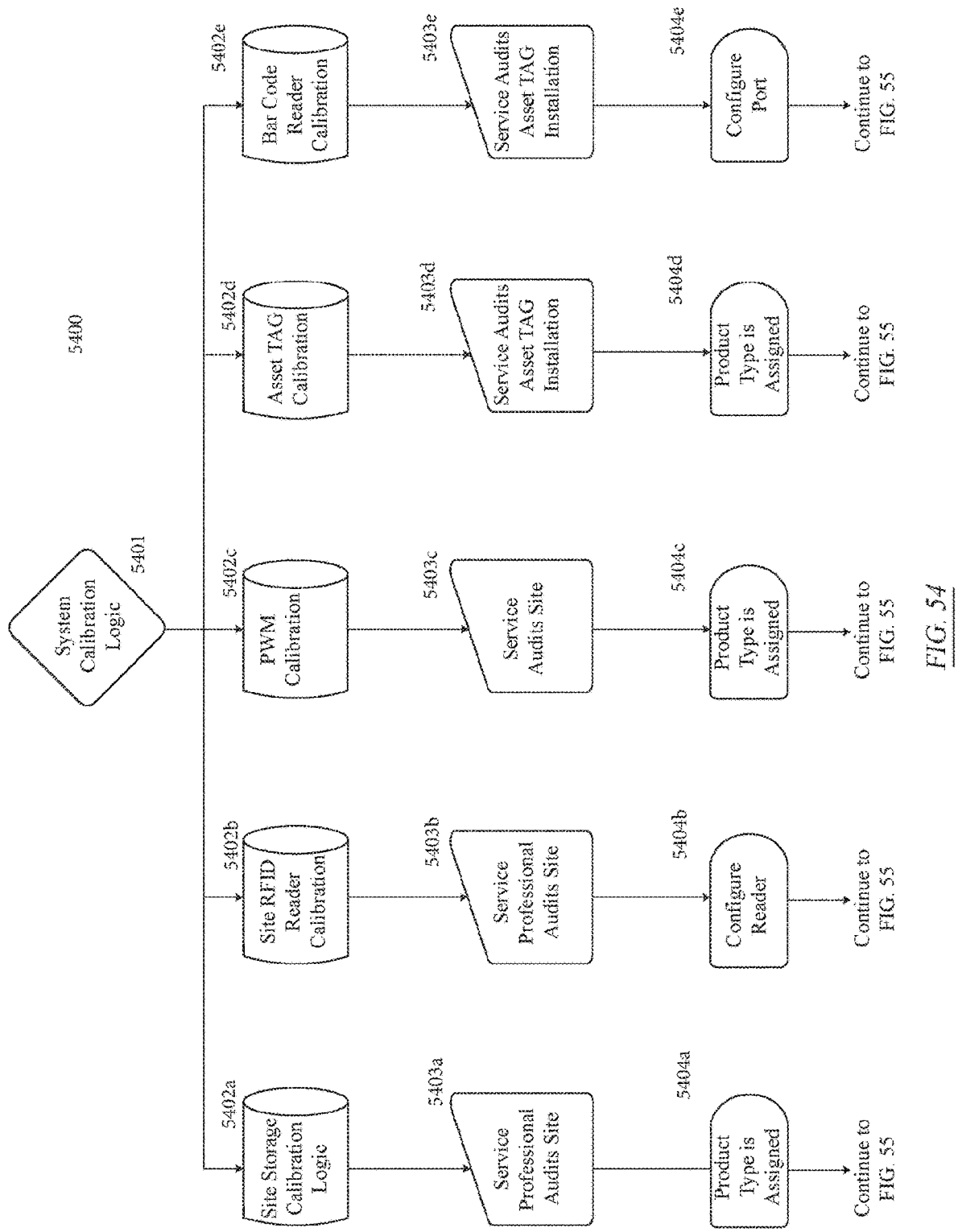
FIG. 54 shows a logic diagram 5400 of a process, performed by the controller 101, that provides an overview of a system calibration and operation.

FIG. 54 shows a logic diagram 5400 of a process, performed by the controller 101, that provides an overview of a system calibration and operation. This logic diagram continues onto FIG. 55 and FIG. 56. The process may begin at 5401 and begin system calibration logic. For site storage calibration, the process may proceed at 5402*a*. The process may proceed to 5403*a*, where the site may be audited, and then to 5404*a*, where a product type is assigned. At 5505*a*, the process may determine how large a storage tank is. At 5506*a*, the process may determine if a delivery supply truck has been calibrated. The process may then unload fuel into the storage tank at 5507*a*, after which a driver may call dispatch and report information relating to the refilling event at 5508*a*. This information may be entered into the inventory management subsystem at 5609*a* and 5610*a*.

For RFID, the process may begin RFID reader calibration at 5402*b*. The process may proceed to 5403*b*, where the site may be audited, and then to 5404*b*, where the reader may be configured. At 5505*b*, the pump and PWM may be assigned. At 5506*b*, the process may select an RFID antenna. The process, at 5507*b*, may then scan either a CLEAR fuel tag or a RED fuel tag. At 5508*b*, the process may determine if the read was valid or invalid. The process may then adjust the antenna distance at 5509*b*, and determine if the RFID read was successful at 5510*b*.

For PWM calibration, the process may begin PWM calibration at 5402*c*. The process may proceed to 5403*c*, where the site may be audited, and then to 5404*c*, where a product type is assigned. At 5505*c*, the process may select a PWM type. The process may then perform a PWM conditioning depending on the product type at 5506*c*. The process may then perform a calibration test at 5507*c*, and then store settings and document in PLM at 5508*c*.

For asset tag calibration, the process may begin asset tag calibration at 5402*d*. The process may proceed to 5403*d*, where the site may be audited, and then to 5404*d*, where a product type is assigned. The process may then perform a test read at 5505*d*. The process may then proceed to 5506*d*, 5507*d*, and 5508*d*, where the process may run scans on either a CLEAR fuel tag or a RED fuel tag, check for a valid read, and determine if the scan worked, respectfully. At 5509*d*, the process may determine if the process was successful for site location A. Similarly, at 5510*d*, the process may determine if the process was successful for site location B. The process may then determine if asset calibration is complete at 5611*d*. If not, the process may return to 5505*d*.

For barcode reader calibration, the process may begin barcode reader calibration at 5402*e*. The process may proceed to 5403*e*, where the site may be audited, and then to 5404*e*, where the process may configure a port. The process may then perform a test read at 5505*e*.

The process may then store the preceding calibration information at 5612. The process may then check the system calibration against a gold standard at 5613.

Figure 55:
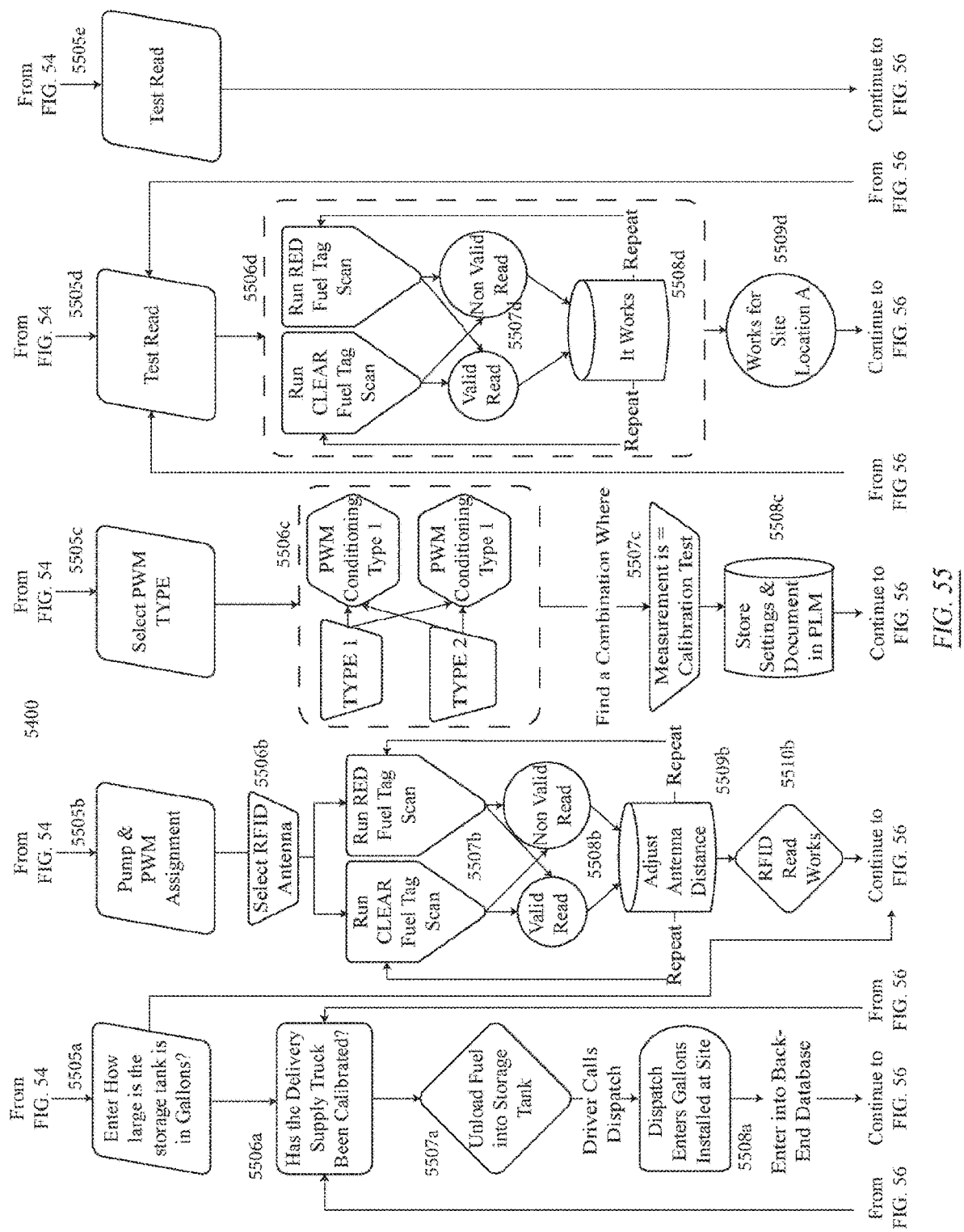
FIG. 55 shows a continuation of the logic diagram 5400 shown in FIG. 54.

FIG. 55 shows a continuation of the logic diagram 5400 shown in FIG. 54.

Figure 56:
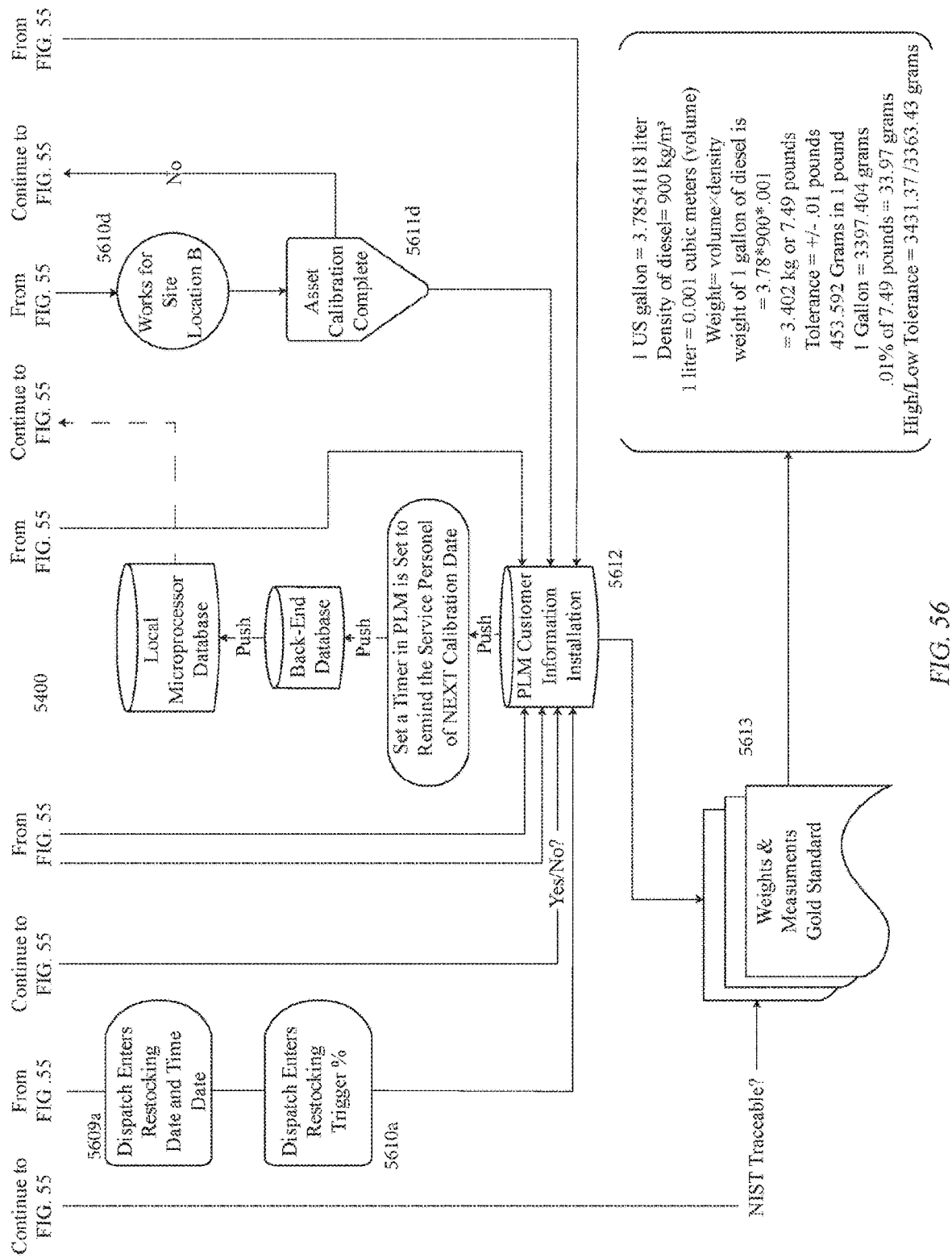
FIG. 56 shows the end of the logic diagram 5400 shown in FIG. 54 and FIG. 55.

FIG. 56 shows the end of the logic diagram 5400 shown in FIG. 54 and FIG. 55.

Figure 57:
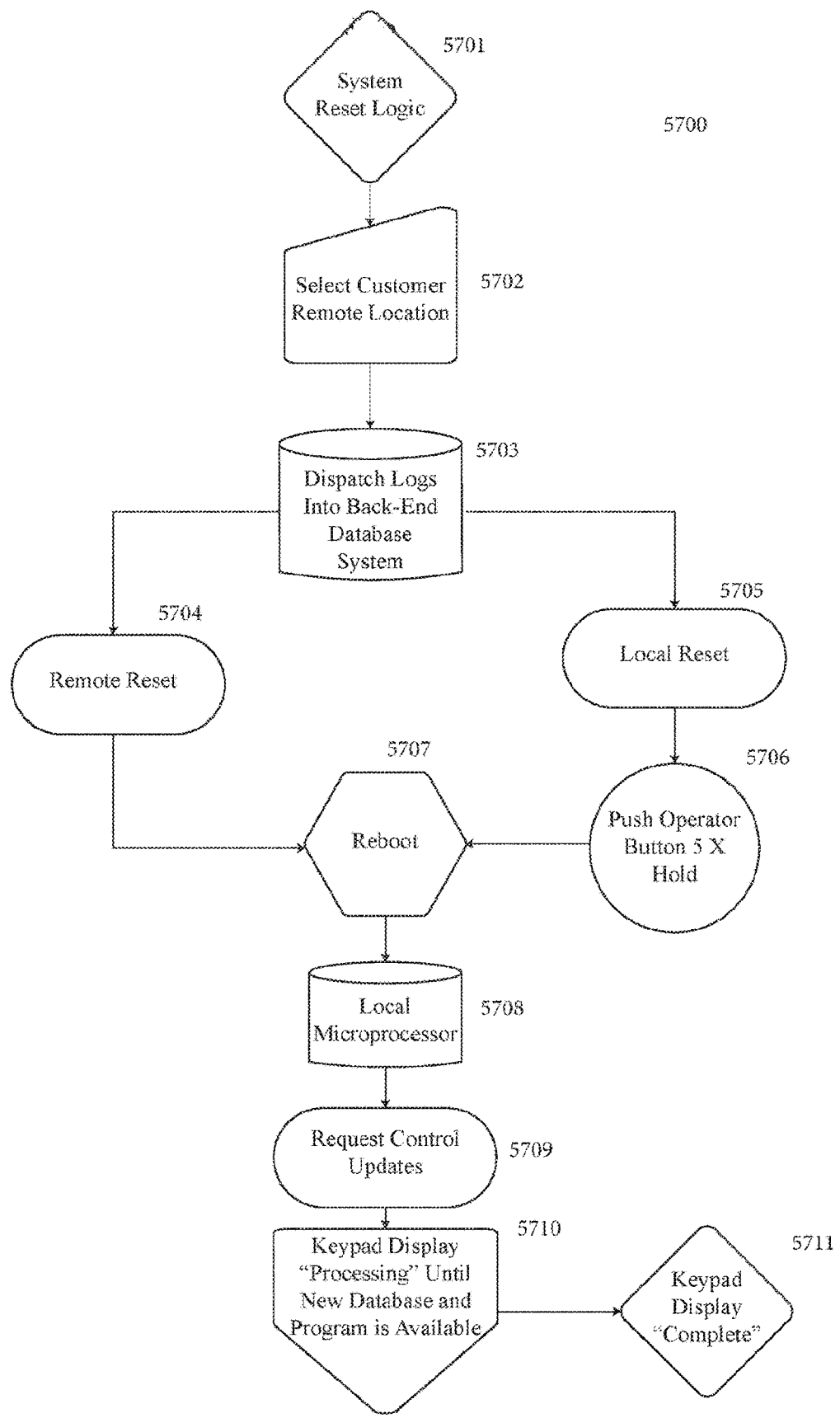
FIG. 57 shows a logic diagram 5700 for a process, performed by the controller 101, for a system reset.

FIG. 57 shows a logic diagram 5700 for a process, performed by the controller 101, for a system reset. The process may begin at 5701 where it accesses system reset logic. The process may proceed to 5702, where it selects a customer's remote location. At 5703, the process may dispatch logs into the asset management subsystem. The process may perform a remote reset at 5704, or perform a local reset at 5705 and inform an operator to hold a button at 5706. The process may then reboot the system at 5707. The process may then check a local microprocessor at 5708 and then request control updates at 5709. The process may display to a user that the system is "processing" at 5710, until the system reset is complete. At that point, the process may display to the user that the system reset is complete, at 5711.

Figure 58:
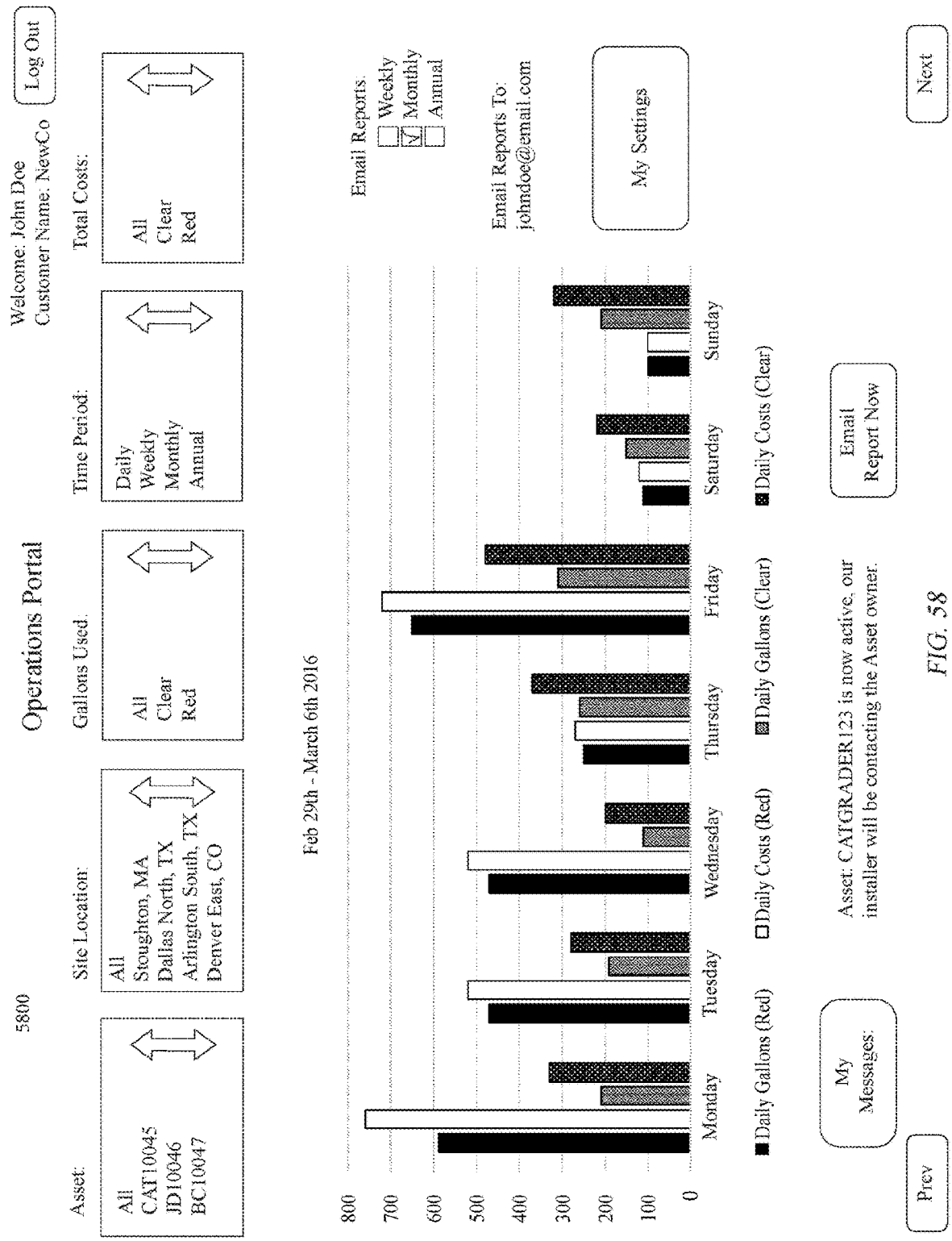
FIG. 58 shows a user interface 5800 for the inventory management subsystem that displays an overview of a site operating user's account.

In some embodiments, a user may be able to access subsystems of the end to end system on a computer. The subsystems may present a user with various user interfaces on a computer, allowing a user to navigate through the subsystems and access information stored in the subsystems. FIG. 58 shows a user interface 5800 for the inventory management subsystem that displays an overview of a site operating user's account. A user may view information relating to the user's sites, such as the site location, the type of fuel used at the site, and the total cost of each fuel. The user may view a visual representation of data relating to the user's sites, for example a bar graph showing fuel consumption of different types of fuel for each day of the week.

Figure 59:
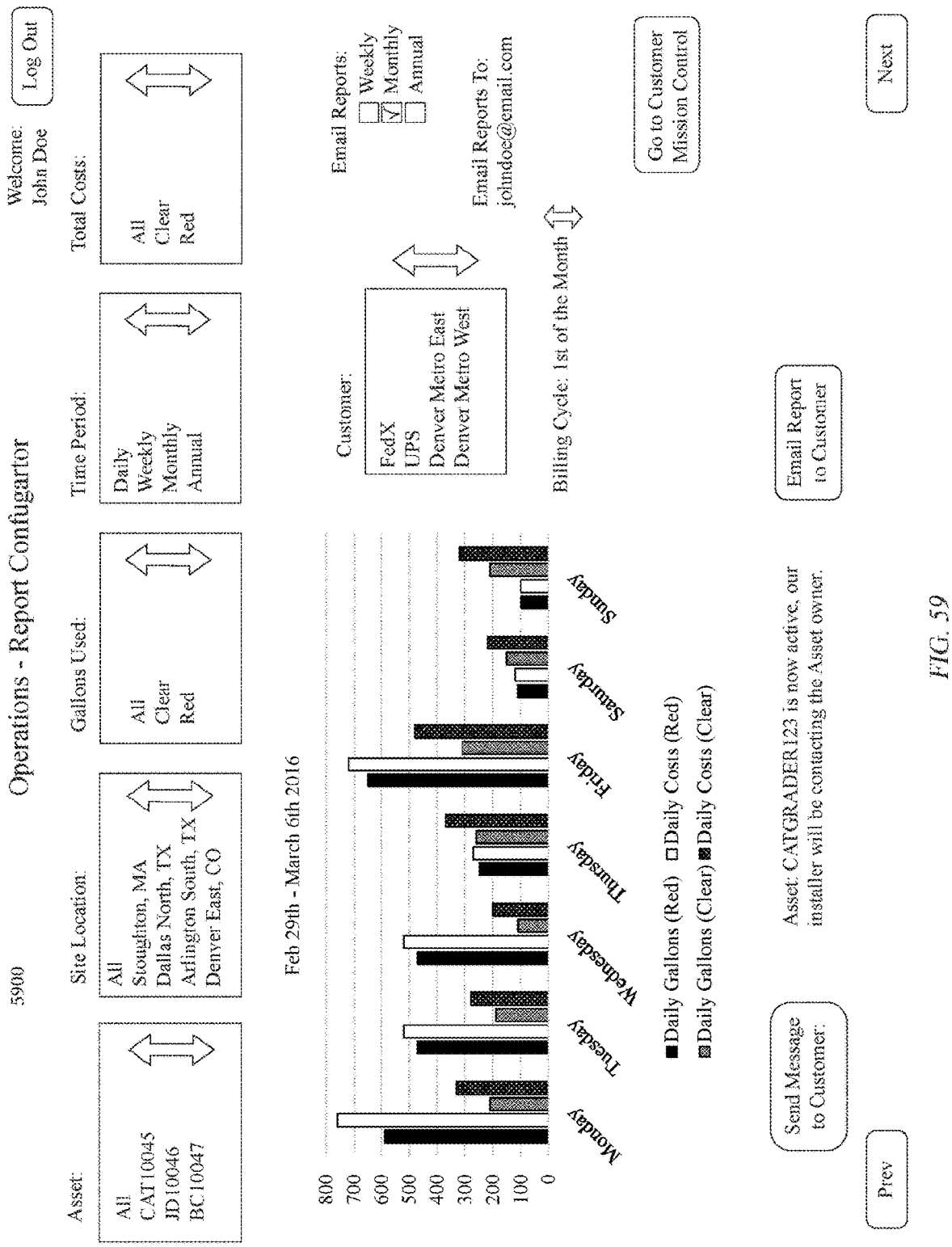
FIG. 59 shows a user interface 5900 for the inventory management subsystem that allows a site operating user to configure a report to be published.

FIG. 59 shows a user interface 5900 for the inventory management subsystem that allows a site operating user to configure a report to be published. A user may view information relating to the user's sites and generate a report of this information to send to a customer.

FIG. 60 shows a user interface 6000 for the inventory management subsystem that allows a site operating user to install a new site. A user may enter information for a new site to be installed. The user may send a message to an installation team in order to manage the installation of the new site. The user may further send a message to a customer to give the customer an update on the installation of the new site.

Figure 61:
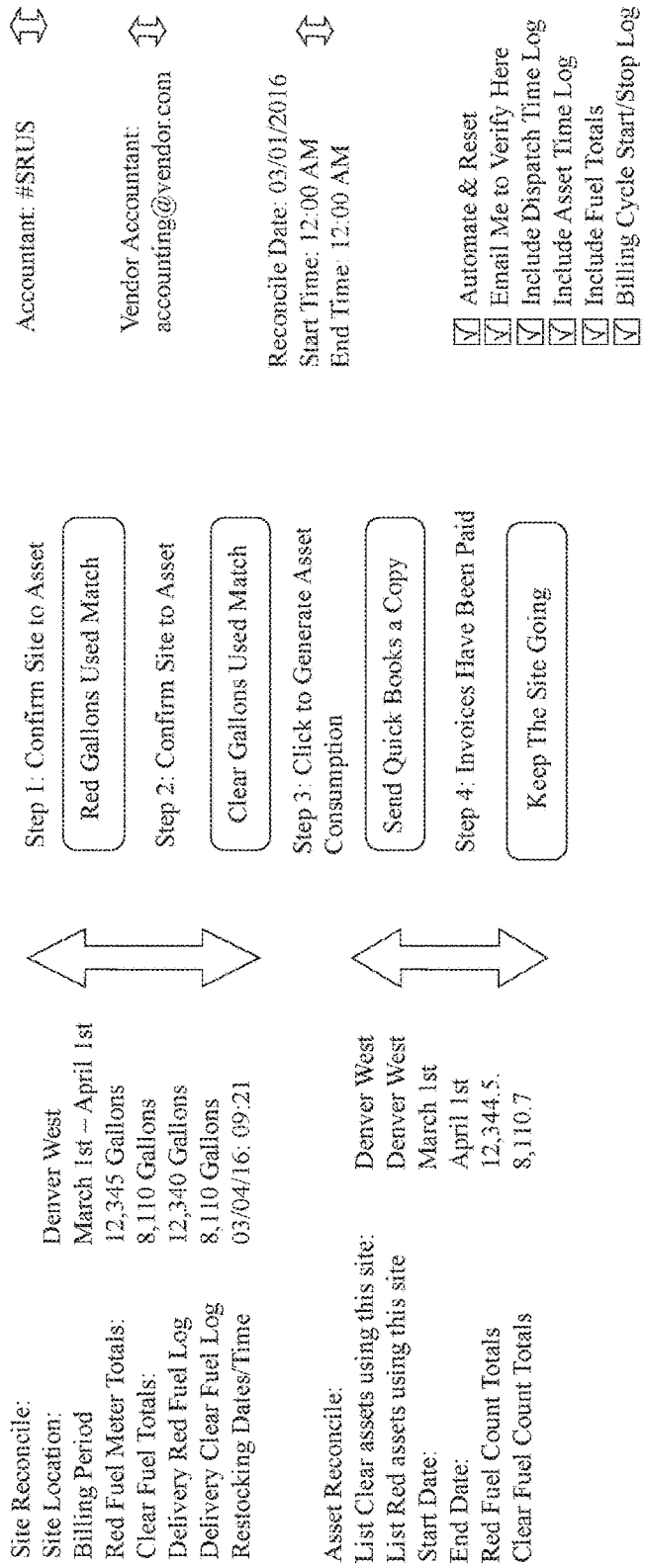
FIG. 61 shows a user interface 6100 for the inventory management subsystem that allows a site operating user to manage billing.

FIG. 61 shows a user interface 6100 for the inventory management subsystem that allows a site operating user to manage billing. A user may view each of the user's sites and manage invoices to customers. The user may further provide accounting comments.

FIG. 62 shows a user interface 6200 for the asset management subsystem that allows a user to install a new vehicle asset. A user may enter information, such as the site name, the customer name, and the asset fuel type, to install a new asset. The user may also provide a message to a team vendor to provide an update on the installation of the new asset.

FIG. 63 shows a user interface 6300 for the inventory management subsystem that further allows a user to install a new site. A user may provide a message to a team vendor to provide an update on the installation of the new site.

FIG. 64 shows a user interface 6400 for the inventory management subsystem that allows a user to manage dispatch to monitor site restocking. A user may view each of the user's sites and manage when a driver is sent out to refuel a fuel site. The user may decide on a trigger level for a fuel dispenser that may alert the user that a fuel site needs refueling. The user may further provide dispatcher comments to provide information on a refueling event.

FIG. 65 shows a user interface 6500 for the inventory management subsystem that allows a user to check on the status of their billing. A user may view each of the user's customers and manage the billing status for each customer. The user may provide a message to a team vendor as well as a message to a customer to provide an update on billing status.

FIG. 66 shows a user interface 6600 for the inventory management subsystem that allows an administrator to oversee their account. The administrator may view information about their account, such as daily reports, weekly reports, and asset management. The administrator may further provide a message to a user as well as a message to a team vendor to provide an update on the status of the account.

Figure 67:
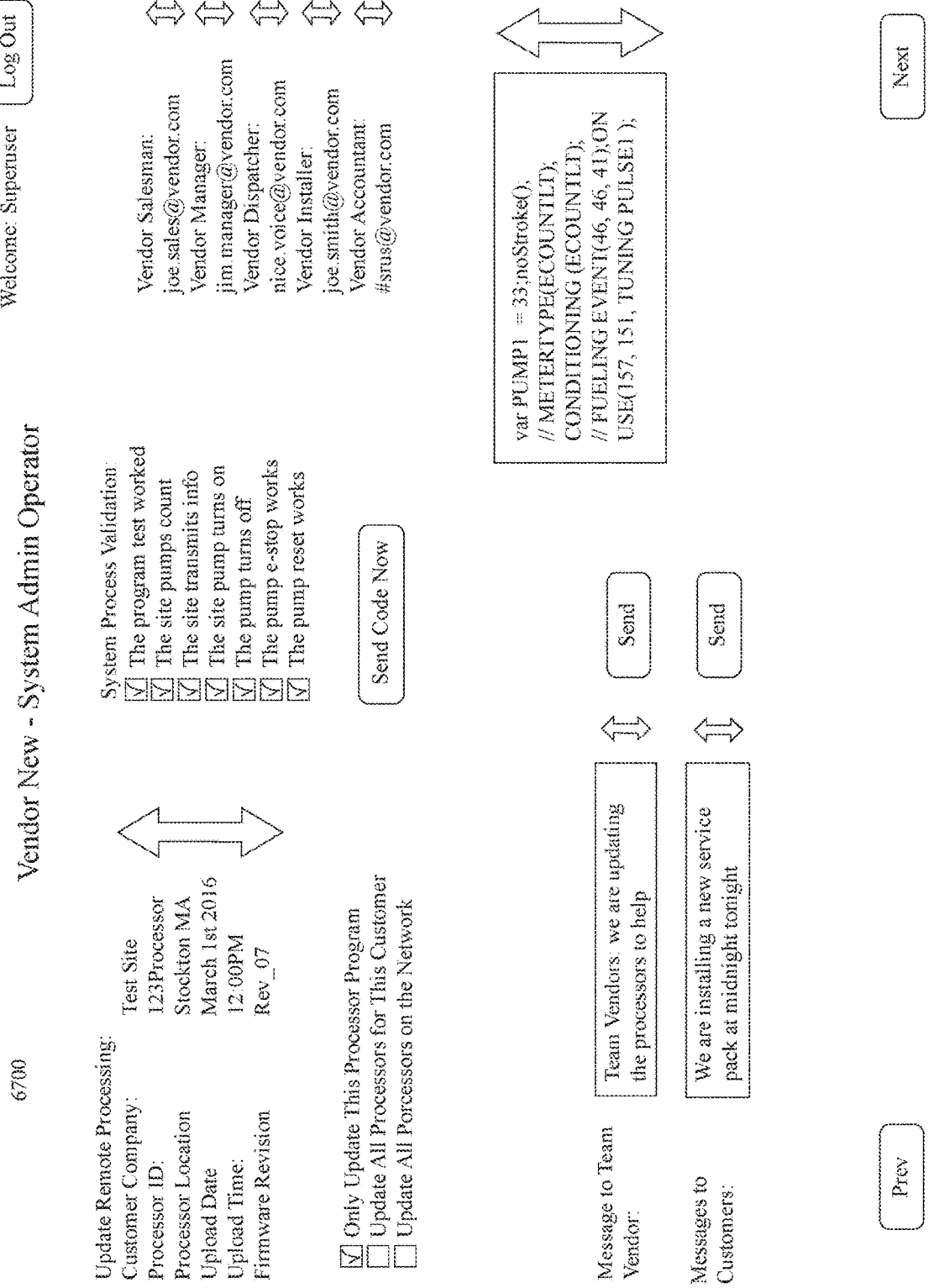
FIG. 67 shows a user interface 6700 for the inventory management subsystem that allows an administrator to see more information about their account.

FIG. 67 shows a user interface 6700 for the inventory management subsystem that allows an administrator to see more information about their account. The administrator may view information such as the status of sites and pumps. The user may further provide a message to a team vendor as well as a message to a customer to provide an update on the status of the account.

FIG. 68 shows a system messaging structure 6800 used in the asset management subsystem. The asset management subsystem may use the system messaging structure 6800 to implement the functionality as discussed. The system messaging structure 6800 is continued onto FIG. 69.

FIG. 69 shows a continuation of the system messaging structure 6800 shown in FIG. 68.

FIG. 70 shows a system messaging structure 7000 used in the inventory management subsystem. The inventory management subsystem may use the system messaging structure 7000 to implement the functionality as discussed.

FIG. 71 shows a system messaging structure 7100 used in communication between subsystems. The system messaging structure 7100 may be implemented to achieve the functionality as discussed. Having thus described several aspects of at least one embodiment of this invention, it is to be appreciated that various alterations, modifications, and improvements will readily occur to those skilled in the art.

As an example of possibly variations, certain functions are described as being implemented by certain components. It should be appreciated that the functions described herein may be implemented in any suitable components. For example, it was described that an application executing on a smartphone may provide a user interface to the system to enable a user to add, modify or remove asset information from the system. Those functions may alternatively or additionally be supported by software executing on a desktop computer or any other suitable computing device connected to the asset management system.

As an example of another possible variation, a fleet fueling system was described in connection with assets of a single customer. In some embodiments, the fleet fueling system may be configured to separately store information about the assets and fuel purchases of multiple customers. In this way, the same fleet fueling system may be used to provide services to multiple customers, with functions specific to the customer being performed on the data of that customer and data used for functions about the operation or maintenance of the system being aggregated from multiple customers. For example, data to generate an invoice for a customer may be derived from customer specific data and data to project a need for a fuel delivery being aggregated from usage data of all customers.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A fuel dispensing station configured to dispense fuel to a vehicle at the fuel dispensing station for fueling, the station comprising:
a fuel dispensing nozzle;
a controller configured to control the flow through the fuel dispensing nozzle; and
a movable reader comprising a cable coupling the movable reader to the controller, wherein
the movable reader is configured to read information about the vehicle when moved to a position proximate the fuel dispensing station;
a dock configured to hold the movable reader; and
a sensor configured to indicate when the movable reader is in the dock,
wherein the controller is configured to:
selectively enable fuel to flow through the dispensing nozzle based at least in part on information about the vehicle read with the movable reader and the output of the sensor indicating the movable reader is in the dock; and
preventing damage to the movable reader by selectively disabling fuel from flowing through the dispensing nozzle based on the sensor indicating the movable reader is not in the dock.

2. The fuel dispensing station of claim 1, wherein:
the controller is further configured to:
access information indicating a type of fuel for the vehicle based on the information about the vehicle read with the sensor;
selectively enable fuel to flow is based further in part on the type of fuel for the vehicle and a type of fuel the station is configured to dispense.

3. The fuel dispensing station of claim 1, wherein:
the controller is further configured to:

access information indicating a size of fuel tank for the vehicle based on the information about the vehicle read with the sensor;

selectively disable fuel to flow is based further in part on the amount of fuel dispensed in relation to the size of the fuel tank.

\* \* \* \* \*